United States Patent
Rahn et al.

(10) Patent No.: US 11,929,826 B2
(45) Date of Patent: Mar. 12, 2024

(54) OPTICAL MODULES HAVING AN IMPROVED OPTICAL SIGNAL TO NOISE RATIO

(71) Applicant: Infinera Corporation, Annapolis Junction, MD (US)

(72) Inventors: Jeffrey T. Rahn, Sunnyvale, CA (US); Fred A. Kish, Jr., Palo Alto, CA (US); Michael Reffle, Center Valley, PA (US); Peter W. Evans, Mountain House, CA (US); Vikrant Lal, Sunnyvale, CA (US)

(73) Assignee: Infinera Corporation, San Jose, CA (US)

(*) Notice: Subject to any disclaimer, the term of this patent is extended or adjusted under 35 U.S.C. 154(b) by 0 days.

(21) Appl. No.: 16/189,221

(22) Filed: Nov. 13, 2018

(65) Prior Publication Data
US 2019/0280798 A1 Sep. 12, 2019

Related U.S. Application Data

(63) Continuation of application No. 15/814,346, filed on Nov. 15, 2017.
(Continued)

(51) Int. Cl.
*H04B 10/61* (2013.01)
*H04B 10/079* (2013.01)
(Continued)

(52) U.S. Cl.
CPC .... *H04J 14/0221* (2013.01); *H04B 10/07955* (2013.01); *H04B 10/506* (2013.01);
(Continued)

(58) Field of Classification Search
CPC ............... H04J 14/06; H04B 10/61–6166
See application file for complete search history.

(56) References Cited

U.S. PATENT DOCUMENTS

| 2012/0082460 A1* | 4/2012 | Wu | H04B 10/5053 398/79 |
| 2014/0016927 A1* | 1/2014 | Khatana | H04B 10/61 398/25 |

(Continued)

OTHER PUBLICATIONS

Houtsma et al. "Manufacturable Monolithically Integrated InP Dual-Port Coherent Receiver for 100G PDM-QPSK Applications," in Optical Fiber Communication Conference/National Fiber Optic Engineers Conference 2011, OSA Technical Digest (CD), Optical Society of America, 2011, paper OML2. (Year: 2011).*

*Primary Examiner* — Nathan M Cors
(74) *Attorney, Agent, or Firm* — David L. Soltz

(57) ABSTRACT

Consistent with the present disclosure, a photonic integrated circuit (PIC) is provided that has 2 N channels (N being an integer). The PIC is optically coupled to N optical fibers, such that each of N polarization multiplexed optical signals are transmitted over a respective one of the N optical fibers. In another example, each of the N optical fibers supply a respective one of N polarization multiplexed optical signals to the PIC for coherent detection and processing. A multiplexer and demultiplexer may be omitted from the PIC, such that the optical signals are not combined on the PIC. As a result, the transmitted and received optical signals incur less loss and amplified spontaneous emission (ASE) noise. In addition, optical taps may be more readily employed on the PIC to measure outputs of the lasers, such as widely tunable lasers (WTLs), without crossing waveguides.

22 Claims, 66 Drawing Sheets

Related U.S. Application Data

(60) Provisional application No. 62/422,031, filed on Nov. 15, 2016.

(51) Int. Cl.
*H04B 10/50* (2013.01)
*H04J 14/02* (2006.01)
*H04J 14/06* (2006.01)

(52) U.S. Cl.
CPC .......... *H04B 10/614* (2013.01); *H04J 14/021* (2013.01); *H04J 14/06* (2013.01)

(56) References Cited

U.S. PATENT DOCUMENTS

2017/0195055 A1* 7/2017 Evans ................. H01S 5/02453
2017/0279539 A1* 9/2017 Tanaka ................... G02B 6/124

\* cited by examiner

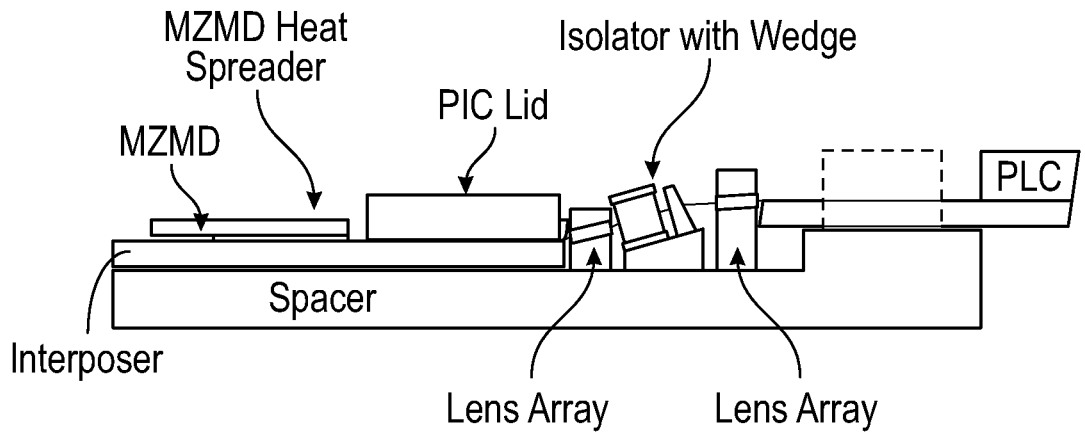
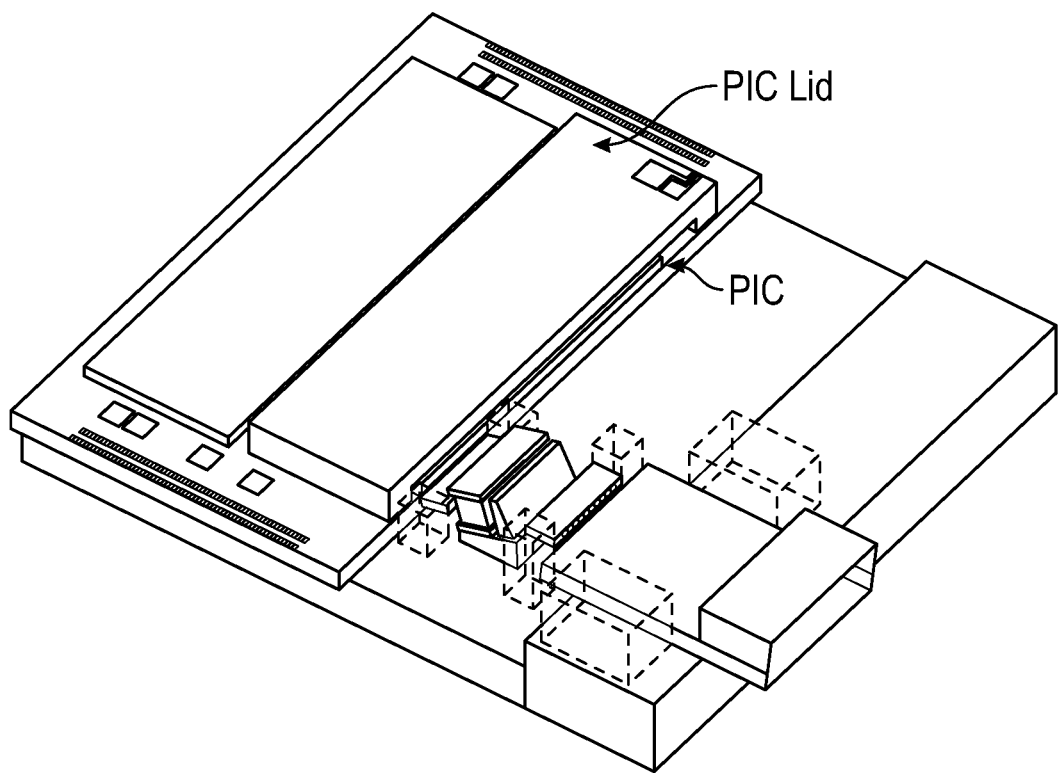
FIG. 8

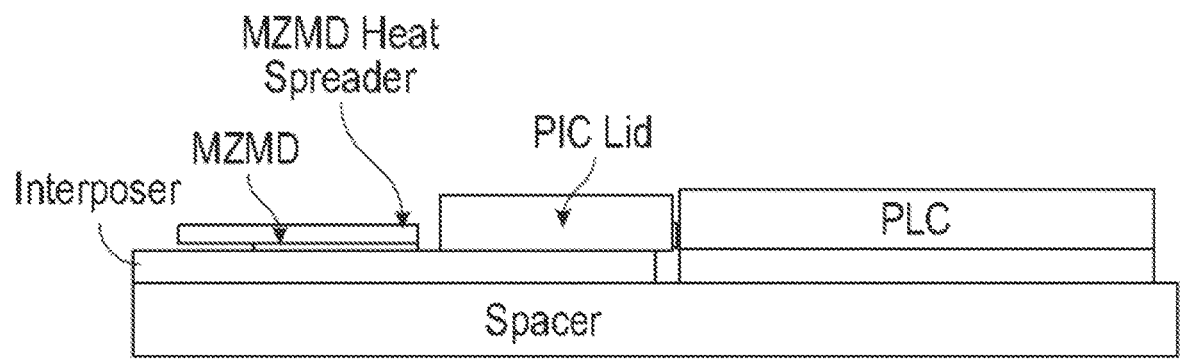
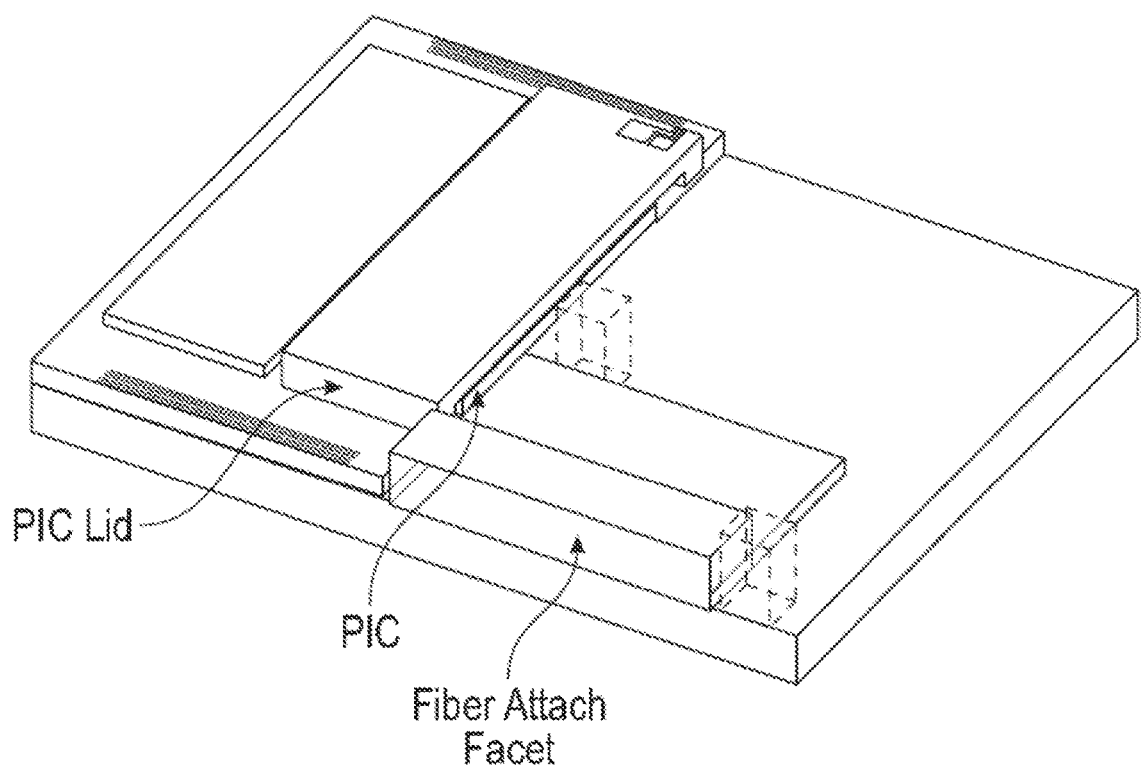
FIG. 10

Fiber at package side provides for smaller package.

Fiber at package front side

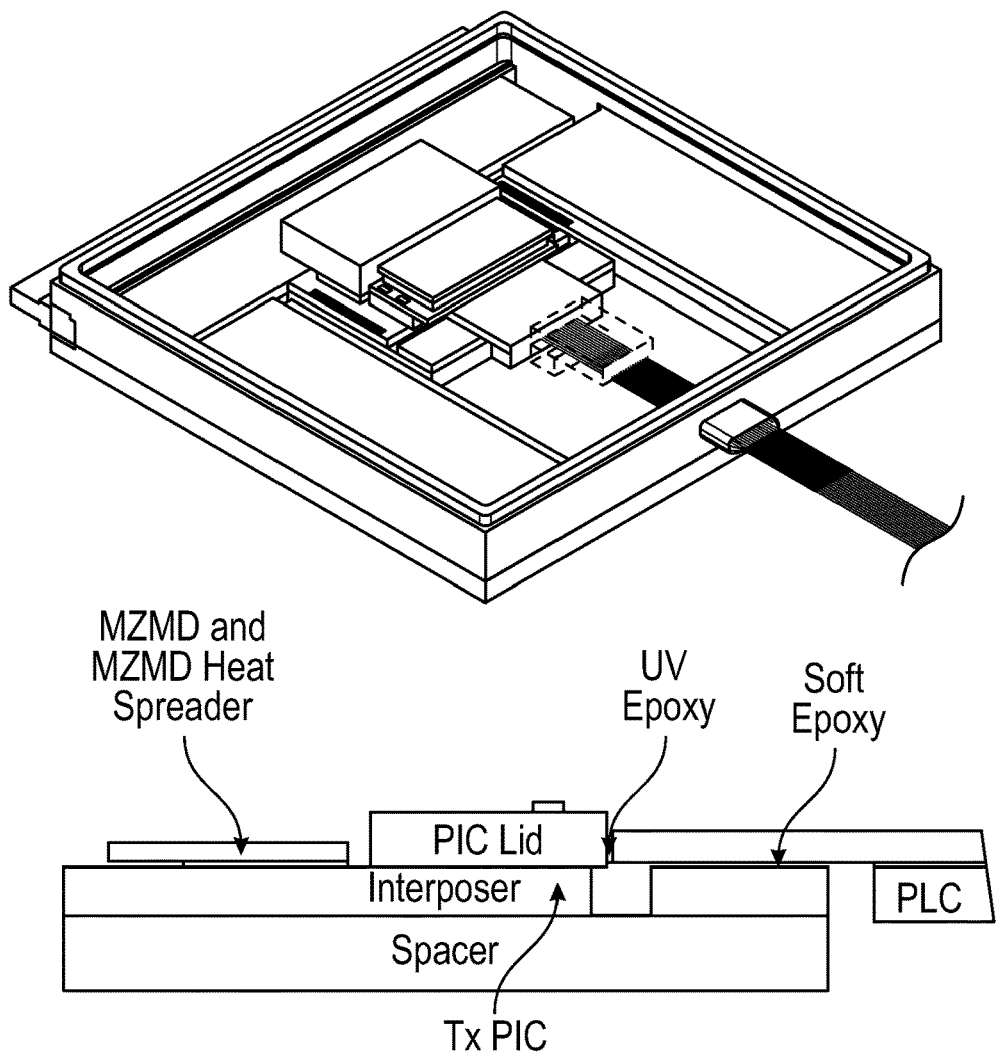
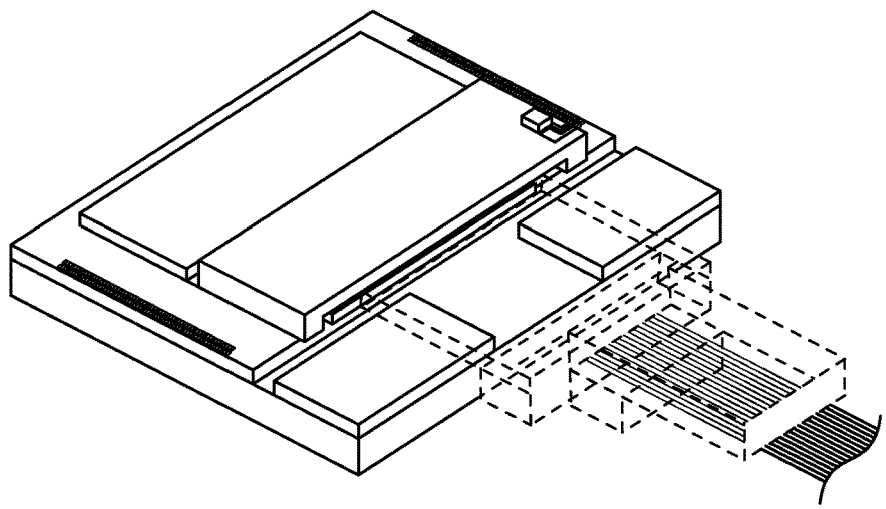
- PLC faces down
- Mount PLC on discrete silicon spacers
FIG. 12

PIC 23° Emission Angle
Dual Plano-Convex Si Lens, t=0.25 mm, φ=0.38mm

| PIC-PLC(SMF) | | | | $W_{-0.5dB}$ | | |
|---|---|---|---|---|---|---|
| # | PIC FF(FWHM) deg | Lens System | Max CE (dB) | XY (um) | Z (um) | XY tilt |
| 1 | 25°x25° | Optimized | -0.3 | 0.62/0.54 | 1.4 | (0.37°/0.34°) |
| 2 | 35°x35° | Optimized | -0.5 | 0.51/0.43 | 1 | (0.27°/0.25°) |
| 3 | 25°x25° | using 35°x35° Lens | -0.8 | 0.61/0.53 | 1.3 | (0.35°/0.28°) |
| 4 | 35°x35° | using 25°x25° Lens | -0.7 | 0.56/0.47 | 1.25 | (0.31°/0.30°) |

FIG. 48

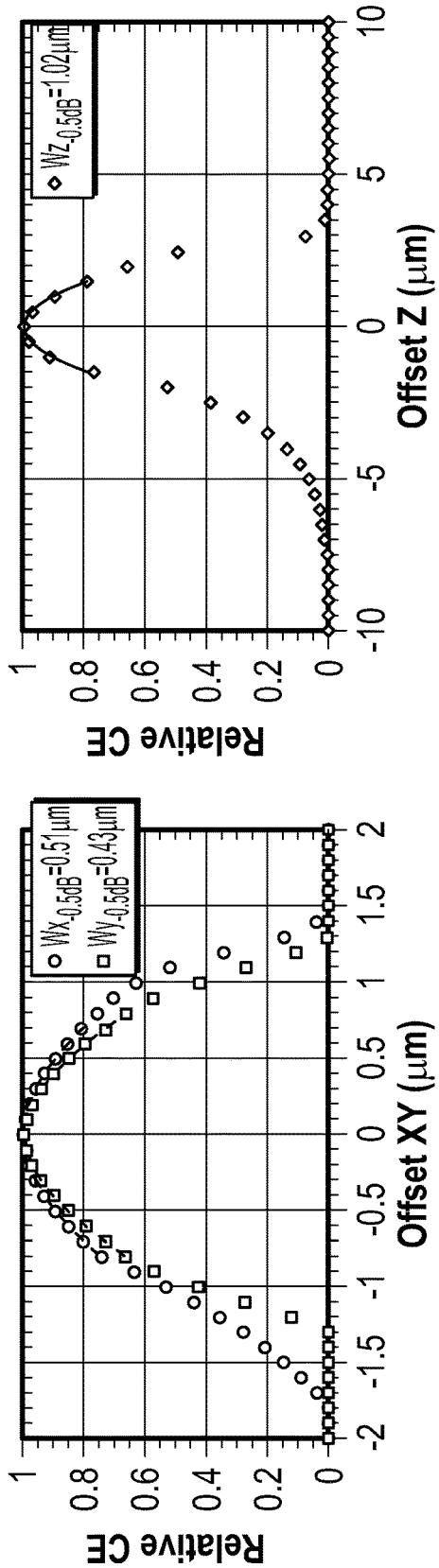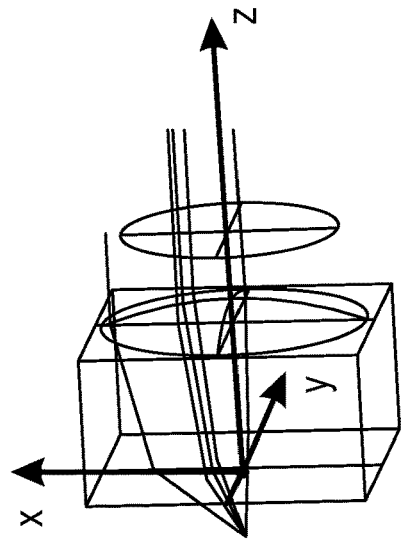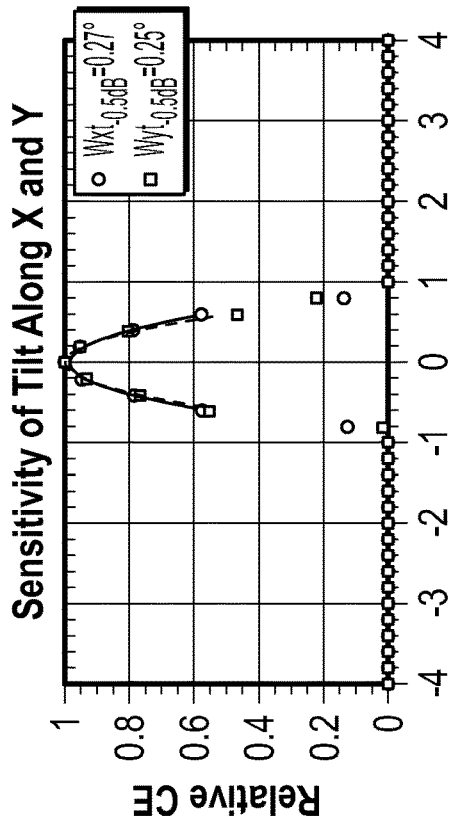
PIC Lens Sensitivity, Si Lens for FF 35°x35° to PLC (SMF) -23° Emission, Max CE=-0.5db
FIG. 51

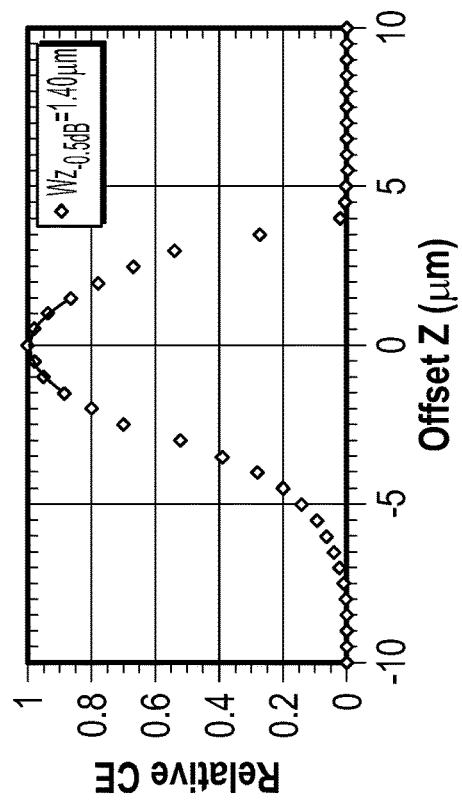
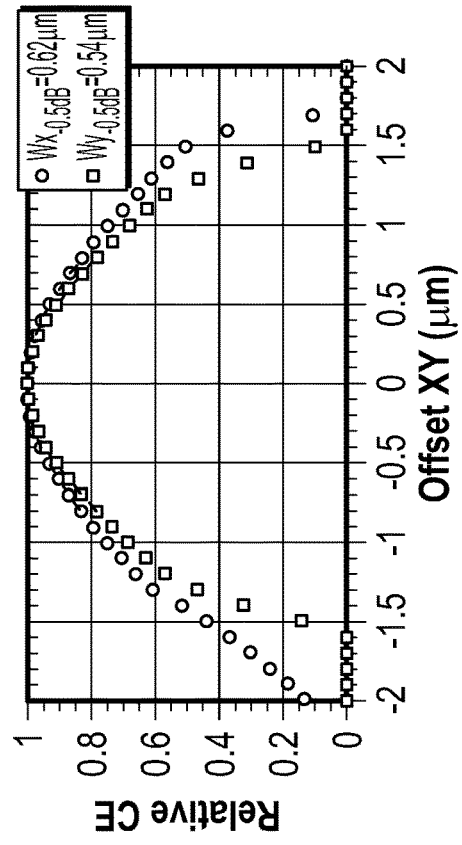
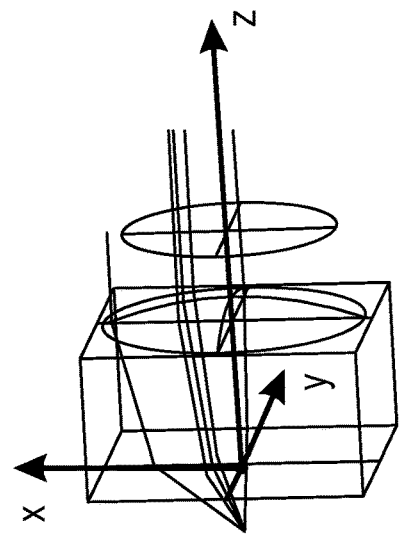
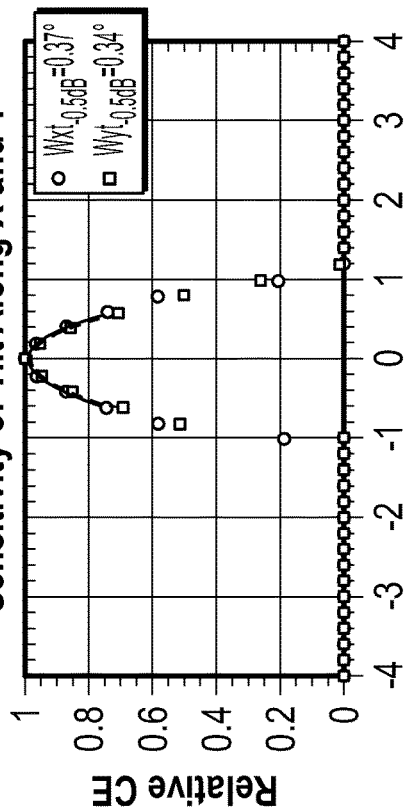
FIG. 53

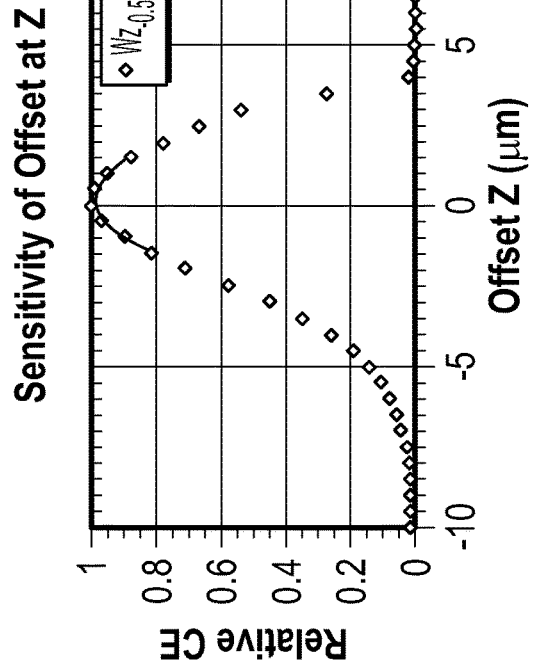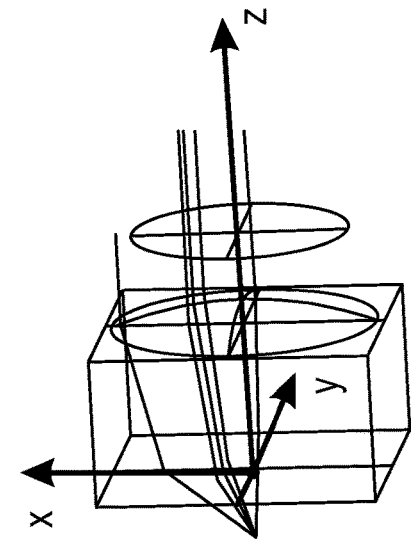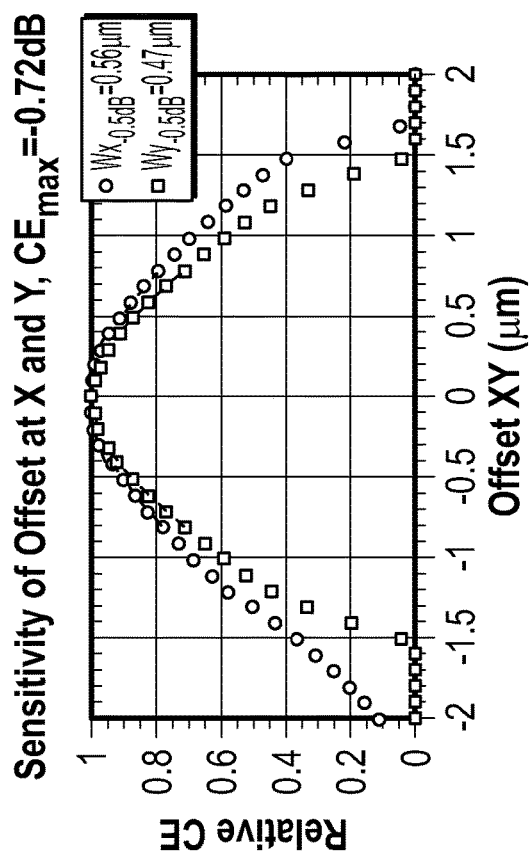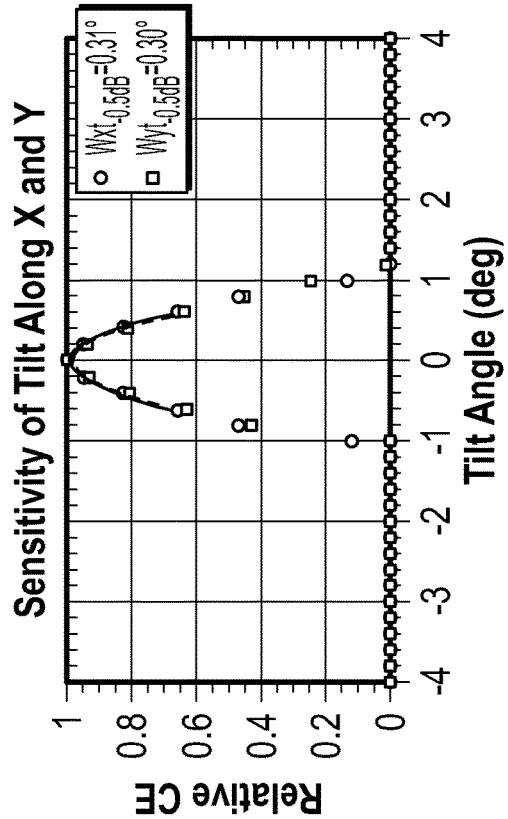
FIG. 54

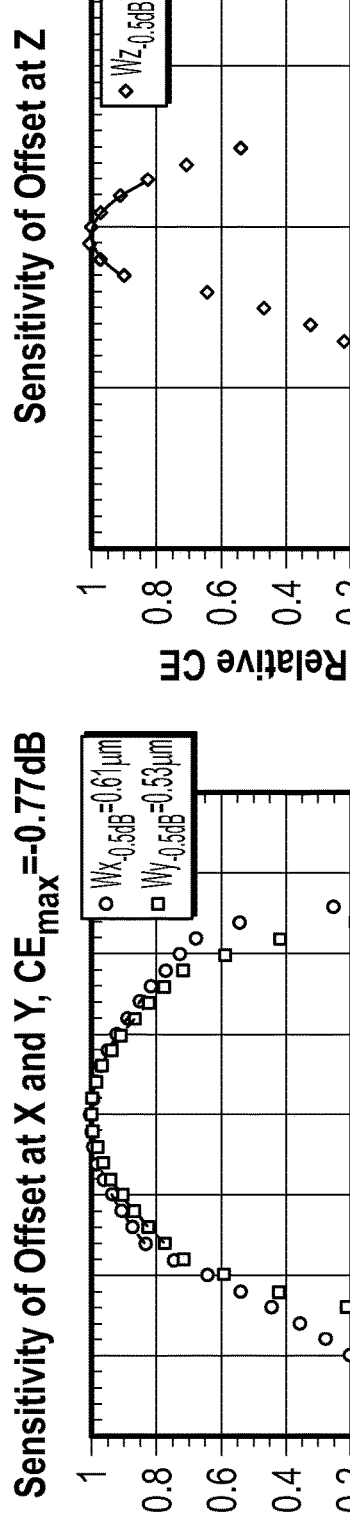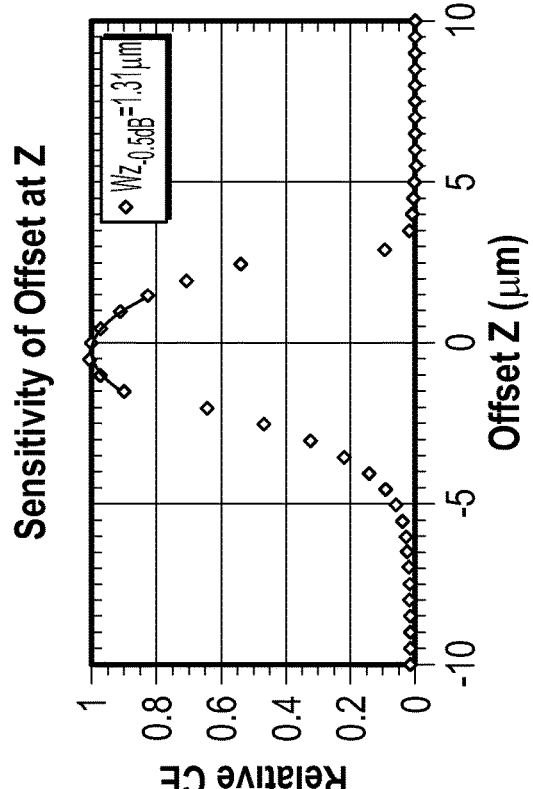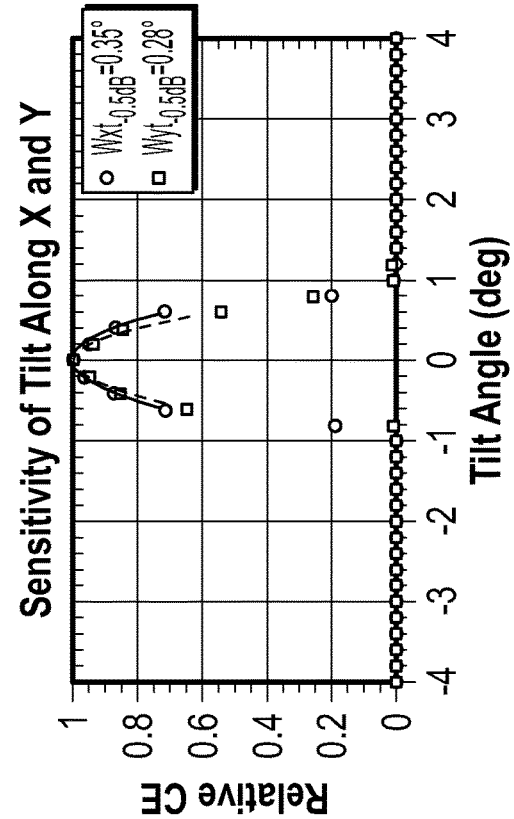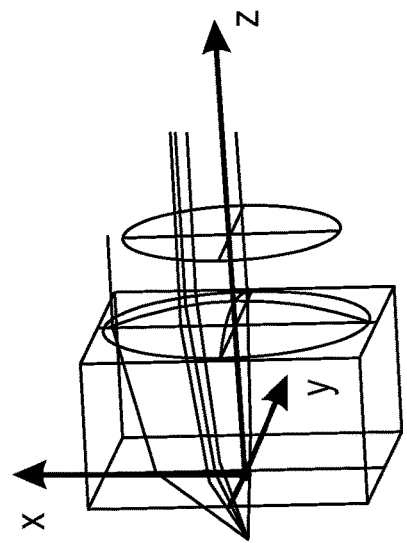
FIG. 55

OPTICAL MODULES HAVING AN IMPROVED OPTICAL SIGNAL TO NOISE RATIO

RELATED APPLICATION

This application is a continuation of and claims priority to U.S. patent application Ser. No. 15/814,346, filed Nov. 15, 2017, which claims priority to U.S. Provisional Patent Application No. 62/422,031, filed on Nov. 15, 2016, the contents of both of which are hereby incorporated by reference herein in their entirety.

BACKGROUND

Wavelength division multiplexed (WDM) optical communication systems are known in which multiple optical signals, each having a different wavelength and each modulated to carrying a different data stream, are multiplexed or combined and transmitted on an optical fiber. At a receive end of the fiber, such optical signals are demultiplexed or separated, detected, and the data stream carried by each optical signal is recovered.

WDM optical communication systems including photonic integrated circuits (PICs) are also known. Such PICs, may include various optical devices integrated on a common semiconductor substrate. In a transmitter, such PICs may include lasers, modulators, and optical amplifiers, and an optical combiner or multiplexer, among other devices. At the receive end, the PICs may include optical amplifiers, a power splitter or demultiplexer, and, in the case of a coherent receiver, optical hybrid circuits.

Conventionally, prior to input to the multiplexer, each optical signal may be amplified by a corresponding optical amplifier on the PIC. Each optical amplifier, however, may output, in addition to the optical signal, so-called amplified spontaneous emission (ASE) light at wavelengths other than the optical signal wavelength. Such ASE light may include wavelengths that extend into and overlap with the optical signal wavelengths. When the WDM signal with ASE is provided to an erbium doped fiber amplifier, the optical signals, as well as the ASE may be amplified. Accordingly, ASE light may be a source of noise in WDM optical communication systems and cause errors in transmission. Such noise may contribute to a low launch optical signal to noise ratio (LOSNR) and a low OSNR in a received optical signal (ROSNR).

In addition, the multiplexer may introduce loss into each optical signal when such optical signals are combined. If the multiplexer, such as a power combiner, does not include spectral filtering, power loss may be incurred. Such power loss is typically a function of 1/N, where N is the number of optical signals supplied to the multiplexer. Power loss may result in an additional 1 to 2 dB of loss. Accordingly, an optical signal supplied to such multiplexers may incur a loss of 9-10 dB, but less or more loss may be observed depending on the number of optical signals that are combined by the multiplexer.

SUMMARY

Consistent with an aspect of the present disclosure, the multiplexer and demultiplexer may be omitted, such that the optical signals are not combined on the PIC, and each optical signal is transmitted on a corresponding optical fiber coupled to the PIC.

Since the optical signals are not combined, ASE noise is significantly reduced. However, if optical multiplexing is desired, each amplified optical signal may be supplied to a corresponding filter that eliminates or substantially attenuates ASE light at wavelengths other than the optical signal wavelength. As a result, when such filtered optical signals are combined in the multiplexer, the ASE noise is substantially reduced in the output WDM signal compared to a WDM signal including unfiltered amplified optical signals. Since the resulting WDM optical signal has reduced ASE noise, simpler, less expensive erbium doped fiber amplifiers may be provided that do not require further filtering or spectral shaping to lower ASE. Moreover, erbium doped fiber amplifiers in the receiver may be omitted since optical signals supplied to the receiver have improved OSNR, and, therefore, less amplification may be required.

Further, since optical multiplexers often have a fixed number of inputs, by omitting such optical multiplexers, additional optical signals may be readily added by providing an additional fiber for each signal. Accordingly, optical communication systems consistent with an aspect of the present disclosure may scale more efficiently than those that include multiplexers or combiners with a fixed number of inputs. Moreover, by removing multiplexers and demultiplexers from the PIC, waveguides that route optical signals on the PIC may be laid out with fewer restrictions, so that such waveguides may have fewer bends and/or a reduced radius of curvature. Moreover, PIC layouts may be made more compact. In addition, optical taps may be more readily employed on the PIC to measure outputs of the lasers, such as widely tunable lasers (WTLs) without crossing waveguides. A novel wavelength locker (WLL) may thus be employed, as described below.

Consistent with a further aspect of the present disclosure, by omitting the multiplexer in the transmit side PICs and the splitter or demultiplexer in the receive side PICs, both transmit and receive PICs may have a simpler layout. Alternatively, additional functionality or circuits may be integrated into the PICs. For example, a receiver for tracking and locking wavelengths of each optical signal may be incorporated into both the transmit and receive PICs, as discussed in greater detail below. In addition, a transceiver PIC may be employed including both receiver devices (such as photodiodes and 90 degree optical hybrids) and transmitter devices (SOAs and modulators) on a common substrate. Such transceiver PICs may include a laser that is used both as a local oscillator and an optical source for the modulators. Alternatively, the transmit and receive portions of the transceiver PIC may include separate lasers.

BRIEF DESCRIPTION OF THE DRAWINGS

FIG. 1b shows an example of a portion of the transceiver shown in FIG. 1a;

FIGS. 5-10, 11*a*, 11*b*, and 12-14 show examples of various packaging configurations consistent with an aspect of the present disclosure;

FIGS. 48-55 list and show various parameters associated with lenses that may be employed in the various embodiments herein;

DETAILED DESCRIPTION

The following detailed description of example implementations refers to the accompanying drawings. The same reference numbers in different drawings may identify the same or similar elements.

Figure 1A:
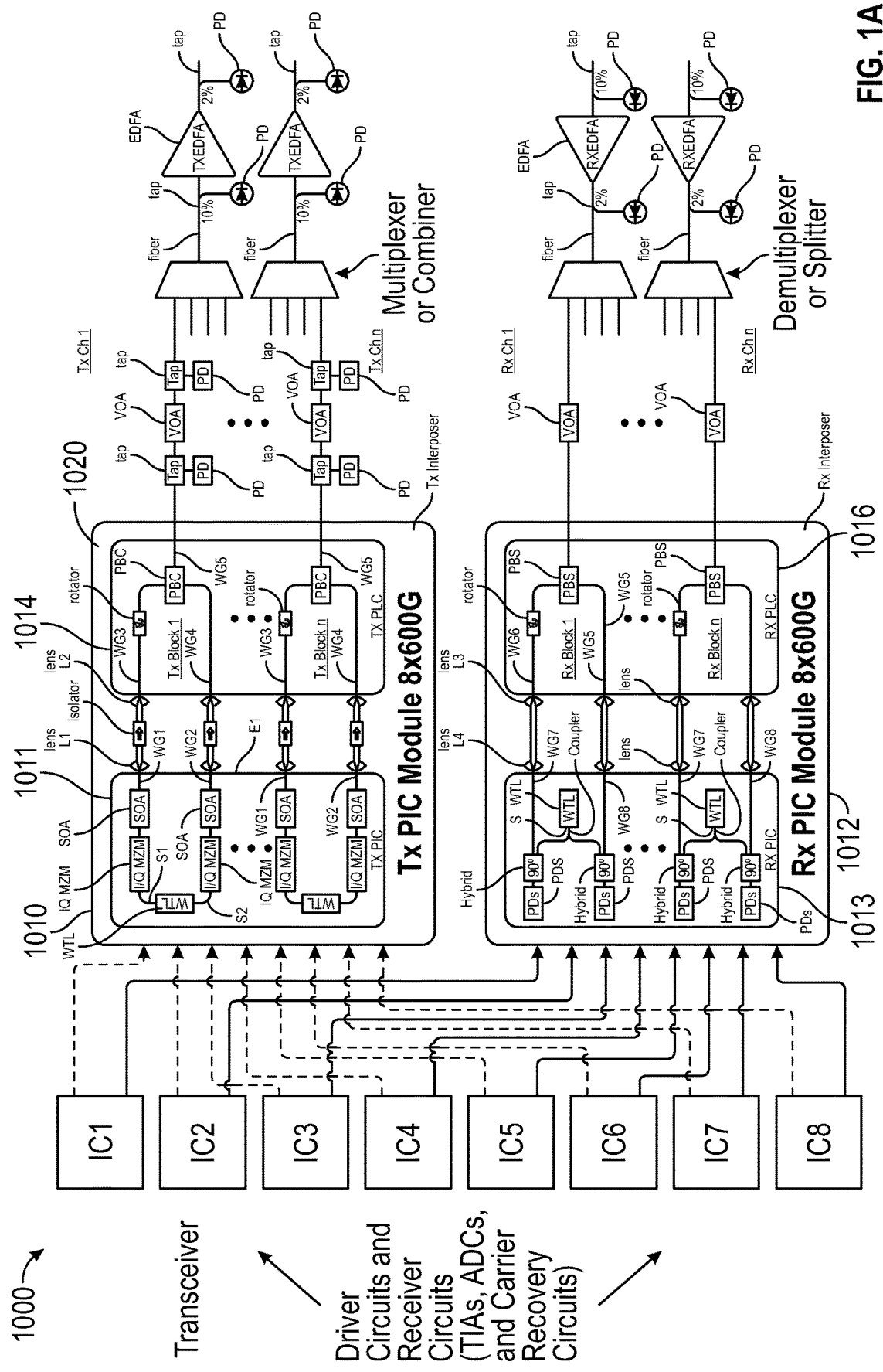
FIG. 1a shows a transceiver consistent with an aspect of the present disclosure.

FIG. 1*a* shows an example of a transceiver consistent with the present disclosure. In this example, the transceiver includes separate Tx (transmit) and Rx (receive) PICs provided in Tx (1010) and Rx (1013) modules. As noted above, however, the Tx and Rx PIC devices may be provided on one PIC substrate with a laser used as both an optical source and a local oscillator or with two separate lasers in the Rx and Tx portions of the transceiver PIC. The transceiver may include a plurality of transmitter channels Tx Ch1 to Tx Ch n. Tx Ch1 and Tx Ch n are shown in FIG. 1*a* as having the same or similar structure and including the same or similar devices. The modulated optical signal output from Tx Ch1, however, may have a first wavelength and the optical signal output from Tx Ch n may have a second wavelength different from the first wavelength. Moreover, each of optical channels Tx Ch1 to Tx Ch n supplies a corresponding one of a plurality of modulated optical signals, each having a corresponding one of a plurality of wavelengths.

A driver circuit, which may be provided in an integrated circuit (such as one of ICs IC1 to IC8), which may include an application specific integrated circuit (ASIC) or a digital signal processor (DSP) may provide radio frequency (RF) drive signals corresponding to the transmitted data to modulators provided in channel Tx Ch 1 on the Tx PIC. The modulators may receive light from a widely tunable laser (WTL). In addition, the modulators may include Mach Zehnder (MZ) modulators (labeled IQ MZM in FIG. 1) having a nested pair configuration in which a first nest pair of MZ modulators receives light output (a first portion of light output from laser WTL) from one side S1 or facet of the WTL and a second pair of MZ modulators receives light output (a second portion of light output from laser WTL) from the second side S2 or facet of the WTL.

A first MZ modulator of the first pair may modulate part of a first portion the received light from the first side S1 of the WTL in accordance with selected radio frequency (RF) drive signals to provide a first in-phase component of the modulated optical signal and the second MZ modulator of the pair may modulate another part of the first portion of the received light from the first side S1 of the WTL in accordance with other RF drive signals to provide a first quadrature component of the modulated optical signal. Similarly, light output from the second side S2, a second portion of the light output from the WTL, is modulated based on additional RF drive signals supplied to a second IQ MZM to provide second in-phase and quadrature components of another modulated optical in accordance with additional drive signals. As further shown in FIG. 1*a*, light output from each of IQ MZMs in Tx Ch 1 is provided to a corresponding optional semiconductor optical amplifier (SOA) to amplify such light and offset optical losses incurred during modulation and propagation along Tx Ch 1.

Light output from both sides of the WTL has a transverse electric (TE) polarization. In order to further increase capacity of the transmitted optical signal and to minimize interference between the outputs of the IQ MZMs, light output from the first IQ MZM is supplied from the Tx PIC on respective waveguides WG that extend to an edge of substrate 1011. Such light may be directed toward a waveguide on a planar lightwave circuit (Tx PLC) by a pair of lenses L1 and L2 (such as silicon lenses) and an isolator provided between the lenses. Len L1 may be a collimating lens and lens L2 may be a focusing lens that focuses the optical signals onto corresponding waveguides in Tx Block 1 to n of the Tx PLC (planar light wave circuit) on substrate 1014.

Both the Tx PLC and the Tx PIC may be provided on a third substrate or Tx interposer, which may also include a substrate made of silicon or a dielectric, such as silicon dioxide. The PLC may include a substrate made of silicon or a dielectric, such as silicon dioxide, and the devices provided on the PLC may be silicon-based. For example, as shown in FIG. 1*a*, a rotator may be provided on the Tx PLC to rotate the polarization of modulated light from the first IQ MZM from a TE polarization to a transverse magnetic (TM) polarization that is preferably orthogonal to the TE polarization. The TE polarization of light from the second IQ MZM, however, is maintained, and the TM polarized light is combined with the TE polarized light in a polarization beam combiner (PBC) provided on the Tx PLC. The PBC, in turn, provides a polarization multiplexed output having a first wavelength on a corresponding waveguide WG5. The WTL, IQ MZMs, SOA, isolator, lenses, rotator, and PBC may collectively be referred to herein as a Tx Block 1, which, as further shown in FIG. 1*a*, is part of Tx Ch 1. Tx Block 2 to n may have the same or similar structure as Tx Block 1 and may similarly provide corresponding polarization multiplexed outputs, each of which having a respective one of a plurality wavelengths. Thus, by polarization multiplexing the TE and TM signals, capacity can be increased compared to transmission of signals having a single polarization.

The rotators shown in FIG. 1*a* may be arranged in a first array and the polarization beam splitters may be arranged in a second array. In addition, the polarization beam combiners may be arranged in an array.

The output of the Tx Block 1 may be provided to a variable optical attenuator (VOA) to selectively attenuate the received polarization multiplexed optical signal to have desired power level. Optical taps provided at the input and output of the VOA may be provided to tap off a small portion of the received light and supply such portions to corresponding photodiodes. The photodiodes, in turn, convert the received light portions to corresponding electrical signals which are fed to additional circuitry that can monitor the power, for example, of light input to and output from the VOA.

Thus, FIG. 1a shows an optical device, such as module 1010 including substrate 1011 upon which the TX PIC may be provided. Substrate 1011 (also referred to as a PIC substrate or TX PIC substrate herein) may be made of a Group III-V material and may include indium phosphide (InP) or gallium arsenide (GaAs). Alternatively, substrate 1011 may include silicon. 2N (N being integer) outputs may be provided on the substrate 1011, each of which including a respective one of 2N waveguides (WG1 and WG2), each of the 2N waveguides (WG1 and WG2) carries a respective one of 2N optical signals, such that the 2N waveguides may be outputs of PIC substrate 1011. Each of the 2N optical signals including an in-phase component and a quadrature component, and each of the 2N waveguides extending to edge E1 of substrate 1011. N lasers (WTL) are also provided on substrate 1011, and each of first N waveguides (WG1) of the 2N waveguides being optically coupled to a respective one of the N lasers (WTL). Each of the first N waveguides WG1 supplies a first portion of the light generated by a respective one of the N lasers (WTL) and may be provided to a corresponding one of N semiconductor optical amplifiers (SOAs) via a corresponding modulator MZM IQ.

As further shown in FIG. 1a, each of second N waveguides (WG2) is optically coupled to a respective one of the N lasers (WTL), such that each waveguide WG2 supplies a second portion of the light generated by a respective one of the WTL lasers to a corresponding one of another group of N SOAs via a respective modulator MZM IQ.

Module 1010 further includes a second substrate 1014 having third N (N being equal to n above) waveguides WG3, each of which being optically coupled to a corresponding one of the first N waveguides WG1 via collimating lens L1, an isolator, and a focusing line L2. The third N waveguides WG3 are provided on second substrate 1020. In addition, fourth N waveguides WG4 are provided on substrate 1014. Each of fourth waveguides WG4 is optically coupled to a corresponding one of the second N waveguides WG2 via a corresponding collimating lens L1, an additional isolator, and a focusing lens L2. The fourth N waveguides WG4 are also provided on the second substrate.

Substrate 1014 may further include a plurality (N) polarization elements, such the rotators and associated polarization beam combiners (PBCs) shown in FIG. 1a. Each PBC has a first port optically coupled to a respective one of waveguides WG3, a second port optically coupled to a respective one of waveguides WG4, and a third port that connects to a corresponding fifth waveguide WG5.

Figure 1B:
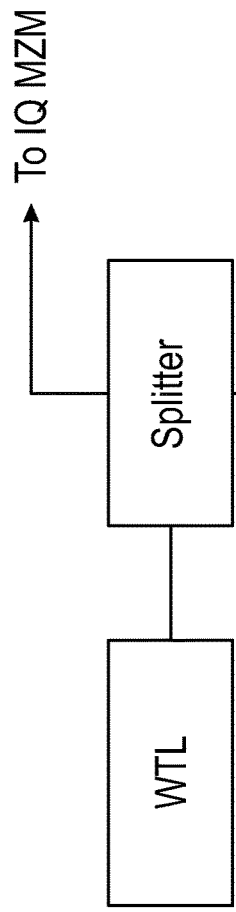

In the example shown in FIG. 1a, light output from sides S1 and S2 of each laser or WTL is modulated by a corresponding nested Mach-Zehnder modulator IQ MZM. As shown in FIG. 1b and consistent with an additional aspect of the present disclosure, however, light may be output from one slide of the laser (WTL) may be provided to a power splitter having first and second outputs. The first output supplies a first portion of the light output from the laser to a first IQ MZM and a portion of the light output from laser is provided from a second output of the splitter.

Each laser may be tunable. In one example, each of the N lasers is a widely tunable laser that is tunable over a 35 nm range of wavelengths between 1460 nm and 1625 nm. In another example, each of the N lasers is a widely tunable laser that is tunable over a 17.5 nm range of wavelengths between 1460 nm and 1625 nm. Alternatively, each laser may be a distributed feedback (DFB) laser that is tunable over a 2 nm range of wavelengths between 1460 nm and 1625 nm or a widely tunable laser having a grating.

Figure 1C:
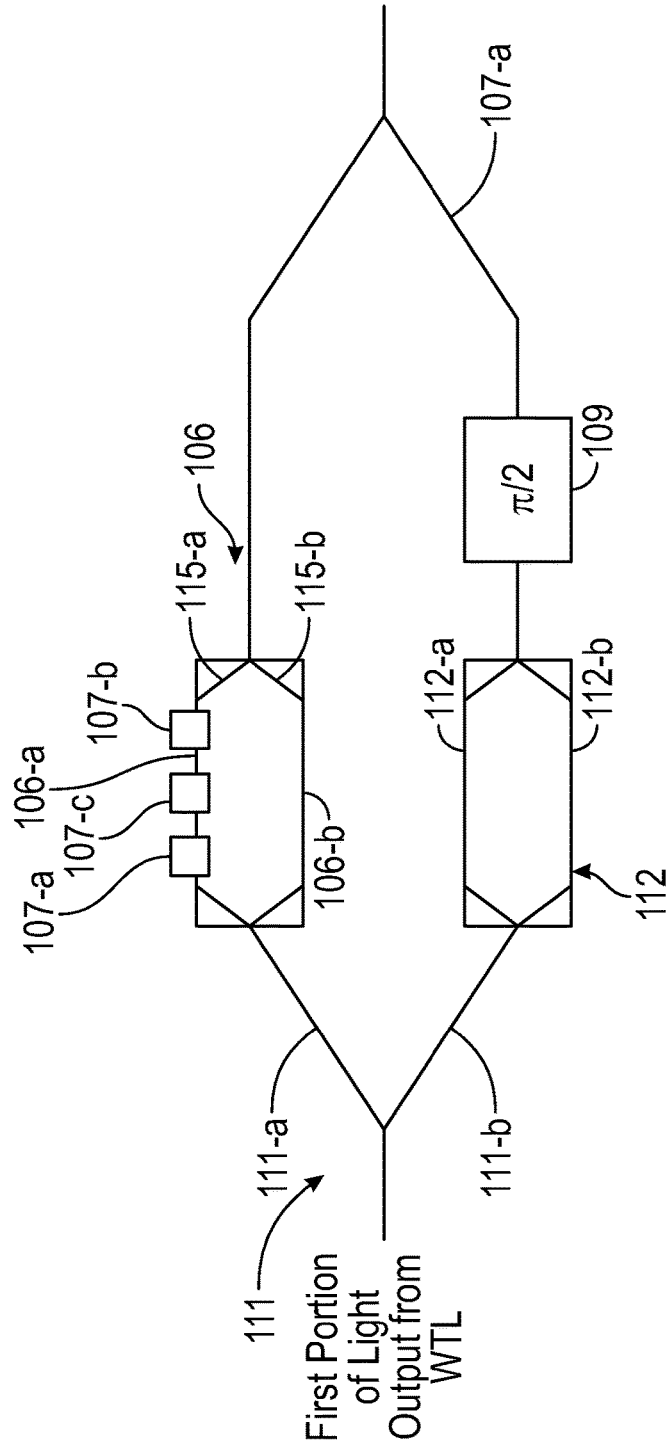
FIG. 1c shows an example of a modulator consistent with an aspect of the present disclosure.

As noted above, each of modulators MZM IQ may be a nested Mach-Zehnder modulator. FIG. 1c illustrates an example of a nested Mach-Zehnder modulator, which includes a pair of parallel connected Mach-Zehnder modulators 106 and 112. The pair 106,112 may receive a first portion of light output from a given laser (WTL). A second portion of light from the laser may be provided to a second nested Mach-Zehnder modular (IQ MZM) as further shown in FIG. 1a. Pair 106,112 may supply in-phase (I) and quadrature (Q) components of one of the first N modulated optical signals on one of waveguides WG1, for example. The second IQ MZM may supply I and Q components of one of the second N modulated optical signals supplied to one of waveguides WG2.

As further shown in FIG. 1c, a portion of the light output from one of the lasers (WTL) is provided to splitter 111 which supplies a first part of the light portion on waveguide 111-a to Mach-Zehnder modulator 106 and a second portion on waveguide 111-b to Mach-Zehnder modulator 112. Mach-Zehnder modulator 106 has first (106-a) and second (106-b) arms, and Mach-Zehnder modulator 112 has first (112-a) and second (112-b) arms. One or more of a phase adjuster 107-a, electrode 107-c, and amplitude adjuster 107-c may be provided along arm 106-a. One or more of these or similar devices may also be provided along one or more of arms 106-b, 112-a, and 112-b.

Phase adjuster 107-a may be provided to adjust a phase of light propagating in arm 106-a, and amplitude adjuster 107-b may be provided to adjust an amplitude or intensity of such light. Amplitude adjuster 107-b may be a variable optical attenuator, for example. Both phase adjuster 107-a and amplitude adjuster 107-b may be semiconductor devices having a p-i-n structure, for example. Electrode 107-c may be provided to apply an electric field to one or more portions of the waveguide that constitutes arm 107-a to thereby alter or change the refractive index of the waveguide. As a result, when the light propagating in arm 106-a combines in combiner 115 via with light propagating in arm 106-b, the combined optical signal may be phase and/or amplitude modulated in accordance with an I component of the modulated optical signal. Similarly, Mach-Zehnder modulator 112 supplies a component, but the output from modulator 112 is supplied to phase adjuster 109, which, in turn, adjusts the phase of the signal output from modulator 112 by 90 degrees. Accordingly, the output of phase adjuster 109 may be the Q component of the modulated optical. Both I and Q components are combined by combiner 131 and output as one of the first N modulated optical signal to one of waveguides WG1.

Returning to FIG. 1a, the outputs of each tap (located at downstream from a given variable optical attenuator (VOA) are provide to a combiner or multiplexer, which combines the outputs of each of channels Tx Ch1 to Tx Chn. The multiplexer may be an arrayed waveguide grating, for example. In the example, shown in FIG. 1a, a plurality of multiplexers may be provided, each of which being coupled to receive a corresponding group of channels. In another example, a single multiplexer may combine the outputs of each channel Tx Ch1 to Tx Chn. Each multiplexer output is coupled to a respective fiber, and each fiber may be coupled or connected to one or more erbium doped fiber amplifiers.

As further shown in FIG. 1a, received optical signals may be amplified by EDFAs having 10% and 2% monitoring taps at the input and output therefore, for example. The incoming optical fibers carrying these optical signals may be coupled to the inputs of a corresponding demultiplexer or power splitter. The demultiplexer may include an arrayed waveguide grating, for example. Each demultiplexer has a plurality of outputs, such that collectively, N (N is equal to n in the FIG. 1a) inputs or input fibers are provide to receiver PLC substrate 1016 in the example shown in FIG. 1a of Rx module 1012. Each fiber may carry one or more polarization multiplexed optical signals (e.g., N). A plurality, e.g., N polarization elements, such as polarization beam splitter (PBS) may be provided on substrate 1016. Each such PBS has a first output that supplies a TE component (itself an optical signal) to waveguide WG5 and a second output that supplies a TM component (itself also an optical signal) of a respective one of received polarization multiplexed optical signals (e.g., N polarization multiplexed optical signals). The TM component is provided to a corresponding one of a plurality (e.g., N) polarization rotators on substrate 1016. Each rotator rotates a polarization of the received TM component (optical signal) such that the signal output from each rotator has a TE polarization. The rotated optical signals are supplied to a corresponding one of waveguides WG6.

Respective waveguide WG6 supplies a corresponding one of the rotated optical signals (N such signals) to a corresponding one of waveguides WG7 (inputs, for example) via collimating lens L3 and focusing lens L4. Similarly, respective waveguide WG5 supplies a corresponding one of the TE optical signals (N such signals) to a corresponding one of waveguides WG8 via another collimating lens L3 and another focusing lens L4.

Waveguides WG7 and WG8 (inputs of the RX PIC substrate) supplies respective optical signals to corresponding optical hybrid circuits, which in this example are 90 degree optical hybrid circuits. Each optical hybrid circuit receives first and second power split portion of light output from a side S of a local oscillator laser (WTL). The first and second power split portions are provided from first and second outputs, respectively, of a coupler or splitter coupled to side S of the local oscillator laser WTL.

The received optical signals from waveguides WG7 and WG8 are mixed with light from local oscillator lasers (WTL) in the optical hybrid circuits. The optical hybrids, in turn, supply groups of mixing products to groups of photodiodes. In the example shown in FIG. 1a, N local oscillator lasers are associated with 2N optical hybrid circuits and 2N groups of photodiodes (PDs). The local oscillator lasers, optical hybrids circuits, and photodiode groups may be provided on substrate 1013 (also referred to herein as a PIC substrate or an RX PIC substrate), which may include a Group III-V material, such as InP or GaAs, or silicon. Substrate 101 may also be provided in module 1012 and both substrates 1013 and 1016 may be provided on an Rx interposer substrate, similar to or the same as Tx interposer substrate noted above.

The groups of photodiodes generate radio frequency (RF) signals that are fed to corresponding ones of integrated circuits (ICs) 1 to 8. The ICs may include known transimpedance amplifiers (TIAs), analog to digital converters (ADCs) and carrier recover circuitry.

Figure 1D:
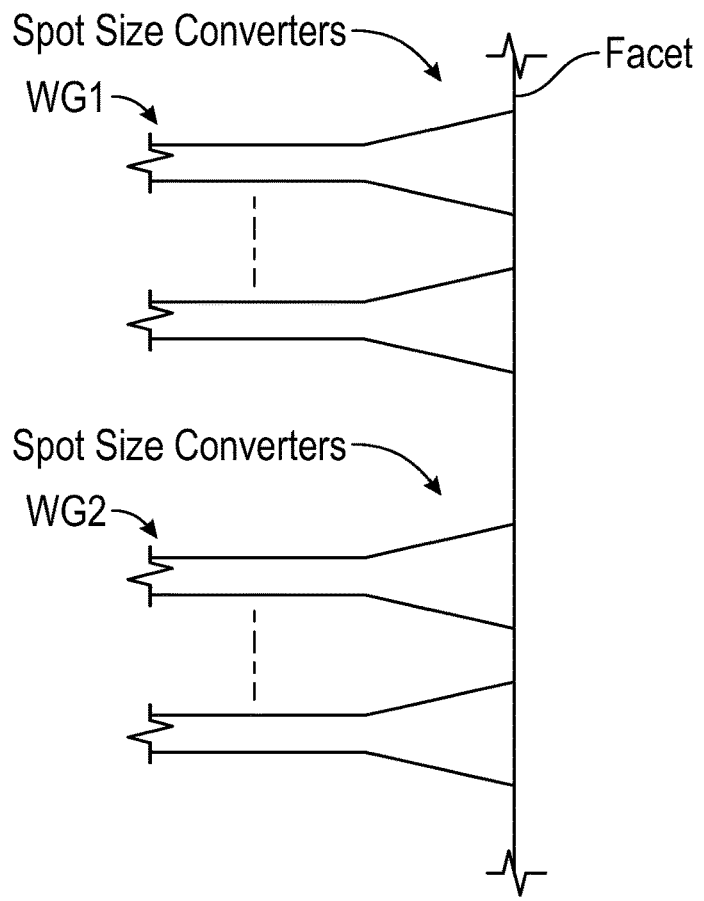
FIGS. 1d and 1e show examples of waveguide structures consistent with an aspect of the present disclosure.

In accordance with a further aspect of the present disclosure, a plurality of spot size converters or mode adapters may be provided as part of end portions of each of the above described waveguides. Such spot size converters are shown in FIG. 1d as being provided at end portions of waveguides WG1 and WG2 along the facet or edge of the TX PIC substrate. Spot size converters may similarly be provided as part of end portions of the other waveguides described herein adjacent or abutting the edge or facet of the PIC as well as other substrates described herein having waveguides provided thereon. Spot size converters may be provided to reduce the amount of diffraction of light that is emitted form the PIC, for example. Each of N spot size converters may be provided for each of N waveguides WG1 and each of N spot size converters may be provided for each of N waveguides WG2, for example.

Figure 1E:
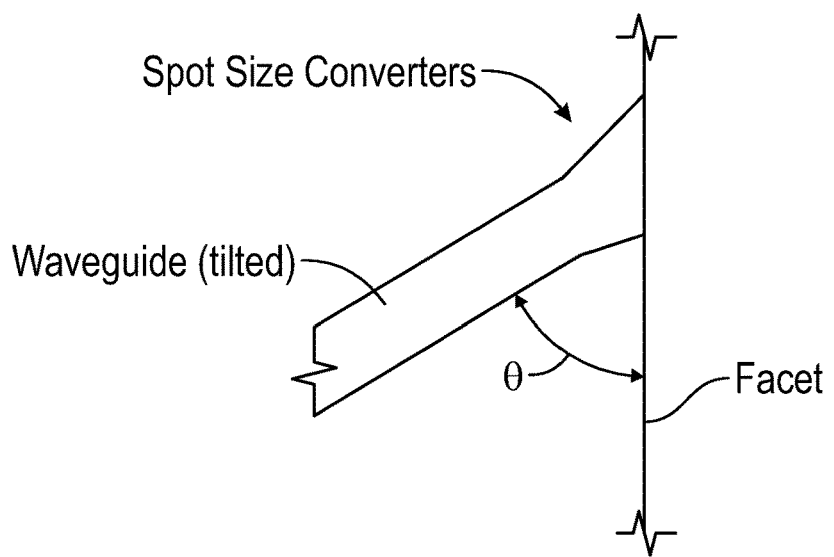

FIG. 1e shows an example in which one of the waveguides having a spot size converter is tilted at a non-perpendicular angle θ relative to a facet of the PIC substrate to minimize back reflections.

As further shown in FIG. 1a, each of the polarization rotators may be arranged in a first array and each of polarization combiners may be arranged in a second array.

As noted above, by omitting the multiplexer and demultiplexer in modules 1010 and 1012, the advantages noted above may be achieved.

Figure 2A:
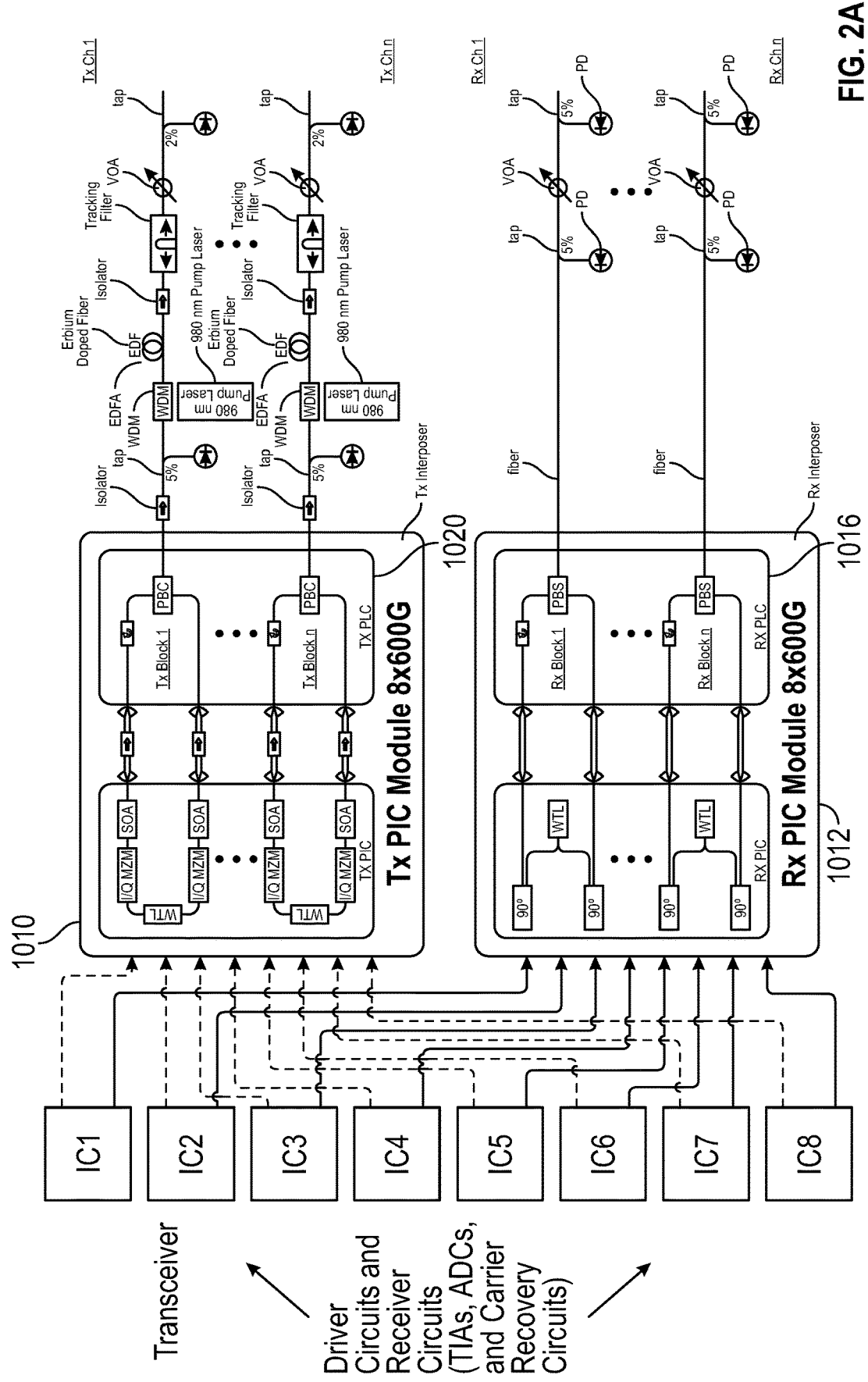
FIGS. 2a and 2b show additional examples of transceivers consistent with the present disclosure.
Figure 2B:
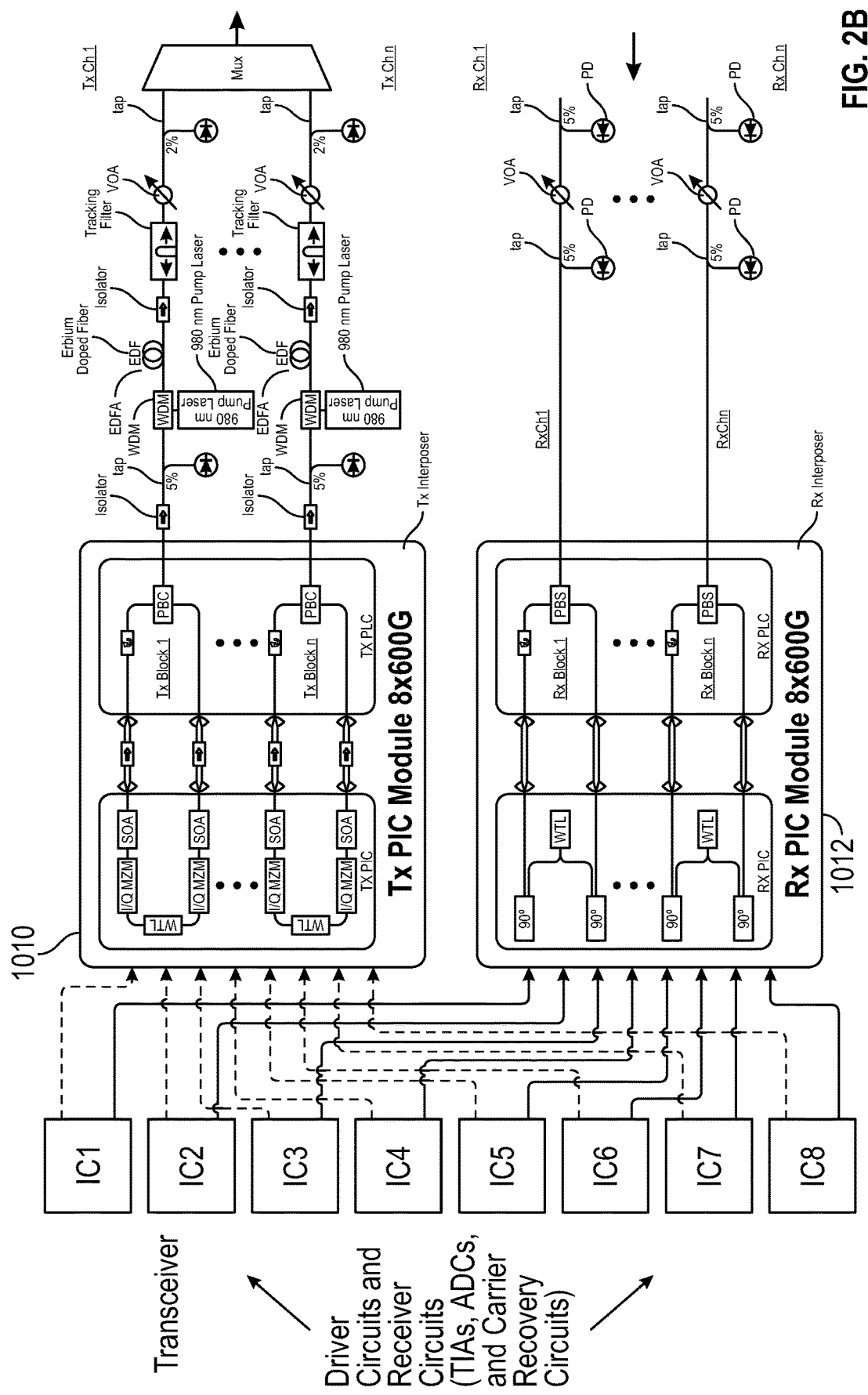

FIGS. 2A and 2B show a system including modules 1010 and 1012. As shown in FIGS. 2a and 2b, tracking filters, photodiodes, and VOAs are provided off the PLC substrate 1020. Consistent with the present disclosure, however, such devices may be included or integrated on the PLC substrate 1020, for example. That is, tracking filters and VOAs which may be made of silicon based materials may be well suited for integration on substrate 1020, which may also be silicon based. Other PLC devices, such as the rotator and PBC/PBS may also be silicon based. With respect to photodiodes, however, hybrid packaging may be provided in order to provide the photodiodes on the PLC substrate. Further, the PLC may be made from silicon photonics (SiP) type materials, which include waveguides having a core that is predominantly silicon based rather silicon oxynitride based. In that case, substrate 1020 may be a silicon photonics substrate having such waveguides with a silicon based core.

In the examples shown in FIGS. 2A and 2B, the multiplexer/combiner and demultiplexer/splitter are omitted. As noted above, by transmitting and receiving optical signals in separate channels, without multiplexing/demultiplexing on the PIC, ASE noise is reduced and LOSNR associated with the transmitted optical signal, as well as ROSNR associated with the received signal at the receiver, are increased. In addition, as further noted above, since the multiplexer may be omitted, as in FIG. 2a, optical signals output from each Tx Block may have more power than if such optical signals were multiplexed, as in FIG. 1a. Since the optical signal have more power and can reach the receiver with sufficient power, an EDFA that would otherwise boost optical power at the receiver is not required.

In FIG. 2a each transmit channel Tx Ch 1 to n in FIG. 2a includes, in addition to a corresponding Tx Block, an isolator and an erbium doped fiber amplifier (EDFA) including an erbium doped fiber (EDF), 980 nm pump laser that supplies pump light via a wavelength division multiplexer (WDM) to the EDF in a co-propagating fashion, for example. A monitoring diode and tap (5%) may also be provided at the input to the EDFA. The output of the EDFA may be supplied to an isolator (it is noted that in each instance herein, isolators may be provided in order to block or substantially reduce any back reflected light, which may interfere, for example, with the operation of the WTL lasers).

Optical signals output from the isolator may next be input to a tracking filter that is configured to filter light at wavelengths other than the optical signal wavelength in order to reduce ASE. That is the tracking filter, which may be tunable, has a bandpass that includes the wavelengths of one or more of the transmitted (i.e., modulated) optical signals. A VOA may then be provided to adjust the power of light output from the filter to a desired level and a monitoring tap (2%, for example) and photodiode may be provided at the output of the VOA. In each of the above examples, the attenuation of the VOAs may be adjusted based, at least in part, on the monitored power at the output of each such VOA.

As further shown in FIG. 2a, the EDFA amplifiers at the input to the receiver module 1012 may be omitted, thereby reducing costs and system complexity. However, VOAs may be provided with associated monitoring taps at the inputs and outputs thereof to adjust the incoming optical power to the receivers to a desired level on each incoming fiber.

The transceiver shown in FIG. 2b is similar to that shown in FIG. 2a, with the exception that a multiplexer is provided that combines the optical signals supplied from each of Tx Ch 1 to Tx Ch n. Such amplification and filtering, as noted above, prior to the multiplexer input may further improve optical signal to noise ratio (OSNR) performance, such that the OSNR is increased compared to optical signals that are not subject to such filtering an amplification.

Figure 2C:
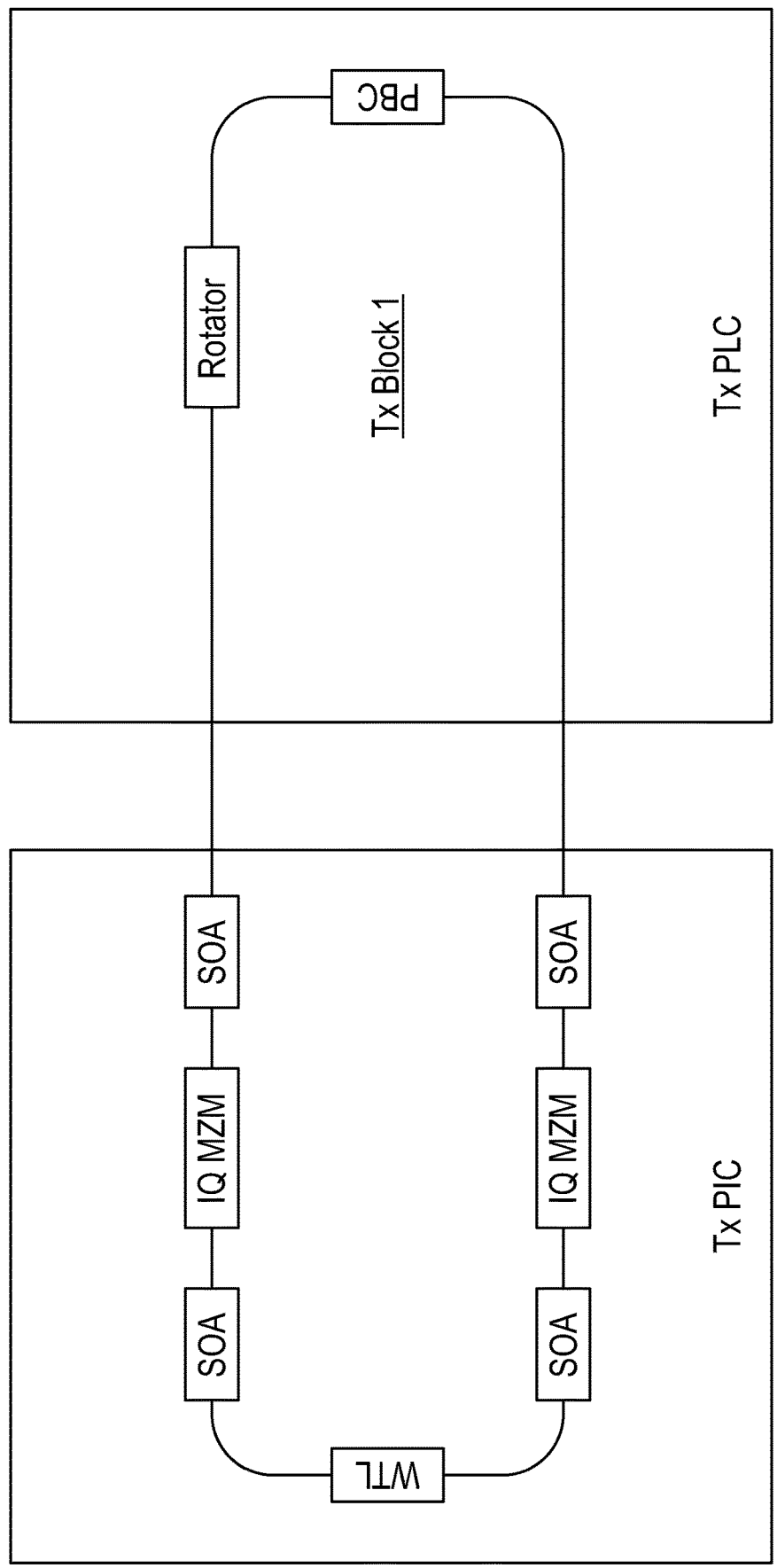
FIG. 2c shows an example of a transmitter block consistent with a further aspect of the present disclosure.

FIG. 2c shows an alternative configuration for Tx Block 1. It is understood that the remaining Tx Blocks 2 to n may have the same or similar structure as the example shown in FIG. 2c. Further, in order to simplify FIG. 2c, the lenses and isolator are not shown. Tx Block 1 shown in FIG. 2c is similar to that shown in FIGS. 1, 2a, and 2b, with the exception that an additional SOA is provided at the input to both IQ MZMs. By providing two SOAs for each polarization, i.e., each output of the IQ MZMs, the modulated optical signals may have sufficient power so that EDFAs, such as those shown in FIGS. 2a and 2b, may be unnecessary, provided that back reflections at the facets of waveguides WG1 and WG2, for example, can be sufficiently reduced.

Figure 3:
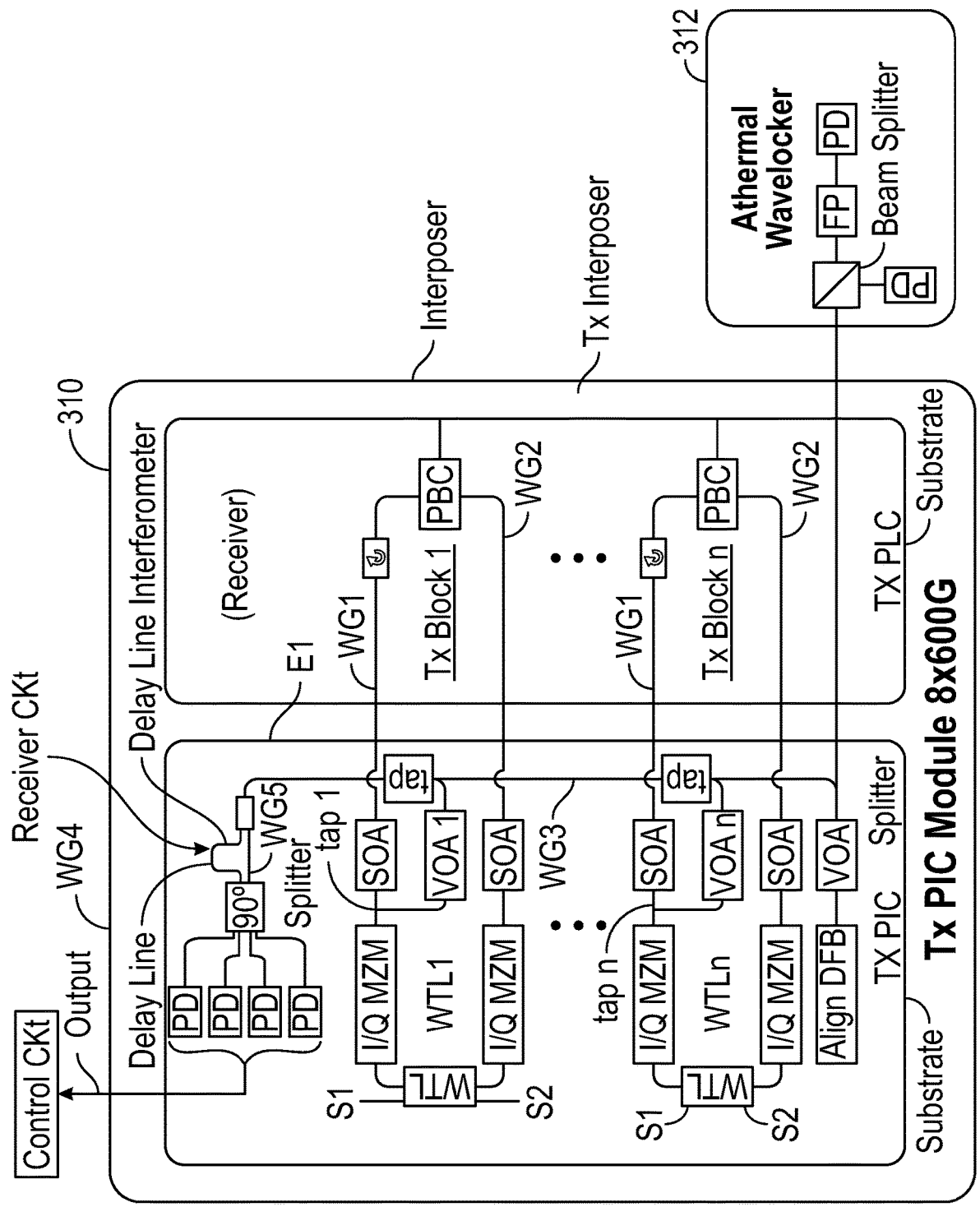
FIGS. 3, 4a, and 4b show examples of wavelength control circuitry consistent with an additional aspect of the present disclosure.

FIG. 3 shows an example of a transmit portion of a transceiver consistent with a further aspect of the present disclosure. Here, Tx Blocks 1 to N are similar or the same as the Tx Blocks discussed above in regard to FIG. 1a. However, additional circuitry is included for wavelength locking, i.e., adjusting the wavelength of each optical signals to a desired value. In particular, a laser, such as a distributed feedback (DFB) laser ("Align DFB") may provide a wavelength reference to which the wavelengths of the other optical signals may be adjusted. The Align DFB supplies light to a VOA that adjusts the power of such light to a desired level to permit accurate wavelength control. The light is then split with a first portion being provided to via a waveguide on the Tx PLC to a control circuit, such as an athermal wavelength locker including a beam splitter, Fabry-Perot etalon (FP) and first and second photodiodes to sense the light at the input and output of the etalon. Based on the outputs of the photodiodes, the wavelength of light output from the Align DFB may be controlled to a desired value.

A second portion of the light output from the Align DFB may be supplied to a receiver including delay line interferometer including a splitter, a first waveguide having an optical length longer (i.e., a delay line) than a second waveguide, and 90 degree optical hybrid. The wavelength of each optical signal may be locked individually. That is, in order to lock the wavelength of light output from WTL1, the VOAs associated with each of remaining lasers WTL2 to WTLn are controlled to effectively block light supplied from such remaining lasers. Accordingly, a portion of light output from WTL1 via a tap provided between a first IQ MZM and an SOA is supplied to a VOA (for power adjustment) and a second tap as an input to the Delay Line Interferometer. The delay line in conjunction with the 90 degree optical hybrid and splitter may generate mixing products indicative of the difference in wavelength between the Align DFB light and the light output from WTL1. Such mixing products are sensed by photodiodes, which generate electrical signals that are subject to further processing to generate control signals for adjusting the wavelength of light output from WTL1 so that the difference between that wavelength and the wavelength of light output from the Align DFB is a desired value. At which point, the wavelength of the WTL1 light may be locked. In a similar fashion, VOAs shown in FIG. 3 may be controlled to selectively block all but one of WTL1 to WTLn to supply light to the Delay Line Interferometer for wavelength locking. An advantage of the wavelength locker (WLL) circuitry shown in FIG. 3 is that, by multiplexing tapped portions of light output from each of WTL1 to WTLn fewer input/output (I/O) connections are made to the PIC, as opposed to a conventional approach in which a separate I/O connection may be provided for each WTL output. Moreover, in the Tx PIC shown in FIG. 3, the WLL is integrated such that the taps can be provided on the PIC substrate.

The Delay Line Interferometer has a 25 GHz free spectral range (FSR), which is indicative of the of the capture range of the wavelength locker.

VOA monitoring optical taps and photodiodes, as shown in FIG. 1a, may be also provided at the inputs and outputs of the VOAs shown in FIG. 3.

Further, the polarization of the TE and TM components of each optical signal may be monitored and adjusted or calibrated with per polarization VOAs and SOAs.

MZ modulator control may be achieved by further modulating optical signals output from the modulators with a low frequency tone and detecting those tones to isolate the modulation of an optical signal having a particular wavelength. Based on such tone monitoring, the modulators bias point, for example, may be adjusted or controlled. Such control may be achieved on a per wavelength or per optical signal basis.

Figure 4A:
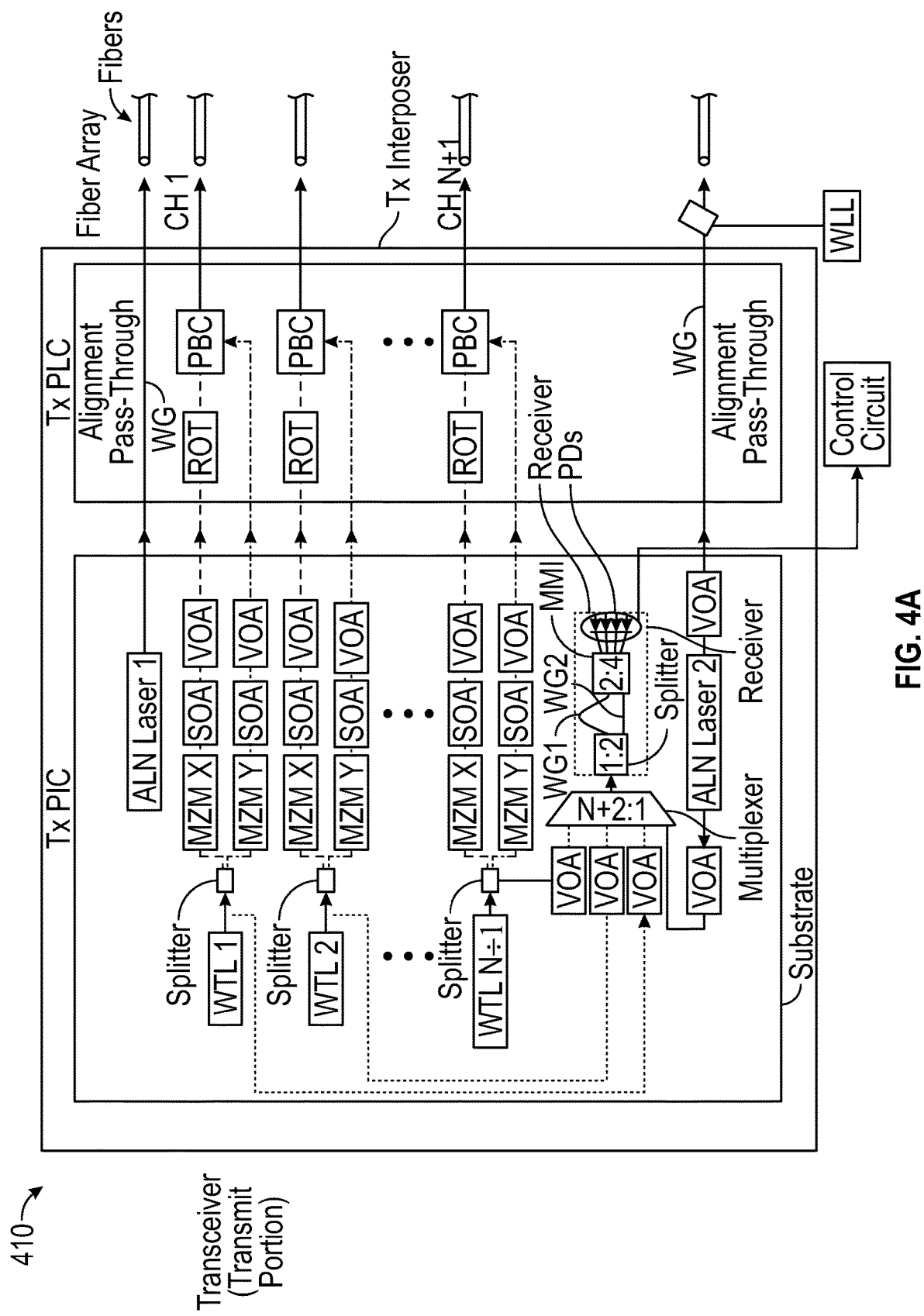
Figure 4B:
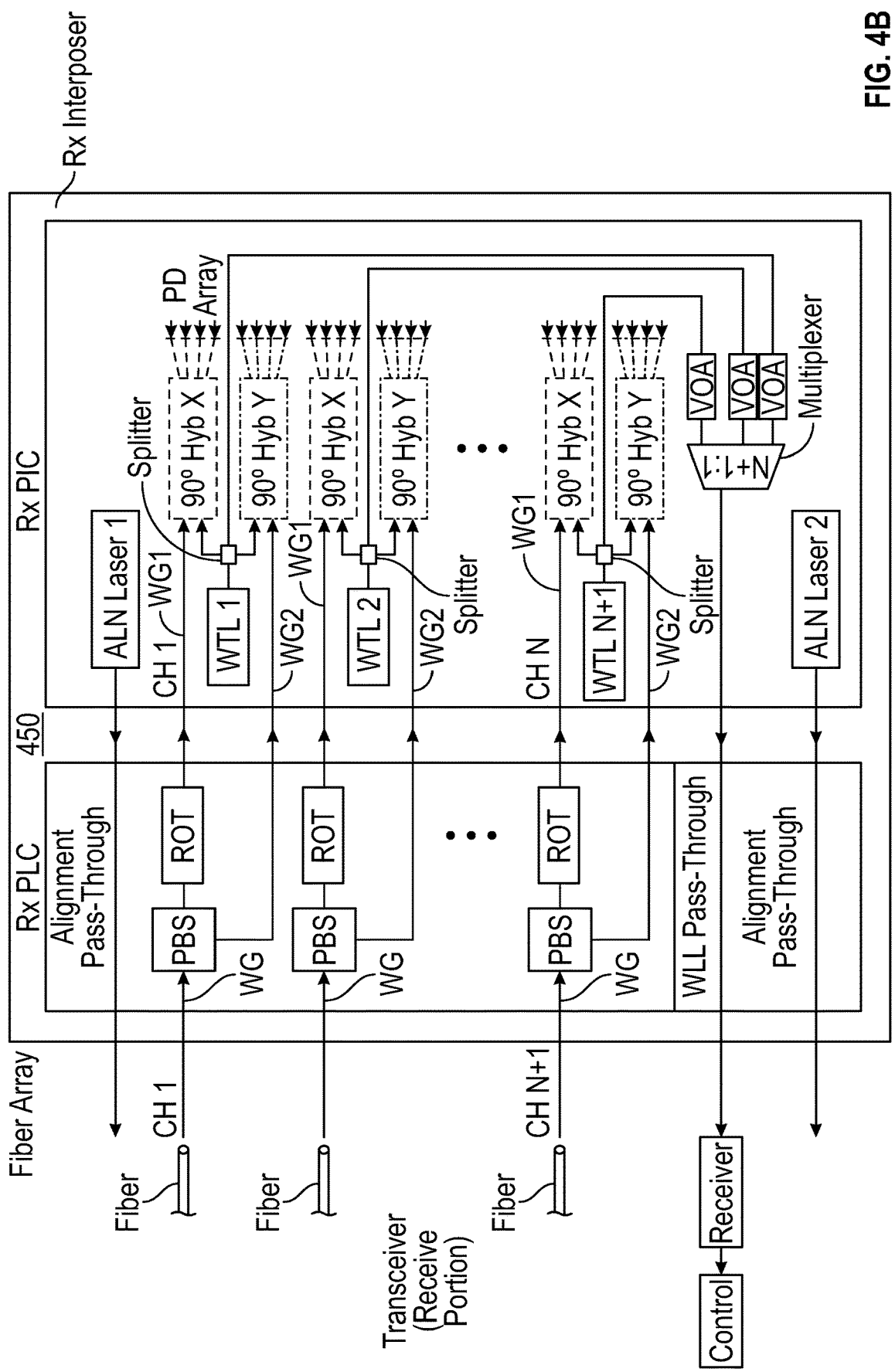

FIGS. 4a and 4b show block diagrams of a transmitter and receiver, respectively, consistent with a further aspect of the present disclosure. In particular, FIG. 4a shows optical splitters that receive light from one side of a corresponding WTL. Each splitter supplies a first portion of the received light to a first nested MZ modulator pair and a second portion to a second nested MZ modulator pair. In contrast, as noted above with respect to FIGS. 1a, 2a and 2b, light from opposite facets of each WTL is supplied to corresponding nest MZ modulator pairs. Further, first and second alignment lasers are provided to align the PIC with the PLC in both the transmitter (FIG. 4a) and receiver (FIG. 4b). Further, wavelength locking similar to that described above in connection with FIG. 3 can be carried out to adjust the wavelength of each WTL local oscillator laser in FIG. 4b.

In greater detail, FIG. 3 shows an optical device, such as module 310 including a substrate (TX PIC) with a plurality of lasers (WTL1 to WTLn) provided thereon. In addition, a first plurality of modulators IQ MZM are provided on the substrate that respective modulate a first output or first portion of light supplied from a first side S1 of each WTL, and a second plurality of modulators (IQ MZM) modulate a second output or second portion of light supplied from side S2 of each WTL. Module 310 further includes first waveguides WG1, each of which being optically coupled to a respective one of the first plurality of IQ MZM modulators, each of the plurality of first waveguides WG1 extending to edge E1 of the TX PIC substrate and being optically coupled to a respective one of the first plurality of IQ MZM modulators.

Module 310 also includes a plurality of second optical waveguides WG2, each of which being optically coupled to a corresponding one of the second IQ MZMs and receiving a second portion of light supplied from side S2 of each WTL. Each of waveguides WG2 also extending to edge E1 of the TX PIC substrate and being optically coupled to a respective one of the second IQ MZMs.

A plurality of taps (tap 1 to tap n) are provided on the TX PIC substrate. Each of the plurality of taps supplying a power split portion of each of a first plurality of optical signals supplied by a corresponding one of the IQ MZMs coupled to a side S1 of a respective WTL. A plurality of variable optical attenuators (VOA 1 to VOA n) are also provided on the substrate, and each receives a corresponding one of the power split portions from a corresponding one of the taps (tap 1 to tap n). The outputs of each VOA are fed by a combiner or tap to a third waveguide WG3, which in turn supplies the VOA outputs to a receiver circuit.

As noted above, in operation, each VOA is controlled, such that one VOA at any given time is controlled to pass the power split portion of light it receives to the WG3 and on to the receiver circuit, so that the VOAs selectively pass such light to the receiver circuit. Based on an outputs of the receiver circuit, a control circuit may adjust the wavelength of each WTL, for example by adjusting the temperature of a heater adjacent each WTL.

As further noted above, an alignment laser may be provided that supplies light to an additional VOA that selectively supplies light to a splitter or coupler having a first output coupled to waveguide WG3 (and on to the receiver circuit) and a second output coupled to an athermal wavelength locker 312 via an optical path that traverses the TX PLC substrate. Wavelength locker 312 may include a beam splitter and associated first photodiode, Fabry-Perot (FP) etalon and a second photodiode to lock alignment DFB in a known manner. The wavelength of the alignment DFB laser serves as a reference for the wavelengths of light output from each of the WTLs. Although a coupler is shown for supplying power split portion of the light output form the alignment laser to wavelength locker 312 and the receiver circuit, it is understood that light from opposing sides of the alignment laser may be supplied to wavelength locker 312 and the receiver circuit, respectively.

The receiver circuit includes a delay line interferometer, which includes a splitter having first and second output coupled to first ends waveguides WG4 and WG5, respectively. Waveguide WG4 has a longer length than WG5 and thus constitutes a delay line. Second ends of waveguides WG4 and WG5 are coupled to input of a 90 degree hybrid, for example, which may include a multimode (MMI) coupler. The 90 degree optical hybrid has a plurality of outputs (four in this example), each of which be coupled to a respective photodiode, which may be provided on the Tx PIC substrate.

Variations in wavelength cause each photodiode the receive different amounts of light. Accordingly, by detecting the photocurrent generated by each photodiode in the control circuit, the wavelength of each WTL laser may be monitored and adjusted, as noted above.

FIG. 4a, showing a transmit portion 410 similar to module 1010, will next be described in greater detail. Transmit portion 410 includes lasers WTL1 to WTL N+1, for example, each of which supplying light to a respective one of a plurality of splitters. Each splitter has three outputs, which supplying first, second, and third portions of the received light, respectively. the first and second portions of the received light are supplied to first (MZM X) and second (MZM Y) modulators, respectively, associated with a corresponding one of each laser (WTL1 to WTL N+1). A third portion of the output laser light is supplied to a respective one of a plurality of VOAs, which, in a manner similar to that discussed above in connection with FIG. 3, selectively supply the third portion of light from each WTL laser to an input of a multiplexer. The multiplexer, in turn, supplies the selected third portion to a receiver having a similar construction to that described above. Namely, the receiver shown in FIG. 4a includes a delay interferometer, having first (WG1) and second (W2) waveguides (WG1 being the delay line and being longer than WG2), a 2 input/4 output MMI coupler supplying outputs a plurality (e.g., four) photodiodes. In a manner similar to that discussed above, the photodiodes supply electrical signals to a control circuit, which, based on such electrical signals, controls or adjusts the wavelength of each of lasers WTL 1 to WTL N+1.

As further shown in FIG. 4a, an alignment laser (ALN laser 2) also supplies light via a VOA to an additional input of the multiplexer. ALN laser 2 may serve as a wavelength references, for controlling the wavelength of light output from the other lasers. An additional laser (ALN Laser 1) may also be provided, via a waveguide (WG) that passes across the TX PLC substrate to insure proper spatial alignment with fiber of a fiber array coupled to transmit portion 410. Light output from a second side of ALN Laser 2 may also be provided to a pass though waveguide WG to another fiber of the fiber array for similar spatial alignment or fiber coupling purposes. Both ALN laser 1 and ALN laser 2 may be a DFB laser.

In the example shown in FIG. 4a, light from opposite sides of ALN laser 2 is used for wavelength control and alignment purposes, respectively. However, a coupler or splitter may be provided that receives light from one side of ALN laser 2 to provide a first portion of the received light for alignment purposes and a second portion of the received light for wavelength control purposes. Such a splitter configuration is shown in FIG. 1b.

Further, light output (a first portion) from one side of each WTL in FIG. 4a may be provided to MZM X, for example, as shown in FIG. 1a. Light from the second side (a part of the light output from the WTL laser) may then be provided to a coupler or splitter, such as that shown in FIG. 1b with a first output of the splitter providing a second portion of the laser light to MZM Y, for example, and a third portion of the laser light to one of the VOAs shown in FIG. 4a.

In addition, a splitter may be provided to supply a portion of light output from ALN laser 2 on the pass through waveguide, for example, to a wavelength locker circuit (second control circuit) to control the wavelength of ALN laser 2 in a manner similar to that discussed above.

Turning to FIG. 4b, receiver module 450 will next be described in detail. Receiver module 450 is similar in structure and operation as receiver module 1012. For example, both receiver modules have waveguides feeding light to corresponding optical hybrid circuits, which also receiver light from corresponding local oscillators, and provide mixing products to groups of photodiodes. However, like transmitter module 410 shown in FIG. 4a, each local oscillator lasers (WTL1 to WTL N+1) supplies light to a corresponding one of a plurality of splitters. Each splitter, in turn, supplies a first portion of the received light to a corresponding one of first 90 degree optical hybrid circuits (90° Hyb X), a second portion to a corresponding one of second 90 degree optical hybrid circuits (90° Hyb Y), and a third portion to a respective one of a plurality of VOAs. Each of the first 90 degree optical hybrids is also coupled to a corresponding one of a plurality of first waveguides (WG1) and each of the second 90 degree optical hybrids is further coupled to a corresponding one of a plurality of second waveguides (WG2). Each first waveguide WG1 supplies a polarization rotated first optical signal output from a corresponding polarization beam splitter (PBS), and each second waveguide WG2 supplies a second signal from the corresponding PBS located on the RX PLC substrate in a manner similar to that described above.

Each VOA selectively supplies the third portion of light from each local oscillator WTL to a corresponding input of the multiplexer, and the multiplexer, in turn, provides the selected third portion to a receiver including a DLI interferometer and having structure similar to or the same as that described above for wavelength control. In the example shown in FIG. 4b, the receiver is located off the RX PIC substrate, but may also be provided on the substrate as in FIG. 4a.

Moreover, in the example shown in FIG. 4a, light from one side of ALN laser 2 is used for wavelength control and alignment purposes. A coupler or splitter may be provided that receives such light from one side of ALN laser 2 to provide a first portion of the received light for alignment purposes and a second portion of the received light for wavelength control purposes. Such a splitter configuration is shown in FIG. 1b. It is understood, however, that light from both sides of ALN laser 2 may be used for alignment and wavelength control purposes, respectively, as in FIG. 4a.

Further, as in FIG. 4a, light output (a first portion) from one side of each WTL may be provided to 90° Hyb X, for example, as shown in FIG. 1a. Light from the second side (a part of the light output from the WTL laser) may then be provided to a coupler or splitter, such as that shown in FIG. 1b with a first output of the splitter providing a second portion of the laser light to 90° Hyb Y, for example, and a third portion of the laser light to one of the VOAs shown in FIG. 4b.

In addition, a splitter may be provided to supply a portion of light output from ALN laser 2 on the pass through waveguide, for example, to a wavelength locker circuit (second control circuit) to control the wavelength of ALN laser 2 in a manner similar to that discussed above. Also, light from ALN laser 1 may be passed across the Rx PLC in a manner similar to that discussed above in connection with FIG. 4a for spatial alignment or to align each fiber of the fiber array with waveguide (WG) input to each PBS. Further, it is understood that receiver module 450 may be commonly housed with transmit module 410 or provided on a common interposer substrate as in FIG. 1a.

In each of the above-described embodiment, the elements that provide the optical outputs of the TX PIC or provide optical inputs to the RX PIC are formed on a PLC substrate. Consistent with the present disclosure, free space optics (FSO) including lenses, polarization rotators, PBCs, PBSs, and isolators may be provided as bulk or individual devices which are not integrated on a substrate. Various FSO configurations will next be described with reference to FIGS. 5-44 to provide polarization multiplexed optical signals to/from optical fibers, such as an array of fibers. In the foregoing description, it is understood that the RX and/or TX PICs described above in connection with FIGS. 1a, 1b, 1c, 2a, 2b, 2c, 3, 4a, and 4b may be employed in each of these FSO configurations.

Figure 5:
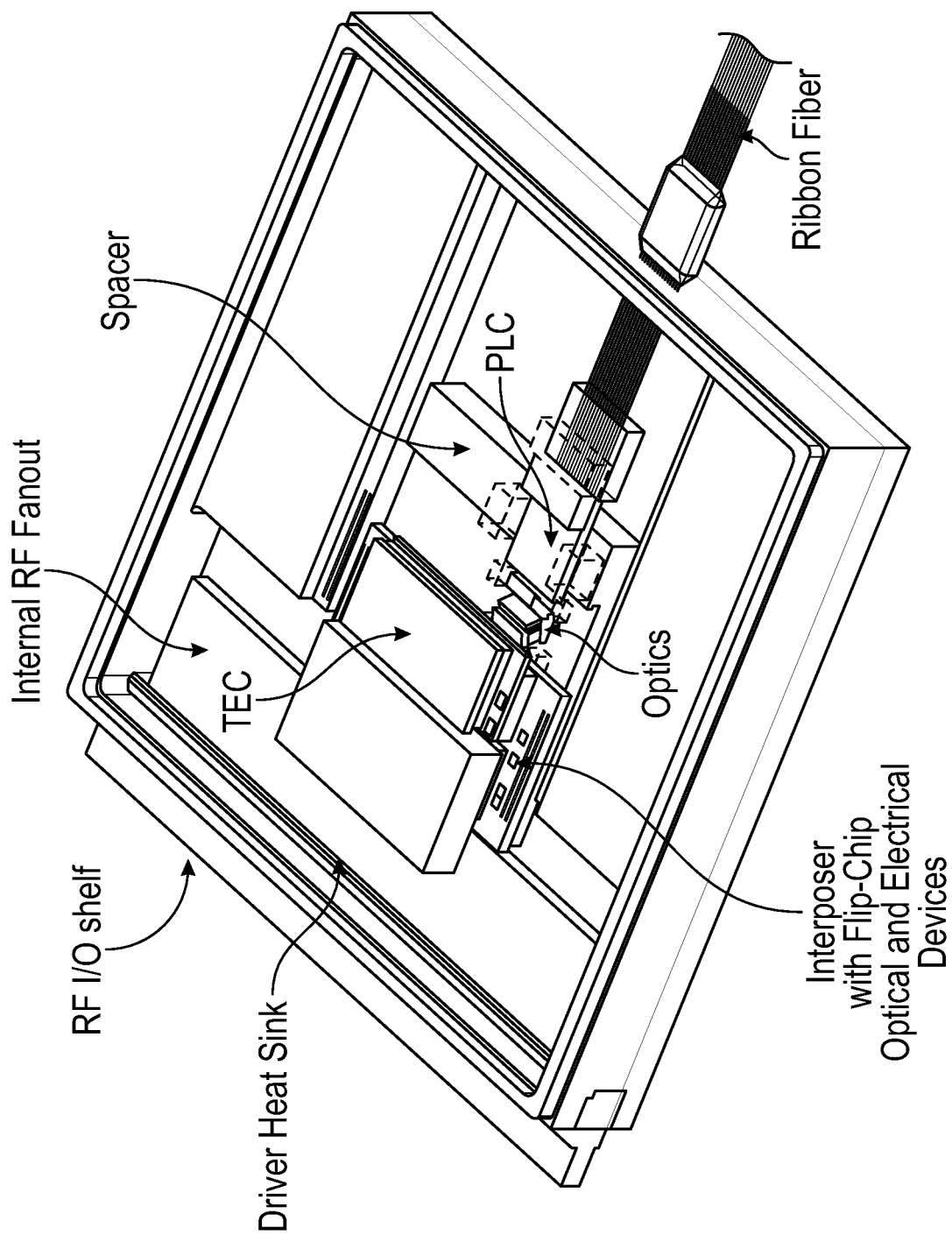
Figure 6:
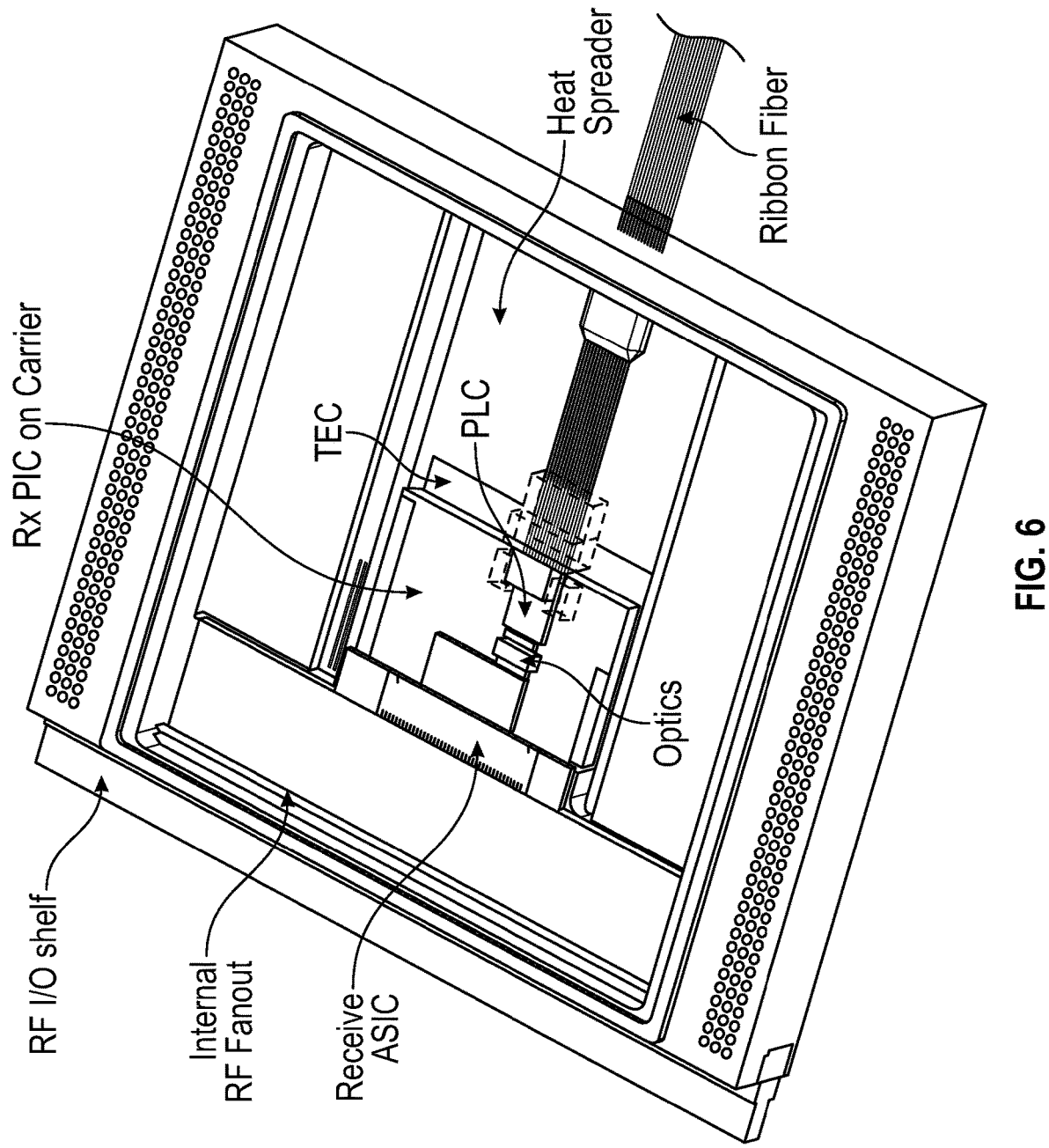

In FIGS. 5 and 6, drive signals (Tx) and data carrying signals (Rx) for example, are provided along a side opposite the side that optical signals are output from the PIC ("180° handedness"). In addition, a high temperature co-fired ceramic (HTCC) may employed as the package material and electrical connection to the PIC may be provided on a low temperature co-fired ceramic. As further shown in FIG. 5, each optical signal is supplied to a corresponding optical fiber in the ribbon fiber cable. In this example, the ribbon fiber cable may include nine fibers.

Further, in FIG. 5, the Tx PIC may be flip-chip or flip-chip compression bonded to the interposer. It is understood, however, that the Rx PIC may also be bonded to the interposer, for example, as shown in FIG. 1a. The Rx PIC may also be flip-chip or flip-chip compression bonded to the interposer. In addition, in the example shown in FIG. 5, only the Tx PIC is bonded to the interposer. However, both Tx and Rx PICs may be bonded to the same interposer or to respective interposers in a transceiver package. Further, a transceiver PIC having both Tx and Rx circuits, such as the transceiver PIC noted above, may be attached, by, for example, flip chip bonding to an interposer.

Figure 7:
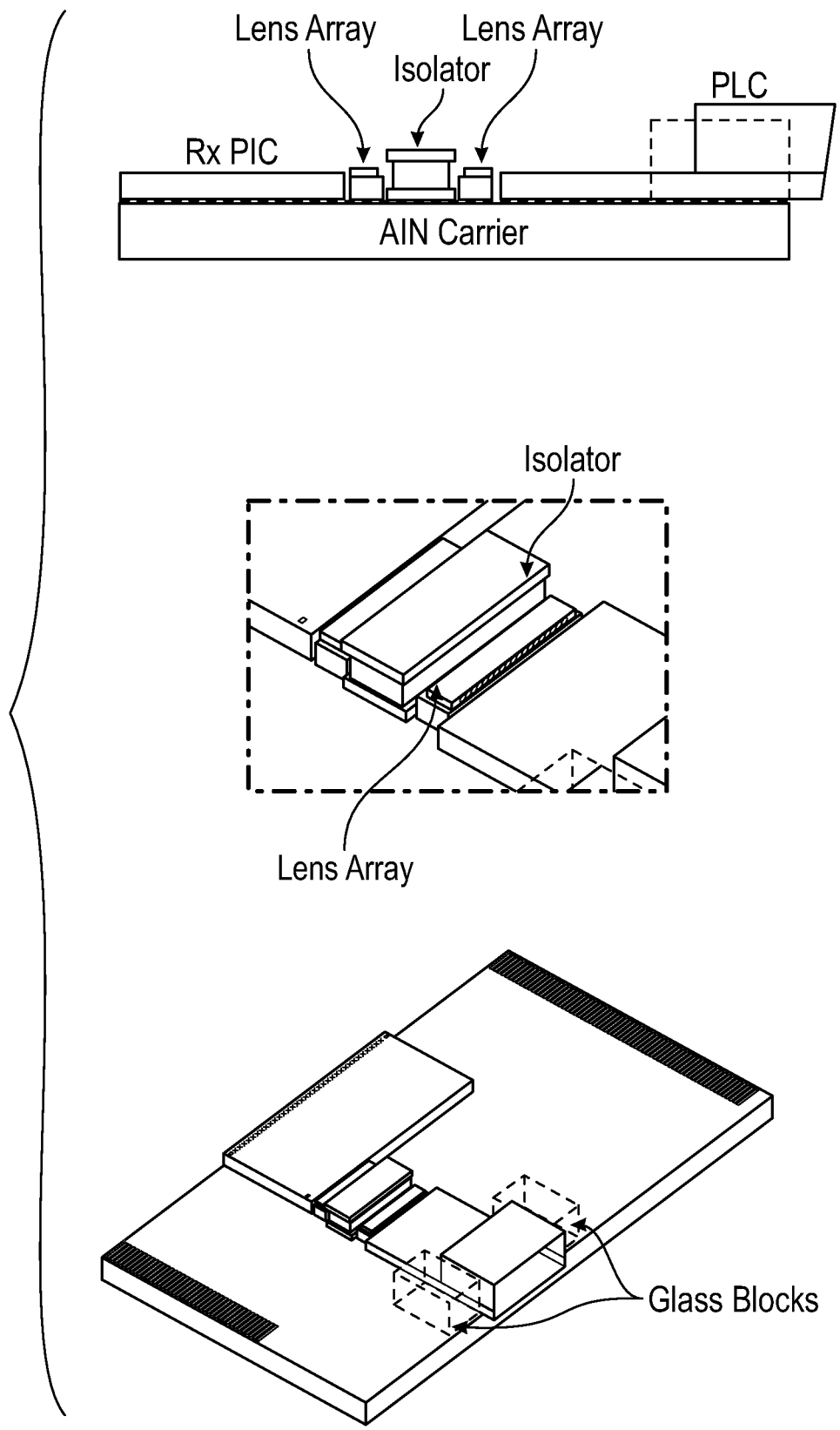

FIG. 7 shows detailed plan and cross-sectional views of a package housing a receiver. In this example, the edge of the RX PIC that receives optical signals from the PLC is angled so as to minimize back reflections that may interfere with operation of the WTL local oscillators. In addition, the lens array shown in FIG. 7 may correspond to the lenses discussed above. Here, the lens array is mounted on a carrier or substrate. The configuration shown in FIG. 7 permits "interleaved TE and TM waveguides" in which waveguides on the PIC and PLC are paired, and one waveguide of each pair carries TE polarized optical signals and the other waveguide of each pair carries TM polarized optical signals. Other features of FIG. 7 are noted in the drawing.

FIG. 8 shows an example of a transmitter package including an angled PIC facet for reduced back reflections, a lens array for coupling between the PIC and PLC, and an isolator before the PLC (with a wedge after the isolator to permit a horizontally mounted PLC). Other features of FIG. 8 Fig. are noted in the drawing.

Figure 9:
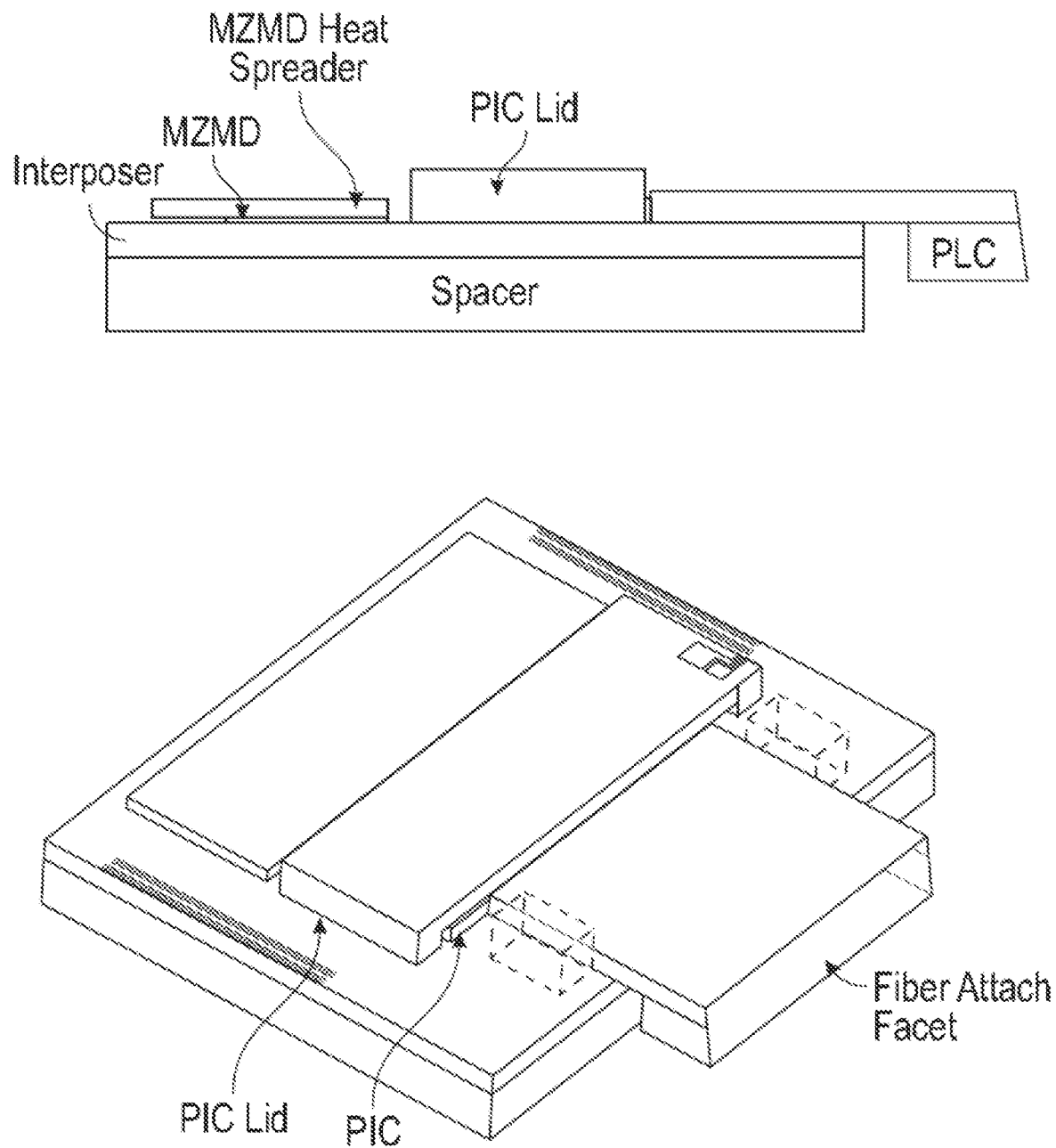

FIGS. 9 and 10 illustrate transmitter packaging examples in which the lenses are omitted, and light is coupled from the PIC to PLC by direct coupling or butt coupling. In FIG. 9, the optical fibers carrying optical signals generated by the PIC are oriented such that end segments of the fibers are straight or form a 180 degree angle with a direction at which optical signals are output from the PIC. In FIG. 10, however, the optical fiber segments are oriented at a 90 degree angle, for example, to further minimize back reflection. Other angles, however, are contemplated herein.

Figure 11A:
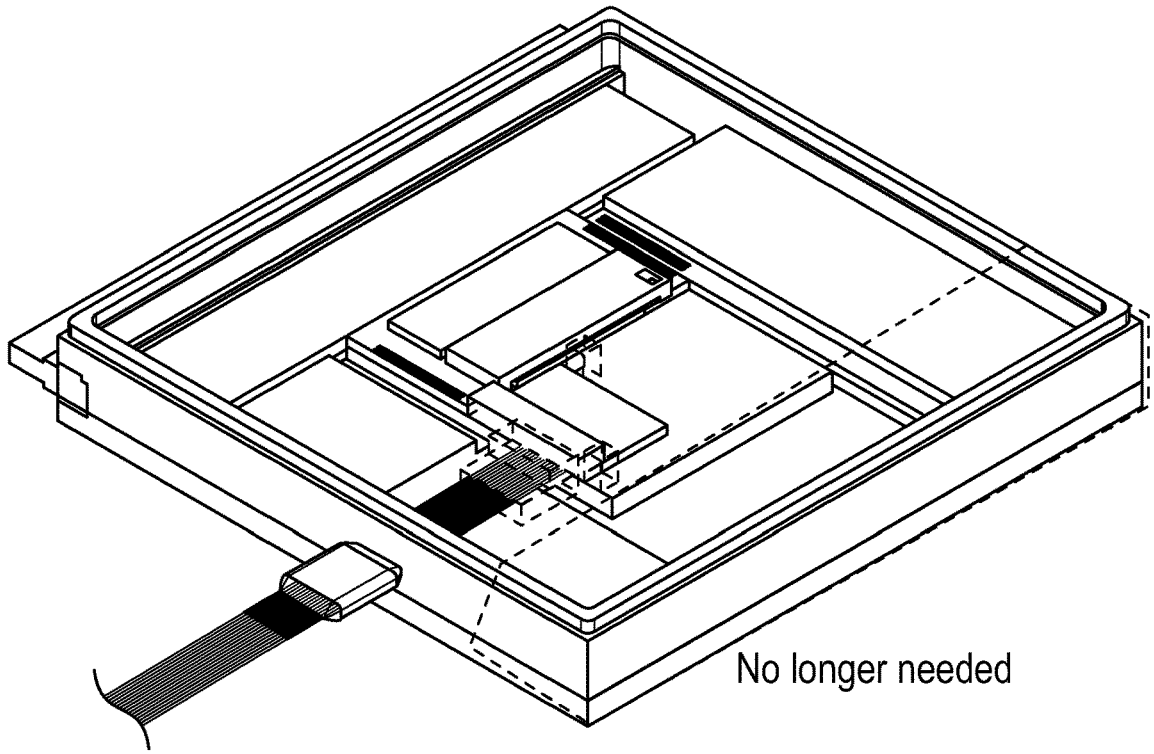
Figure 11B:
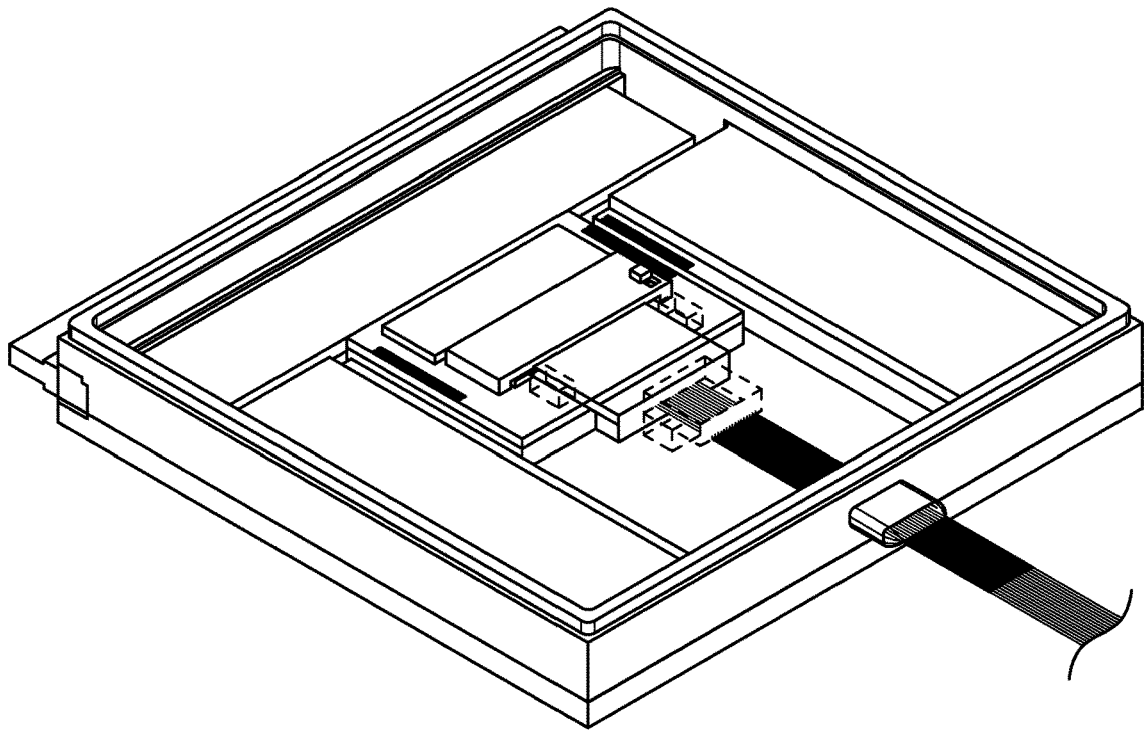

Alternative package configurations are shown in FIGS. 11a and 11b in which optical fibers are supplied through a side of the package (FIG. 11a) that is oriented 90 degrees relative to the output signal direction form the PIC, as well as through a side of the package (FIG. 11b) whereby the optical fibers extend parallel to and form a 180-degree angle with the optical signal output direction.

FIG. 12 shows various transmitter packaging configurations and views in which the PIC and PLC are directly attached to one another or butt joined.

Figure 13:
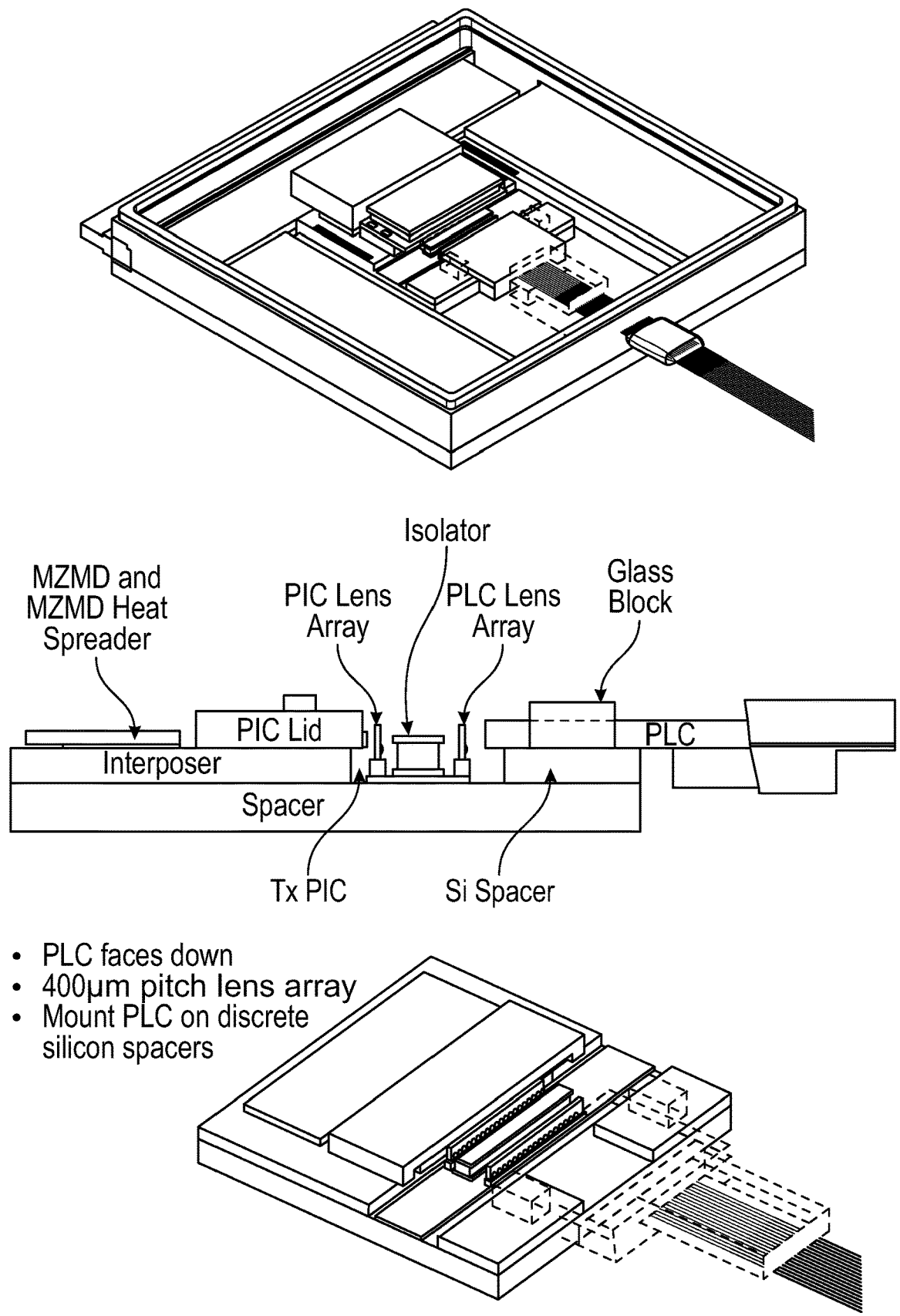

FIG. 13 shows cross-sectional and perspective view of packages in which lens arrays are provided adjacent the PIC and the PLC to optically couple optical signals from the PIC to the PLC in the transmitter.

Figure 14:
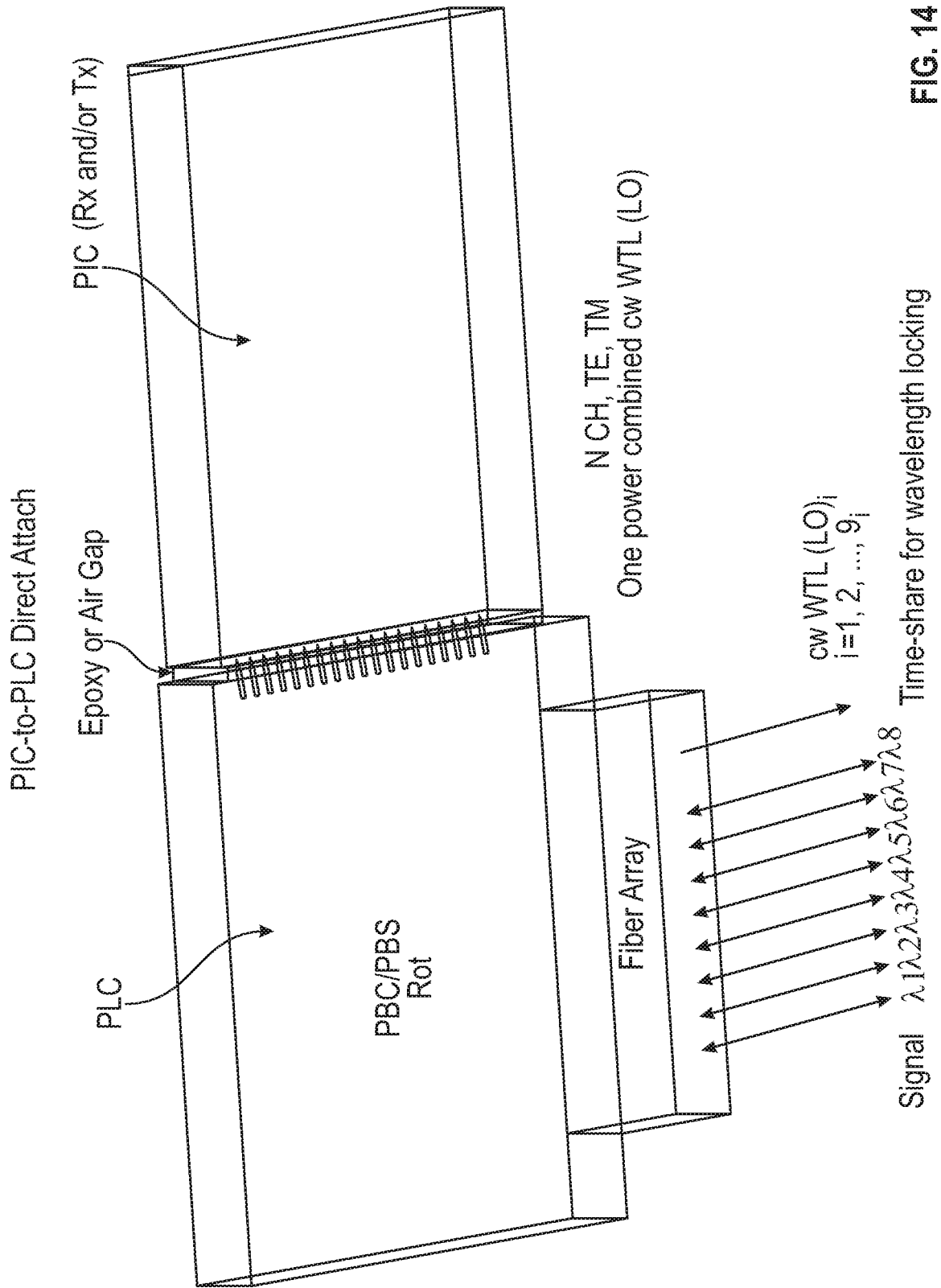

FIG. 14 shows an alternative view of a fiber array supplying optical signals at a 90-degree angle relative to a PIC output/input direction. Here, the PIC and PLC may be coupled to one another with an epoxy or the optical signals may pass through an air gap.

Figure 15:
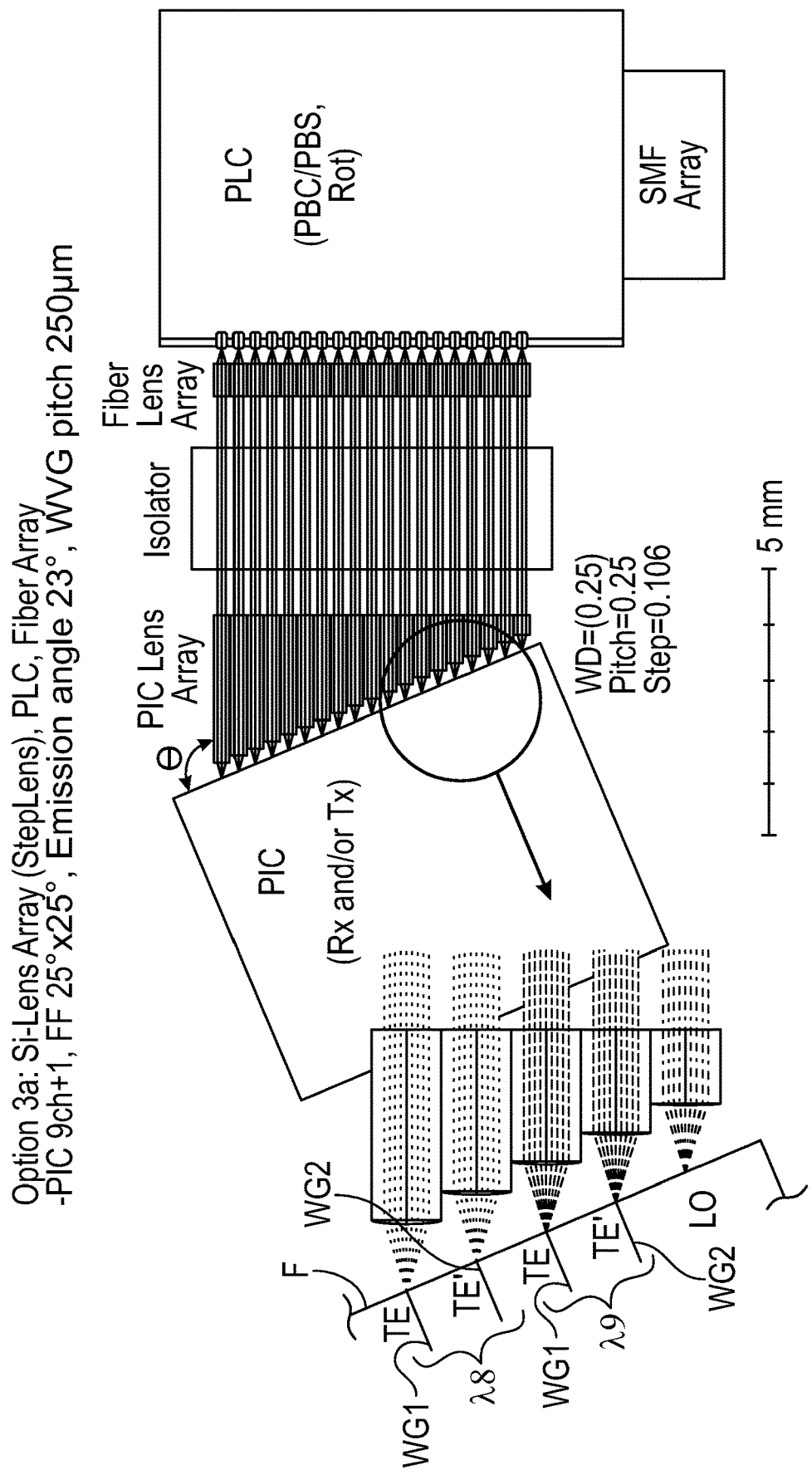
FIGS. 15-35 show various examples of free-space optics configurations consistent with an aspect of the present disclosure.
Figure 16:
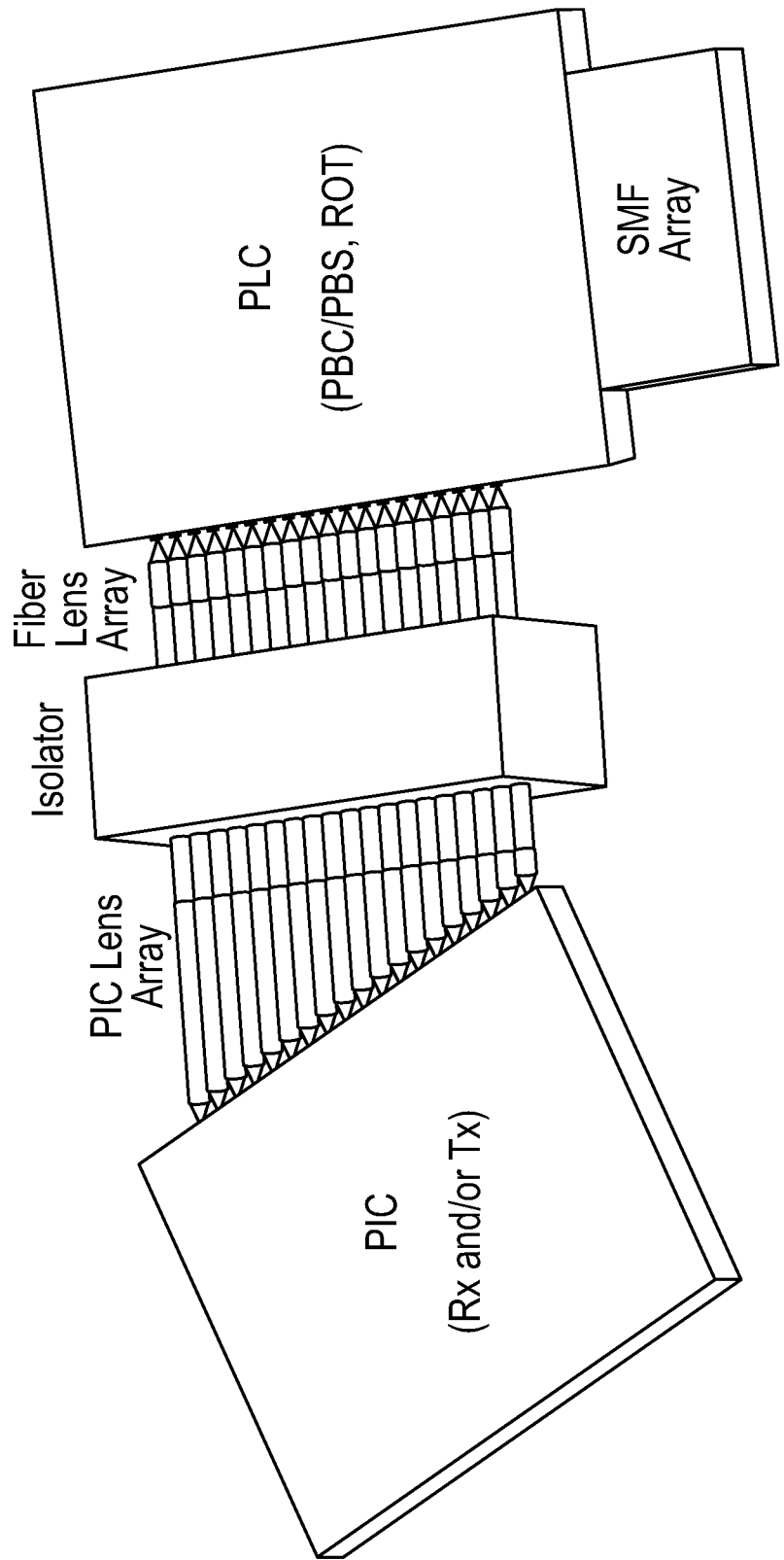

FIG. 15 is a plan view of transmitter or receiver that shows details of an exemplary lens array. Here, stepped lenses may be employed to direct light from the PIC to the PLC or from the PLC to the PIC. In this example, the far field angle of light output from the PIC is 23 degrees and emission angle is 23 degrees to minimize back reflections. The pitch between adjacent waveguides is preferably less than or equal to 1 mm and preferably less than 600 microns, and in this example, is 250 microns. FIG. 16 shows perspective view of the transmitter or receiver shown in FIG. 15.

Figure 17:
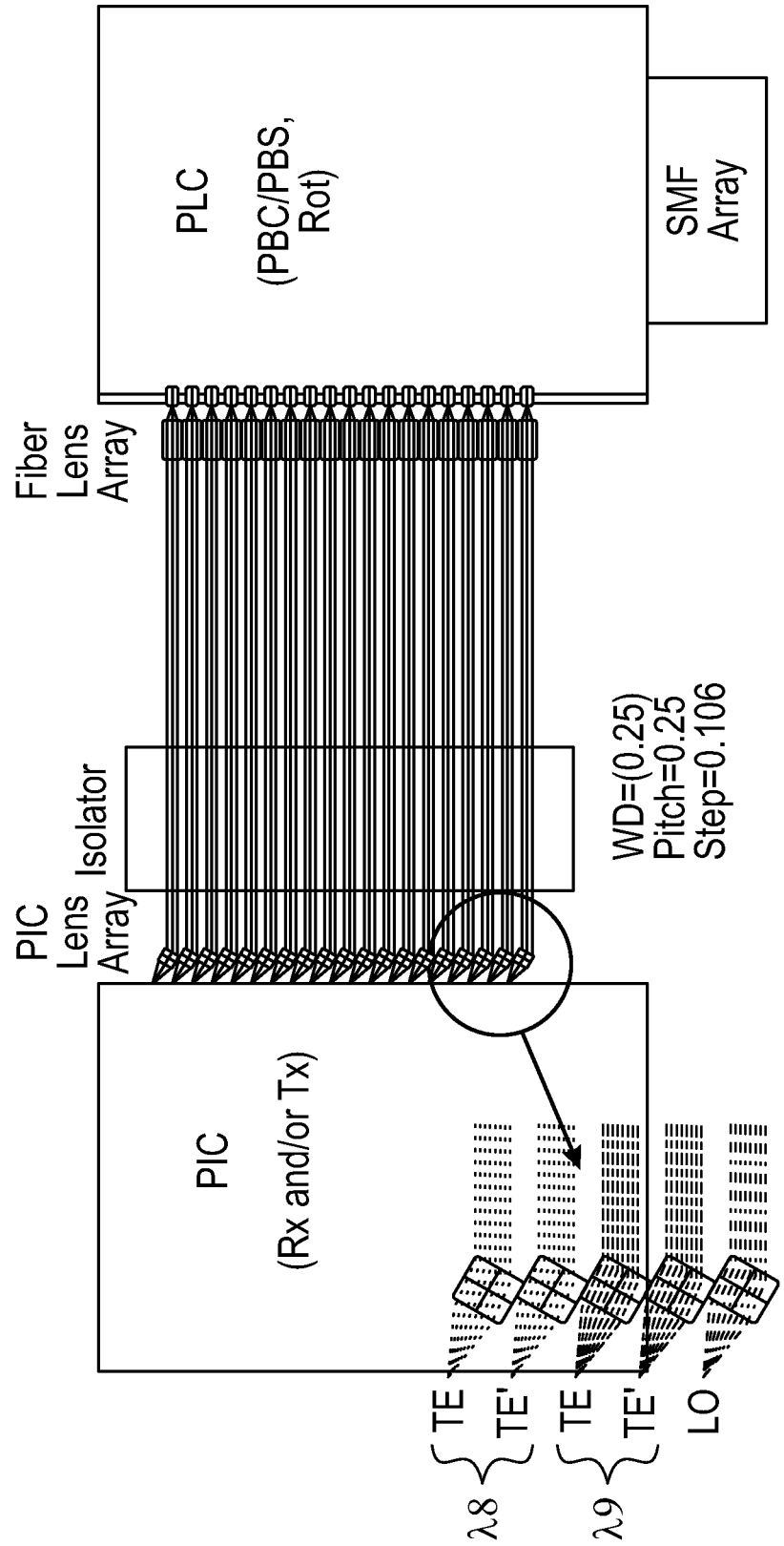
Figure 18:
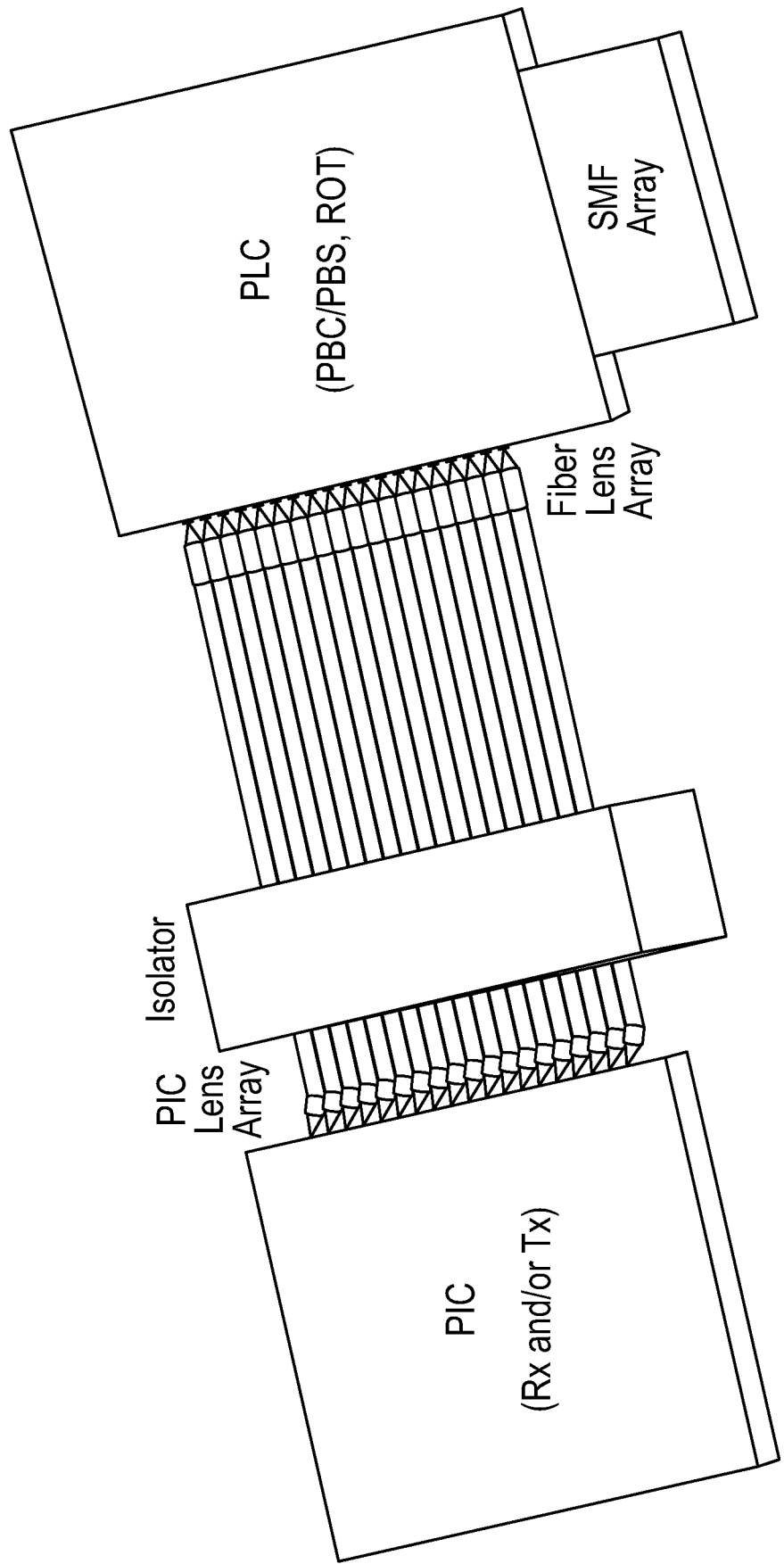

FIG. 17 shows an alternative configuration in which the PIC is not oriented at an angle relative to the PLC, but the emission angle is maintained at 23 degrees. FIG. 18 shows a perspective view of the configuration shown in FIG. 17.

Figure 19:
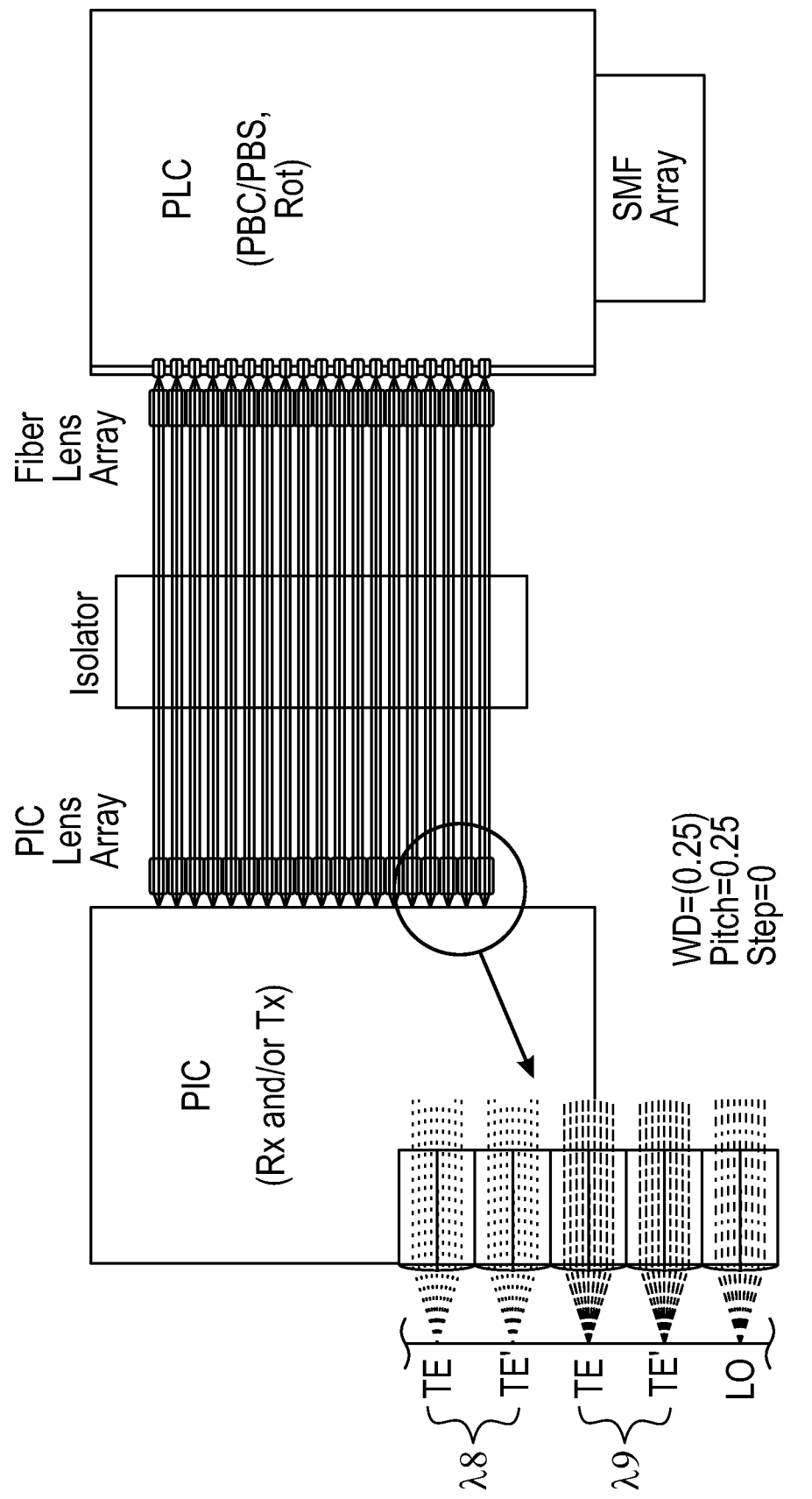
Figure 20:
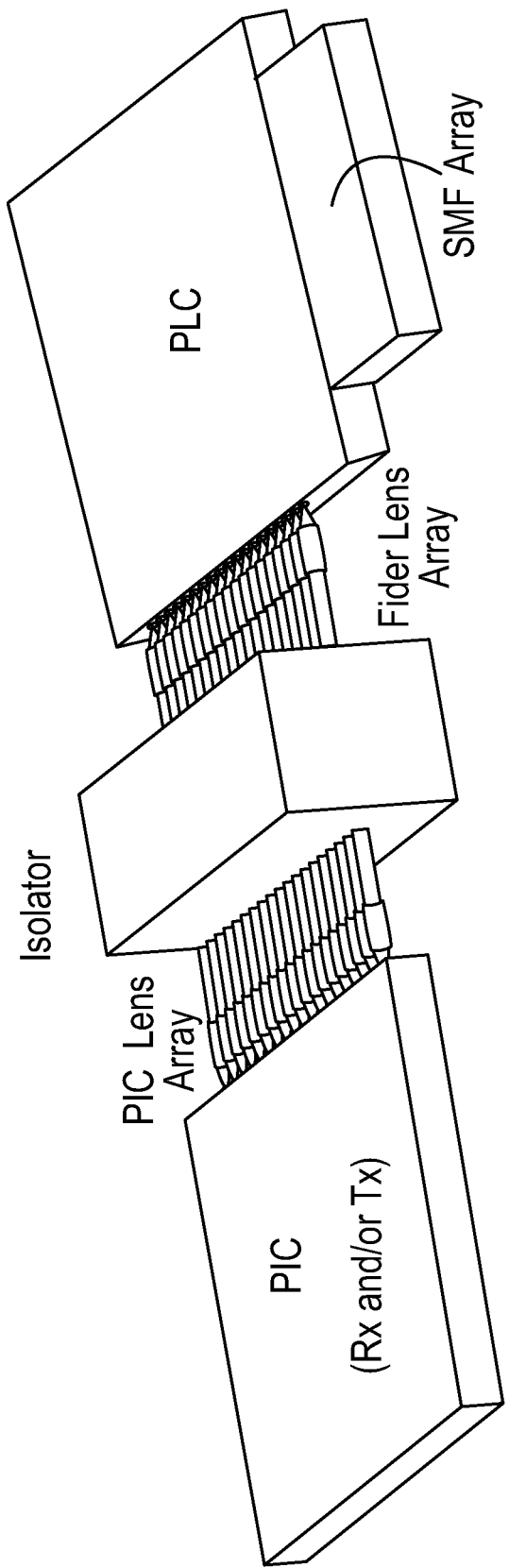

FIGS. 19 and 20 show plan and perspective view of an alternative arrangement in which the emission angle from the PIC is zero degrees and the far field angle is 25 degrees.

Figure 21:
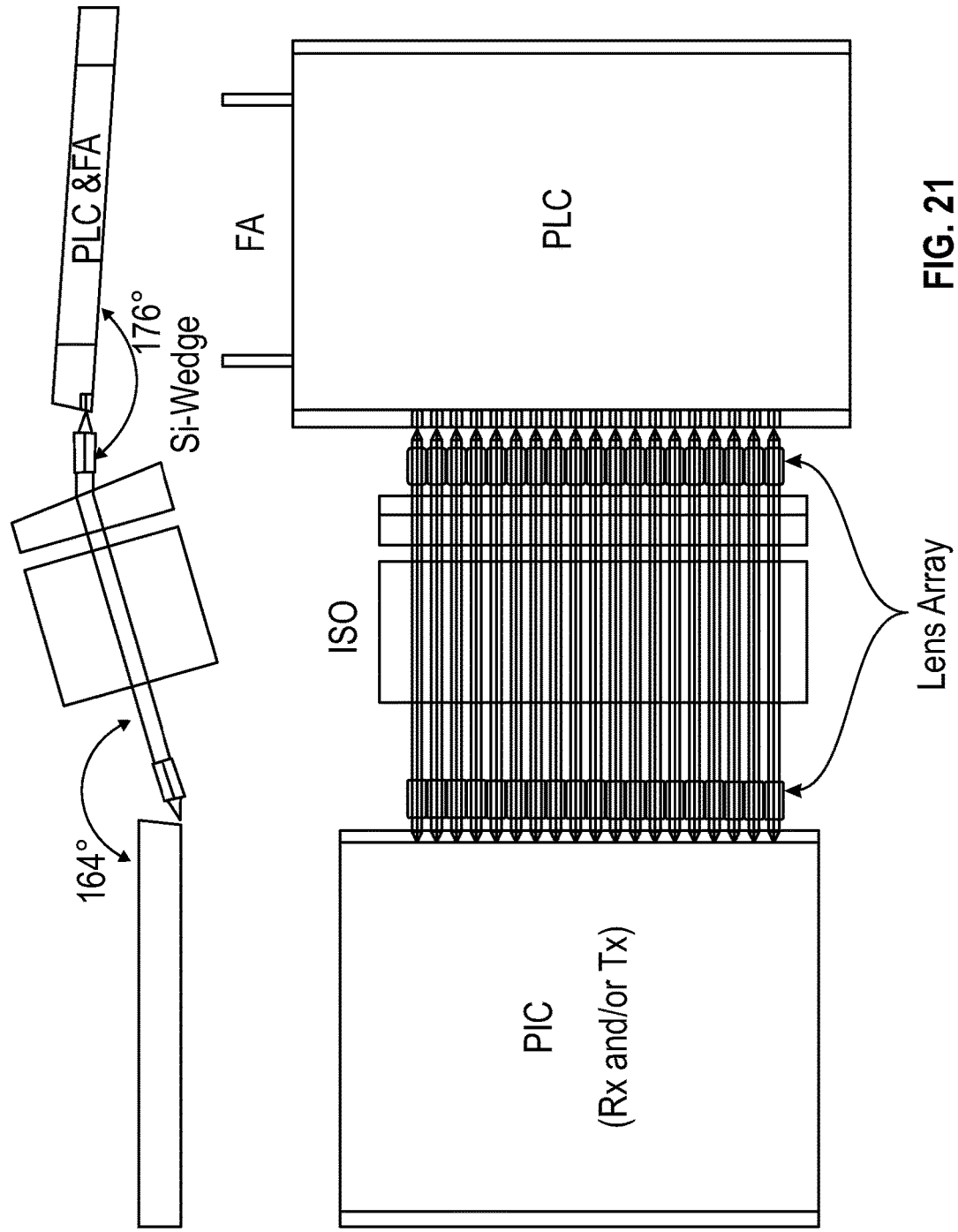
Figure 22:
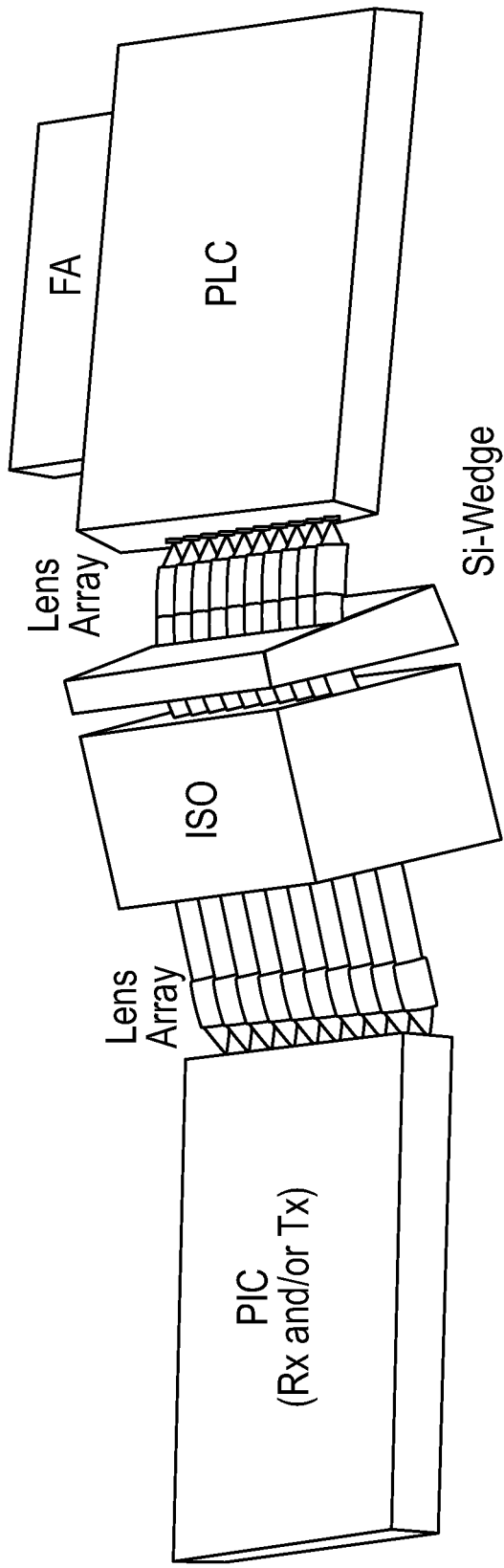

FIGS. 21 and 22 show plan and perspective view of another exemplary arrangement in which the lens array directs light outside the plane of the PIC (upward and out of the paper in the lower drawing in FIG. 21).

Figure 23:
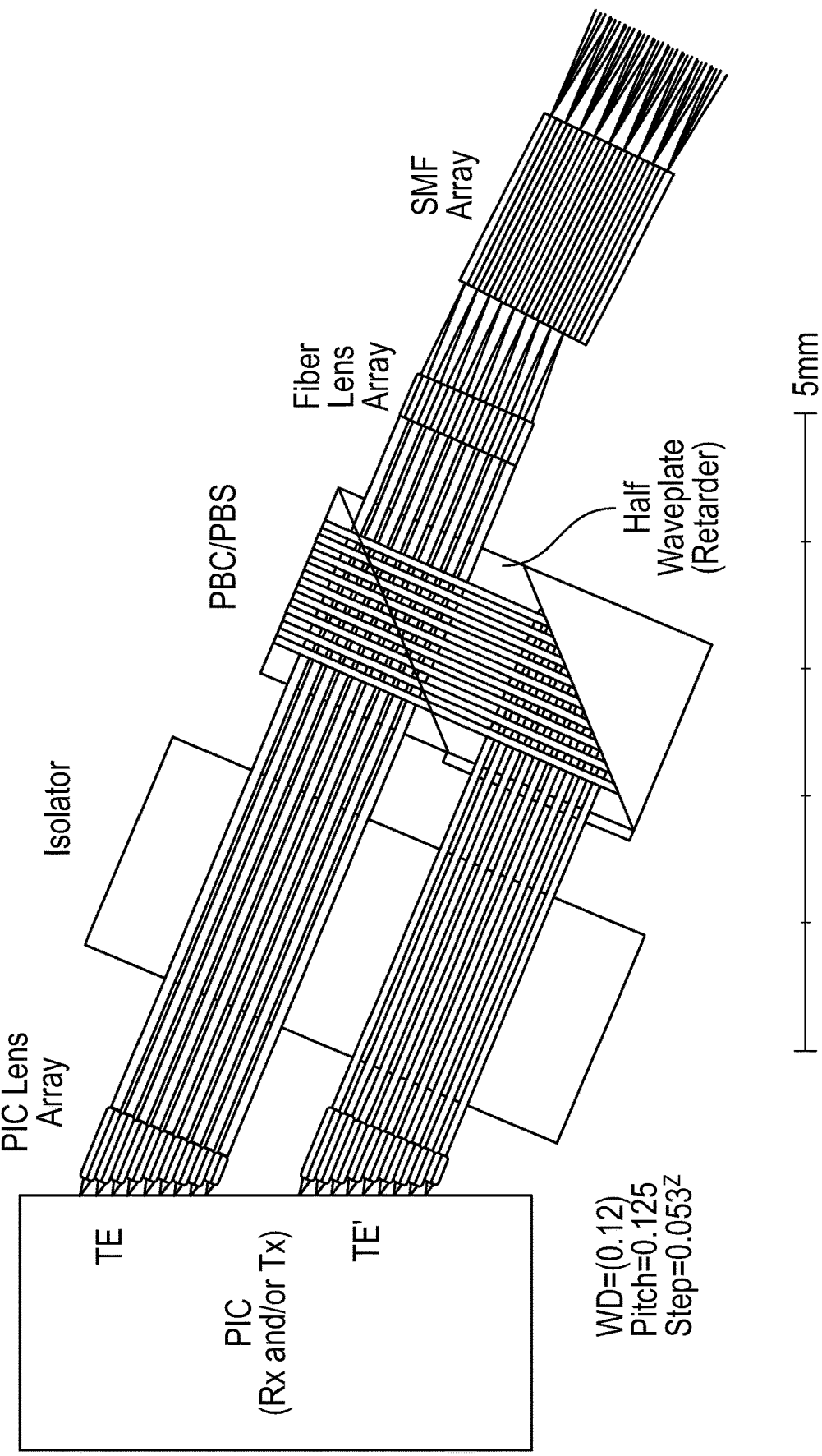

FIG. 23 shows a further exemplary arrangement in which the PBC and PBS are implement half wave plate or retarder. In this example, the PLC is omitted, and the output of the rotated TM light is output (or received in the instance of a receiver) directly to an array of lenses and to an array of single mode fibers (SMF). In a receiver configuration, light is input to the fiber lens array, split by the half wave plate or retarder and TE light is supply to both inputs of the PIC via the PIC lens array.

Figure 24:
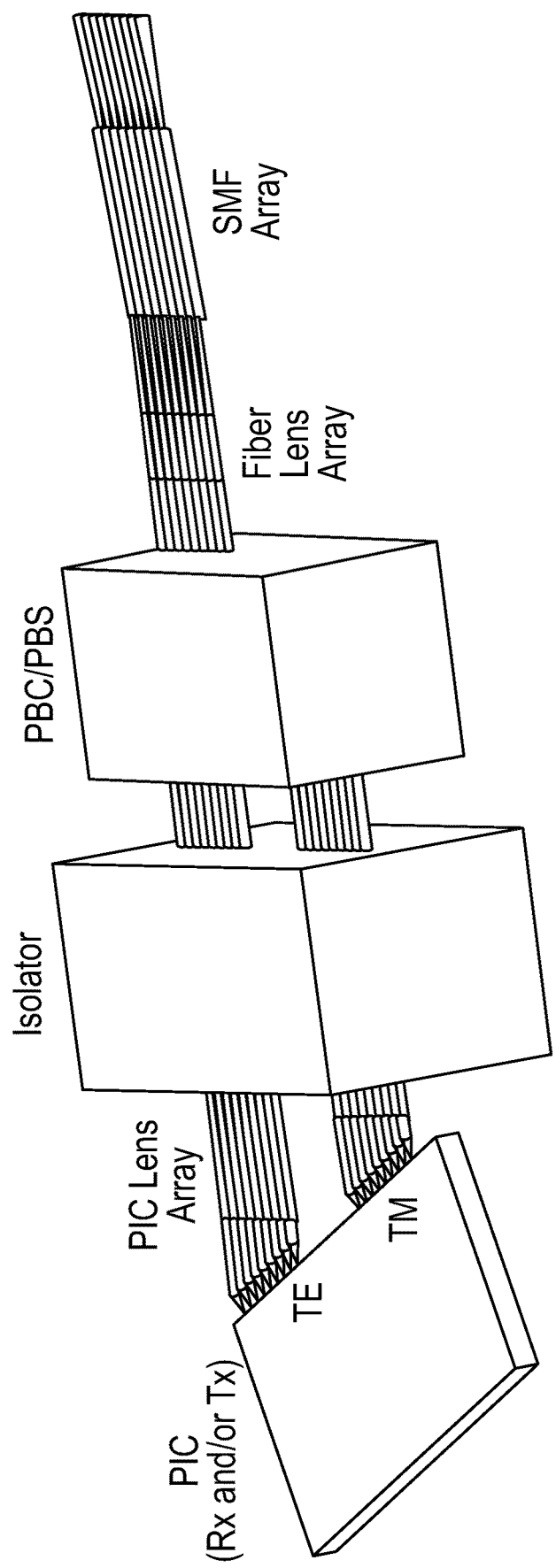

FIG. 24 shows a perspective view of the configuration shown in FIG. 23.

Figure 25:
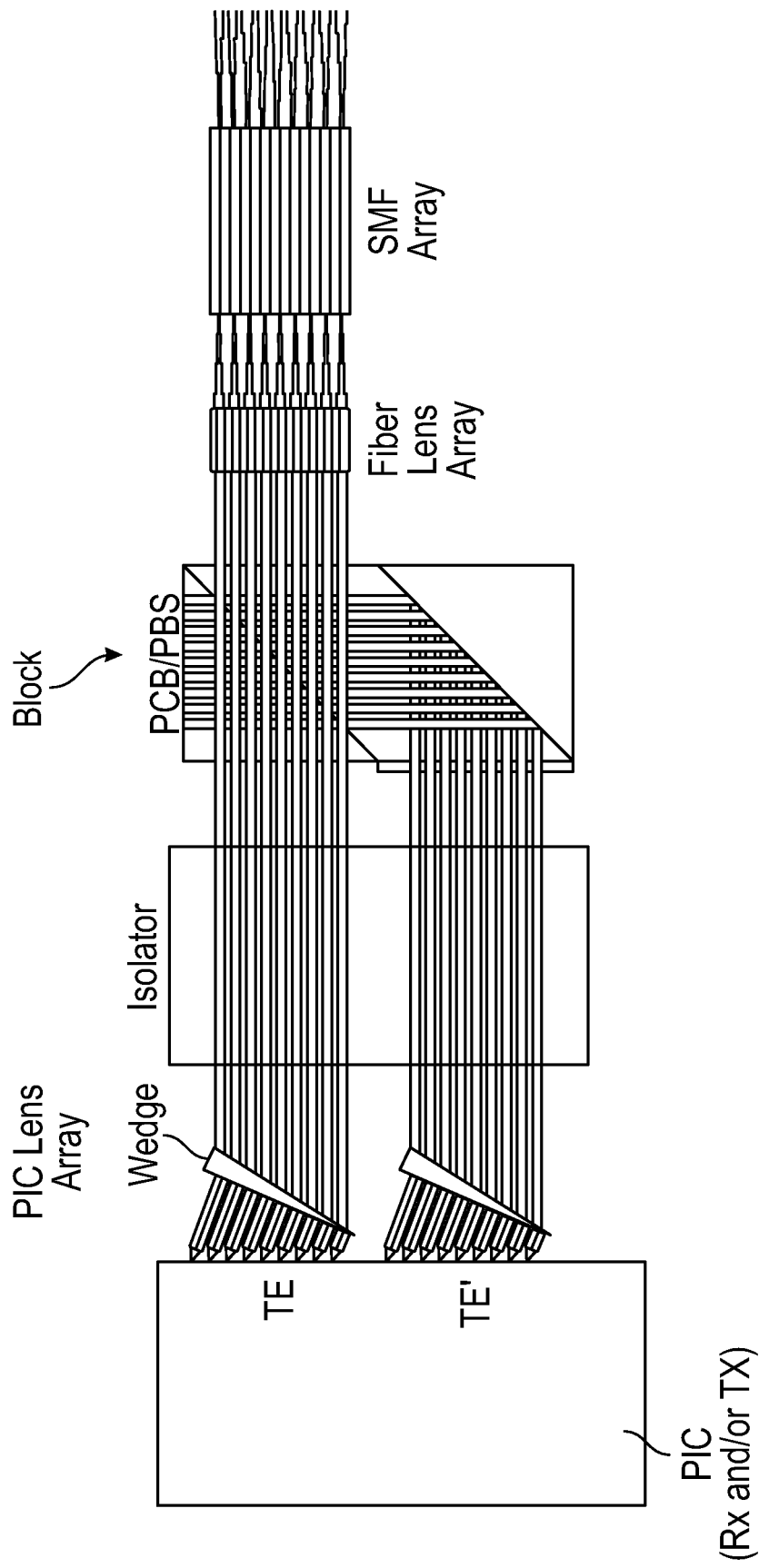
Figure 26:
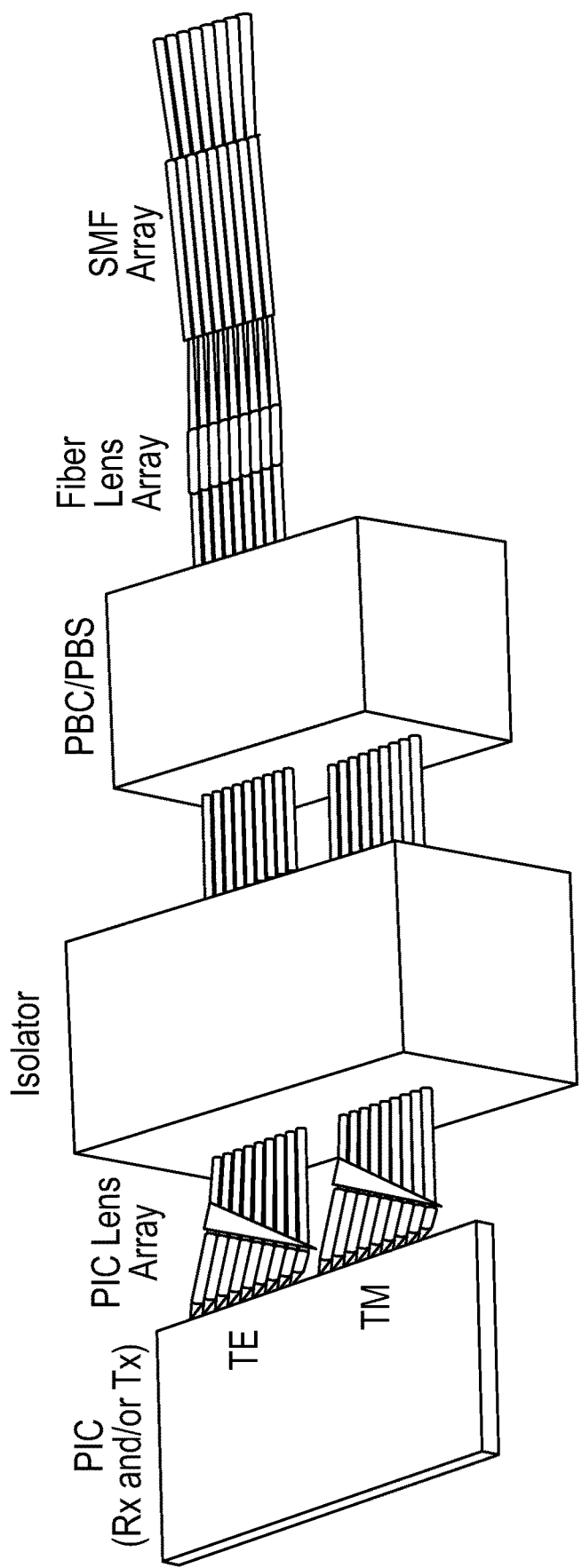

FIGS. 25 and 26 show plan and perspective views of a configuration in which wedge-shaped isolators are provided to further direct light output from the transmitter PIC through the PBC/PBS block. Thus, the PIC, isolator, and half wave plate can be arranged linearly as opposed to the bent arrangement shown in FIGS. 23 and 24.

Figure 27:
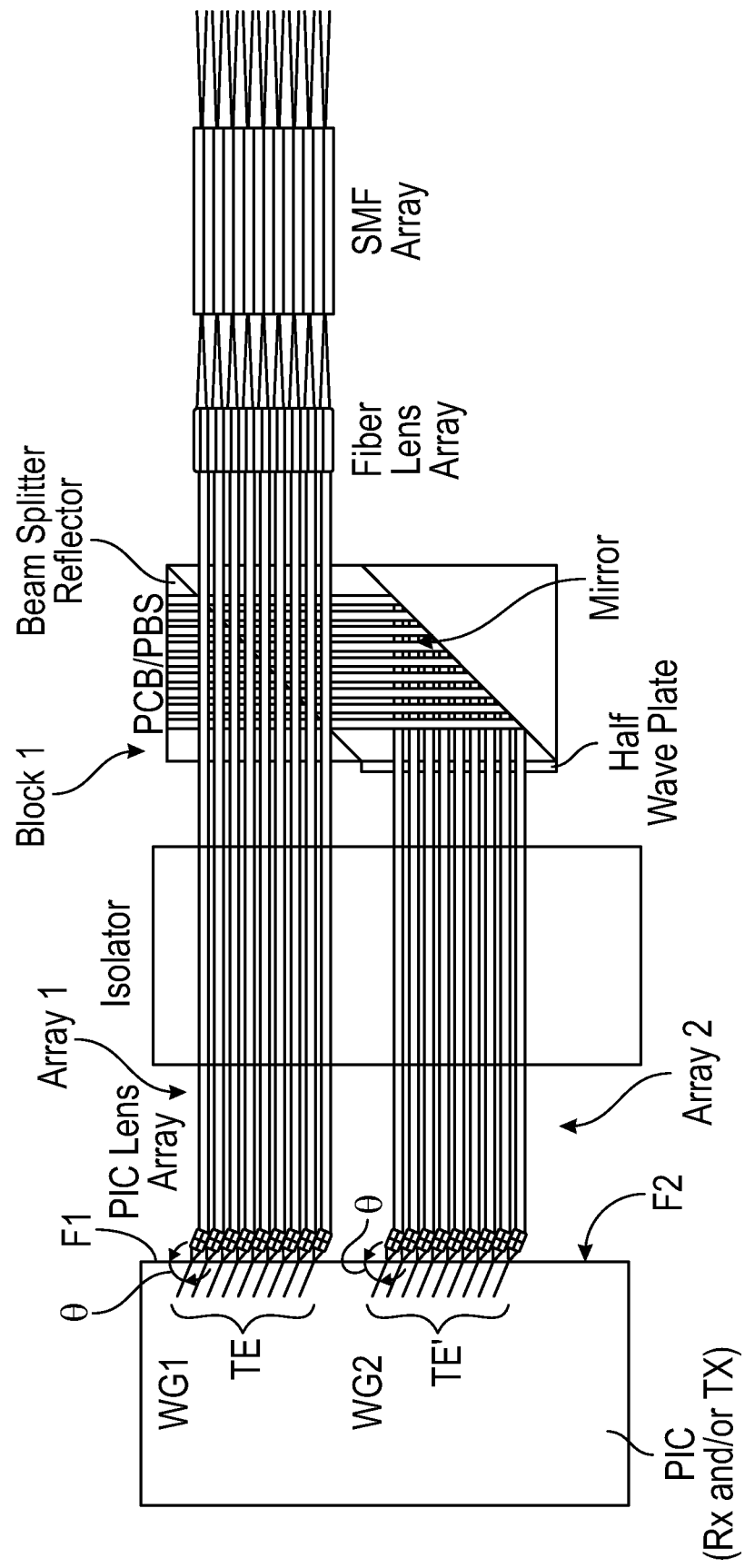
Figure 28:
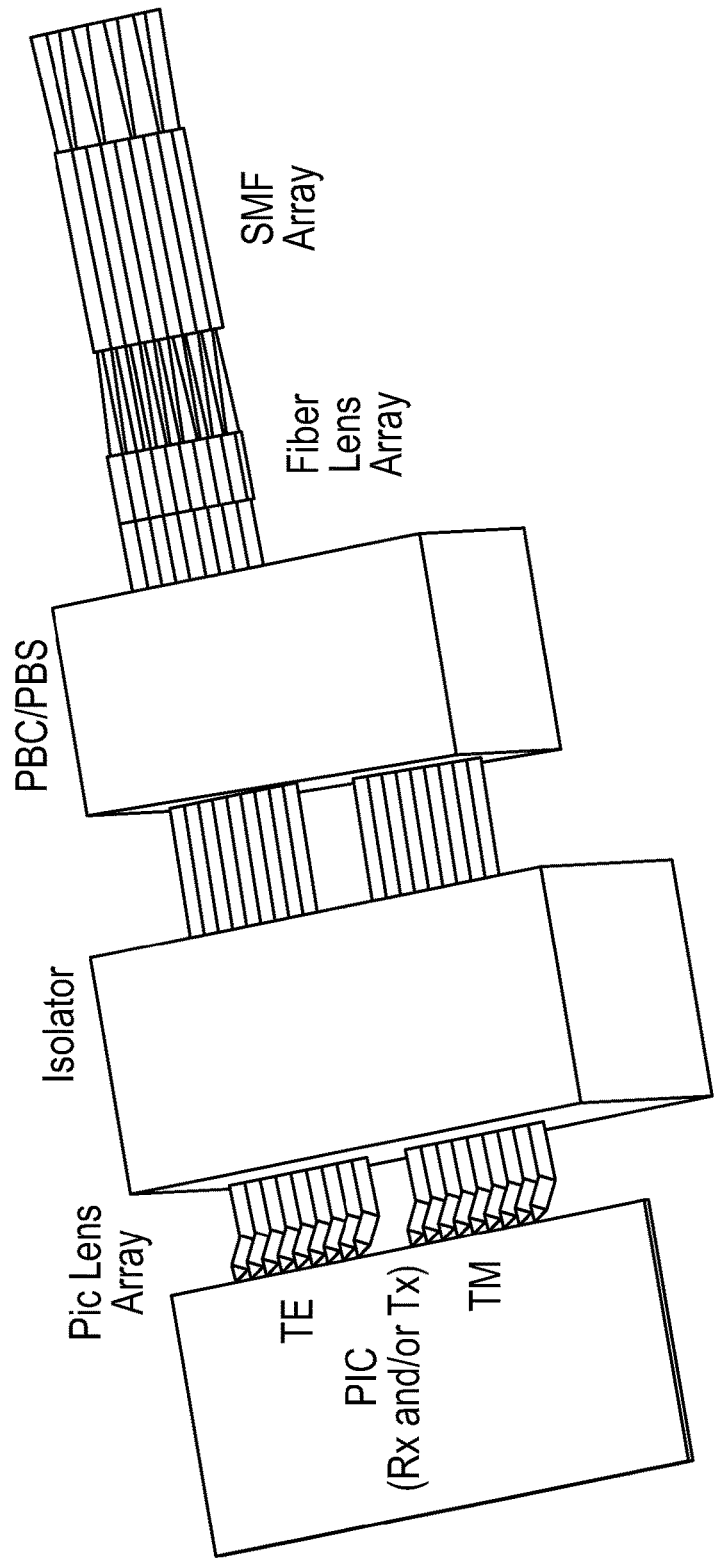

FIGS. 27 and 28 show plan and perspective view of a similar configuration as that shown in FIGS. 25 and 26, but the wedges have been omitted. Instead, lenses may be provided that collect and direct the light through the isolator.

FIG. 27 shows a PIC substrate, which, in the case of a TX PIC, includes lasers, modulators, and waveguides, and other features noted in the above description of FIGS. 1a, 1b, 1c, 2a, 2b, 2c, 3, 4a, and 4b. Consistent with an aspect of the present disclosure, at least one optical element is provided that collimates, focuses, rotates a polarization of at least one of, or combines modulated optical signals (e.g., TE and TE' optical signal output from the PIC). In addition, in the example shown in FIG. 27, an array of lenses in the Fiber Lens Array couples light to/from an array of single mode optical fibers in the SMF Array.

Figure 36:
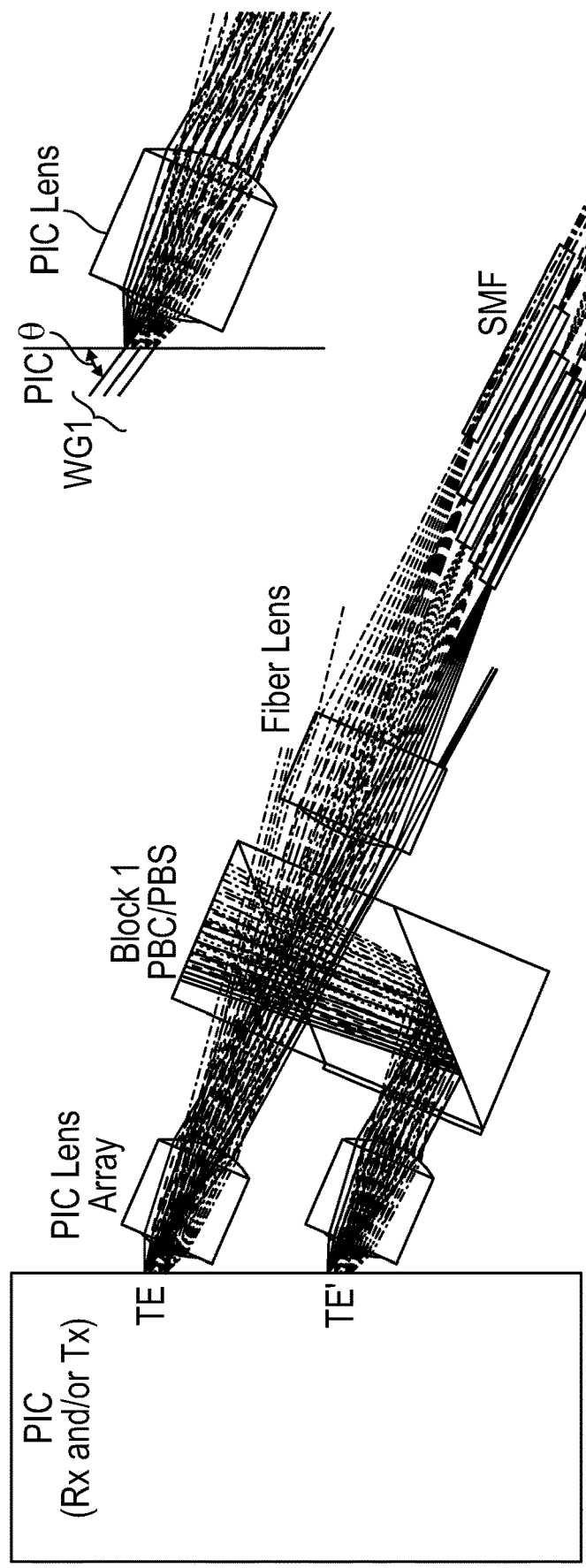
FIGS. 36-44 show the same configuration as that shown in FIG. 34, but with different emission angles and far field angles.
Figure 37:
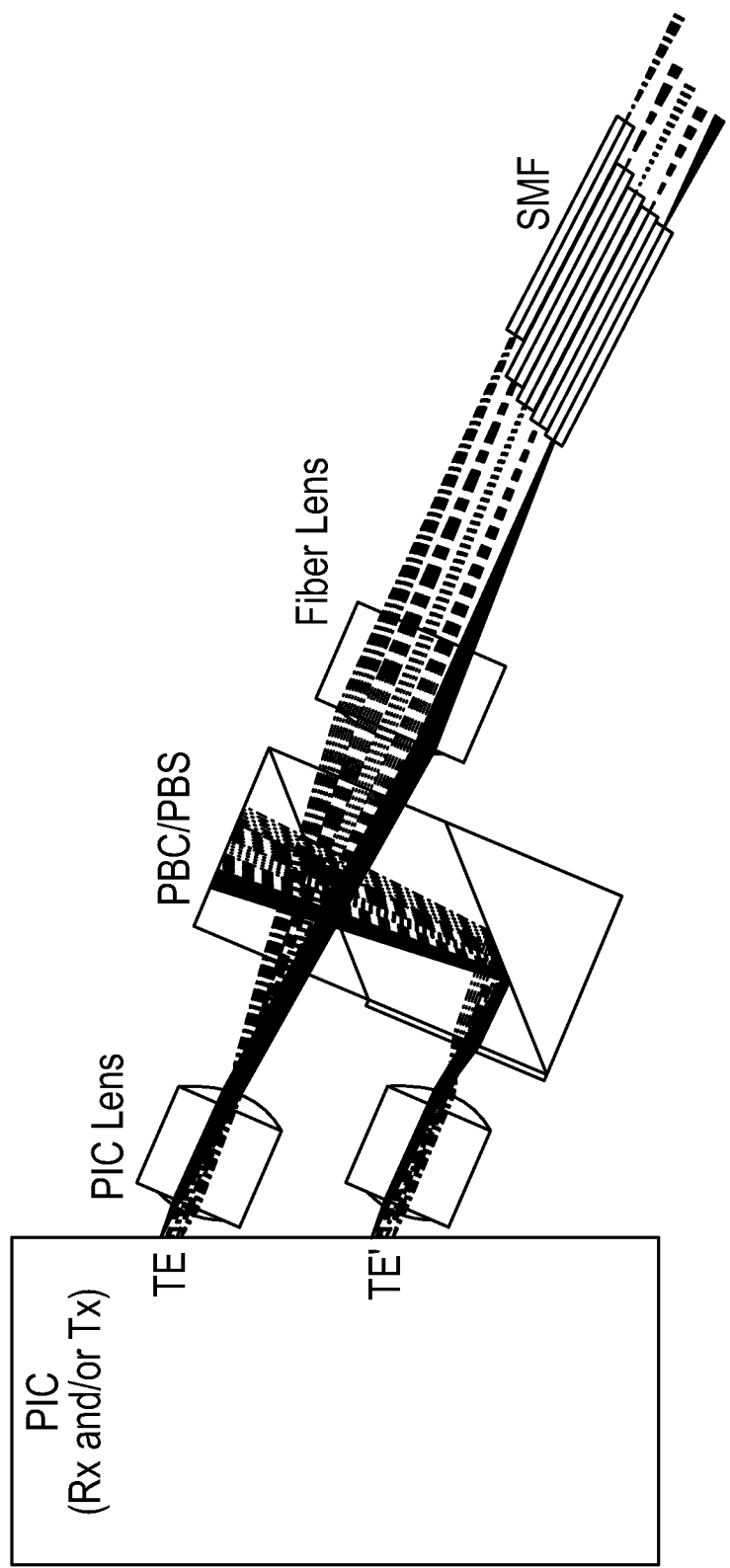
Figure 38:
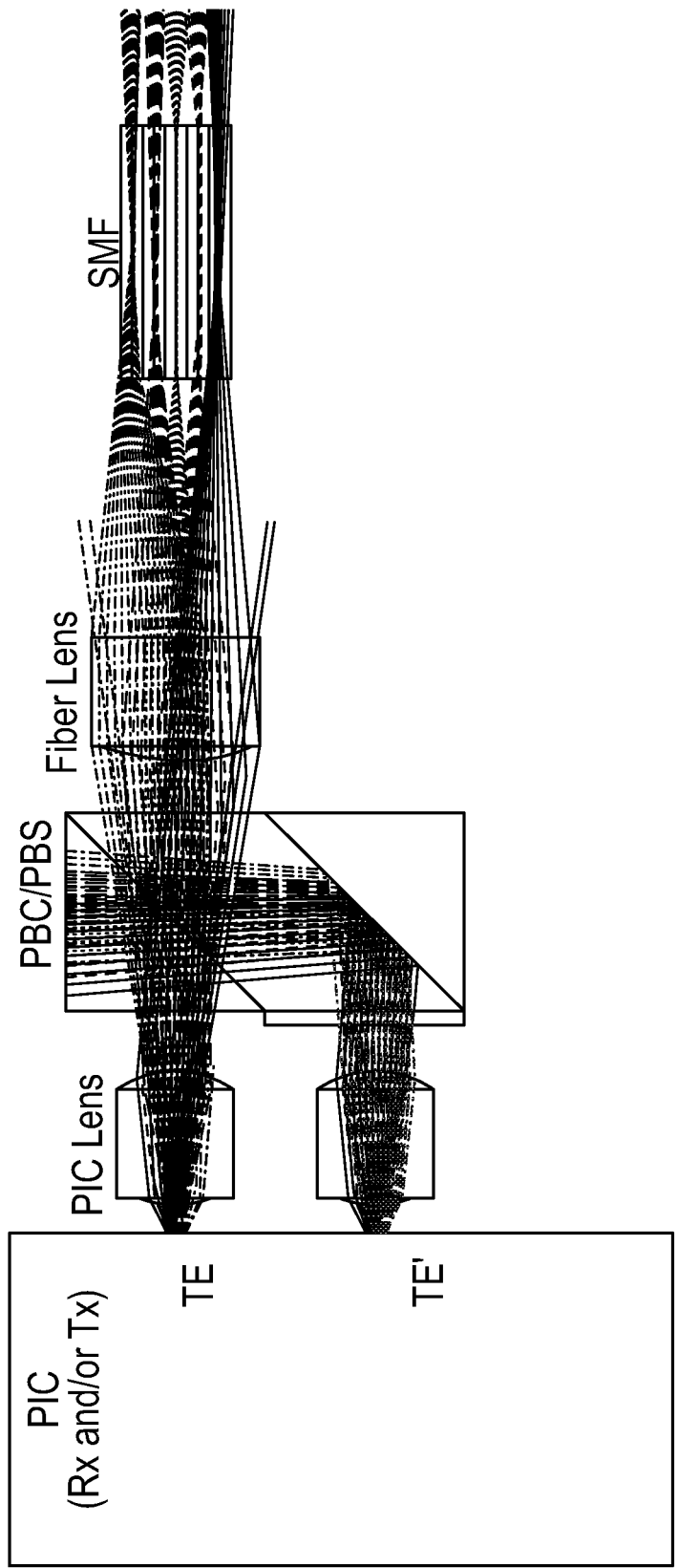
Figure 39:
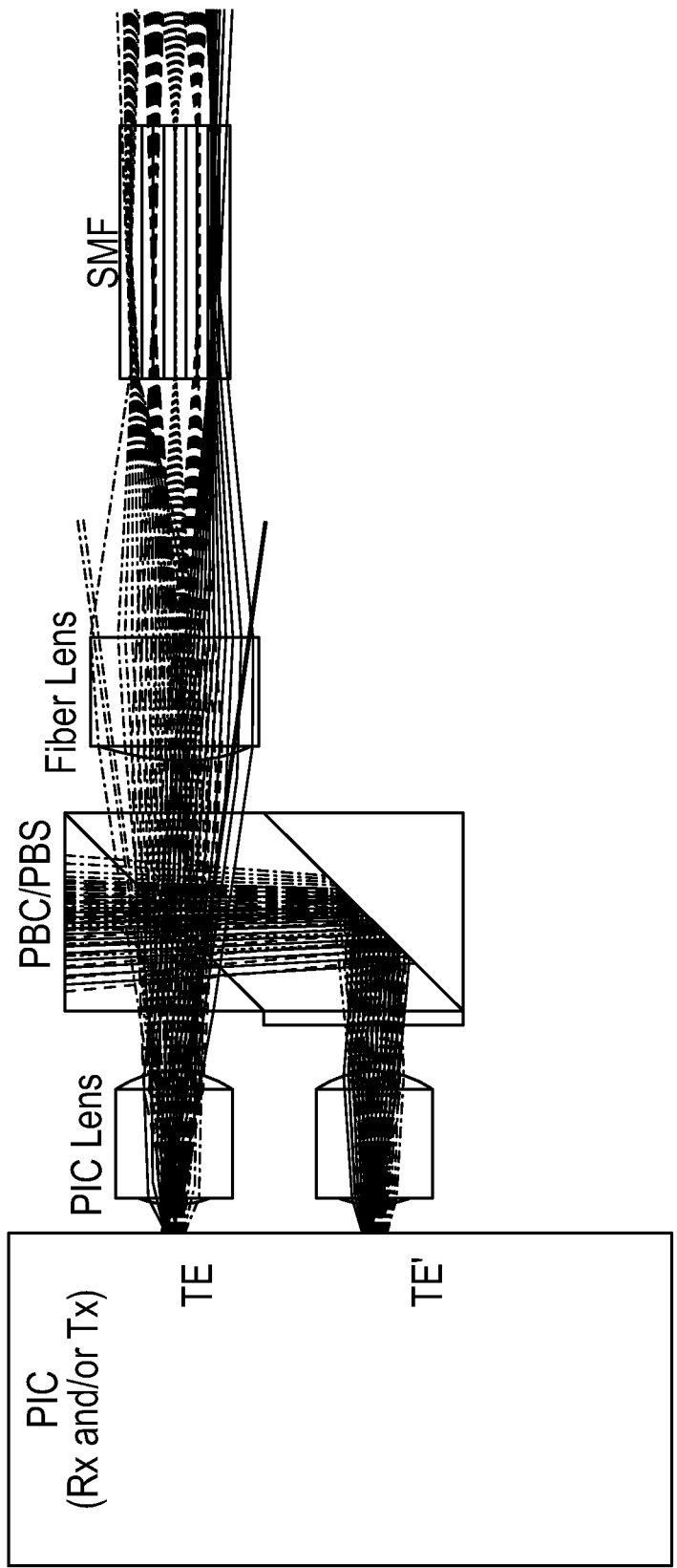
Figure 40:
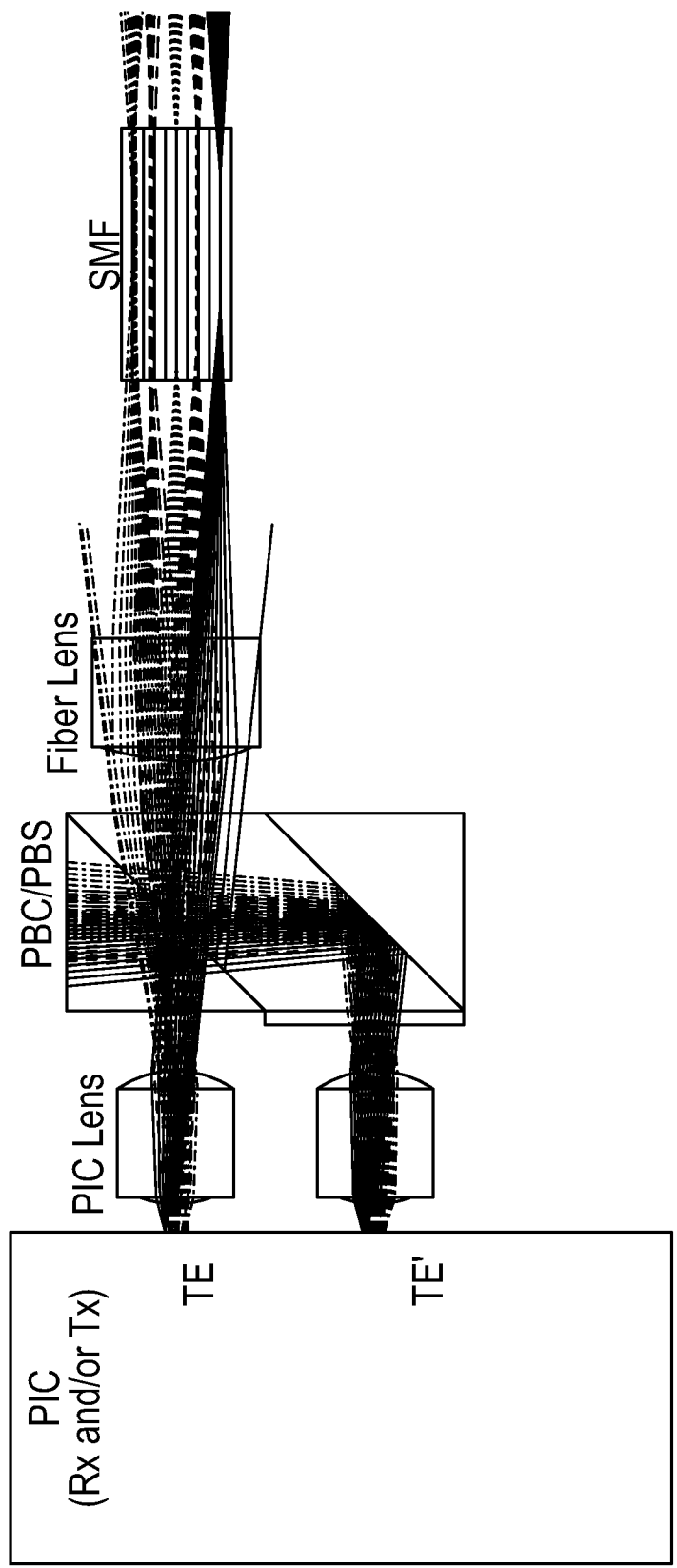
Figure 41:
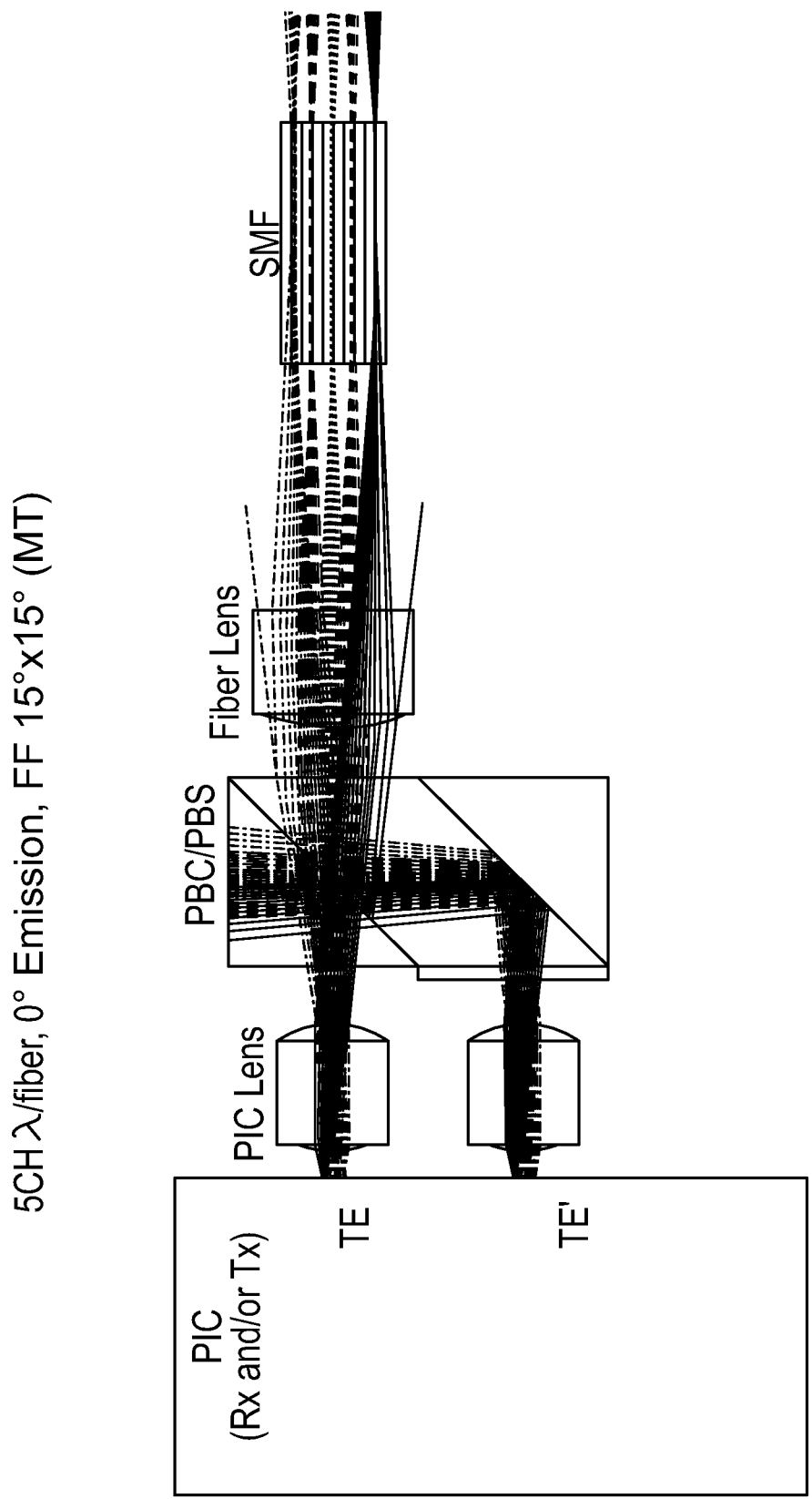
Figure 42:
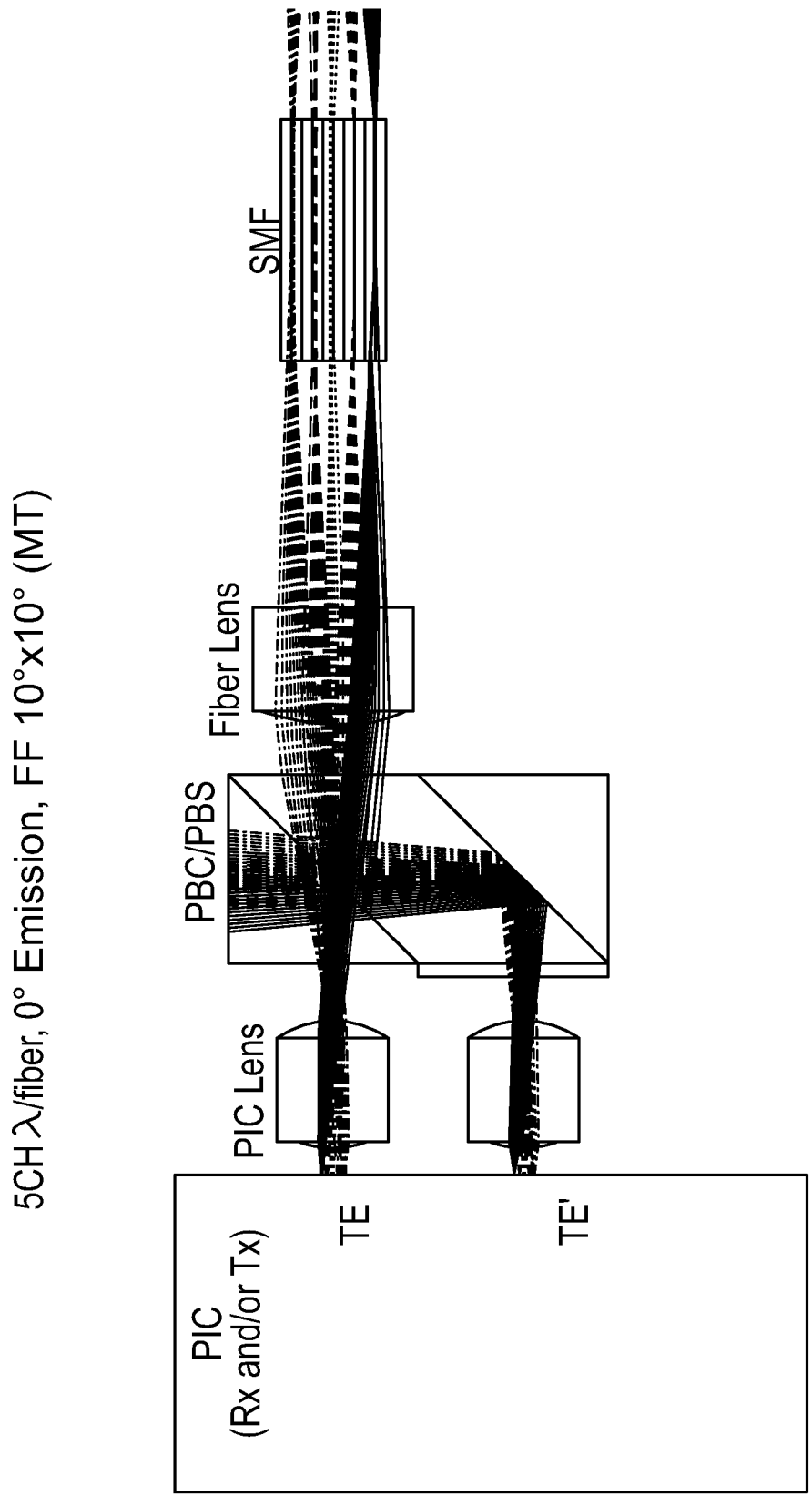
Figure 43:
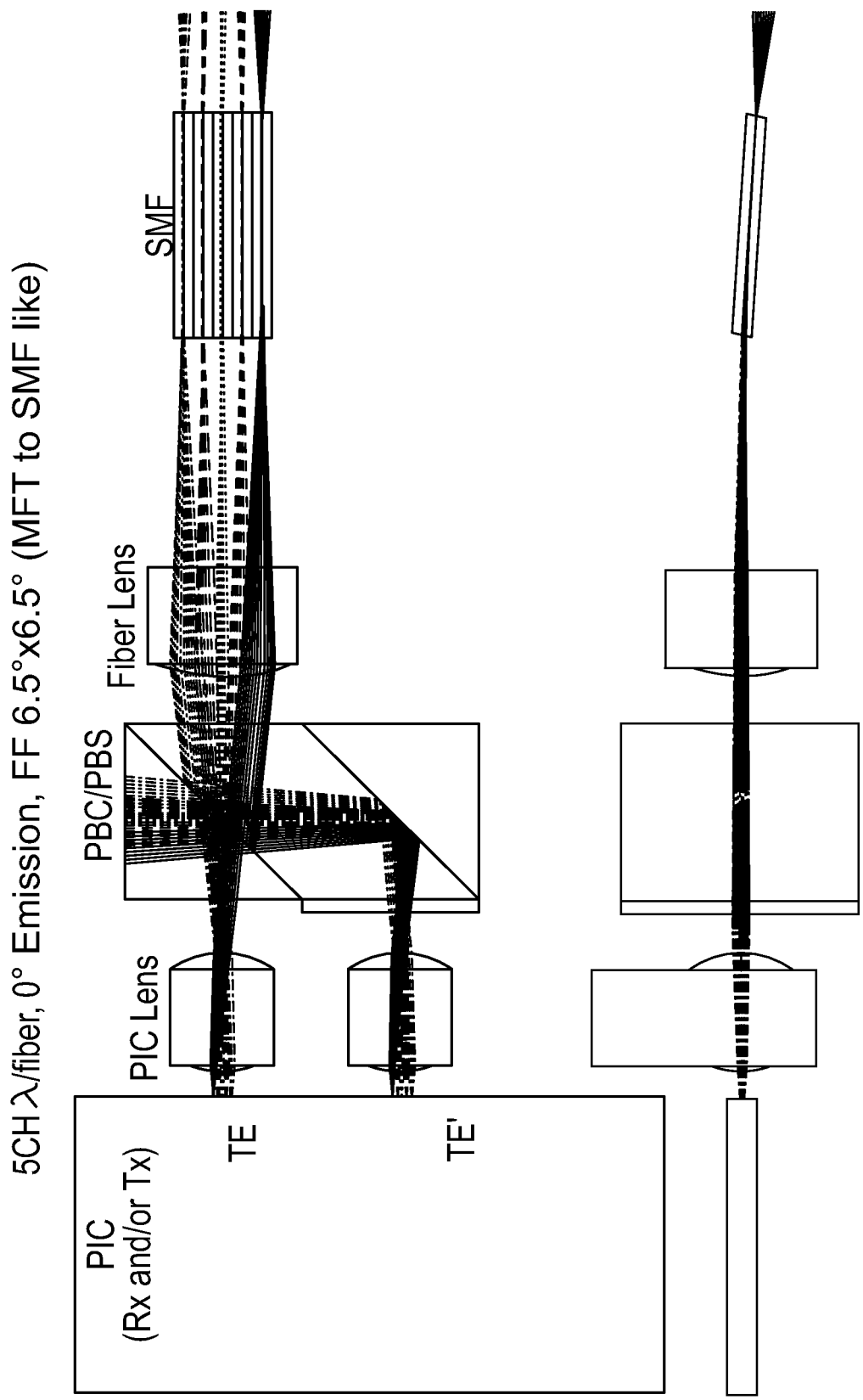
Figure 44:
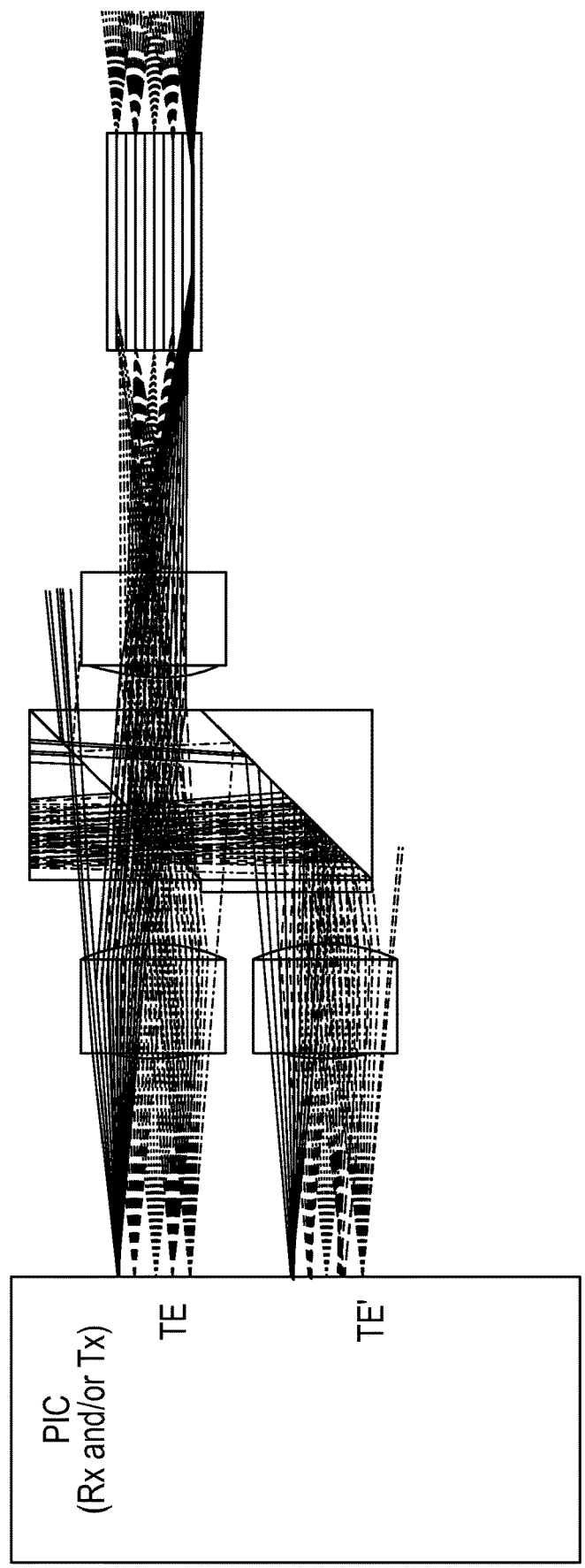

In greater detail, waveguides WG1 and WG2 as shown in FIG. 1 may be tilted to form a non-perpendicular angle θ with facets F1 and F2, respectively (see also FIG. 36). The tilt angle associated with waveguides WG1 may be the same or different than the tilt angle associated with waveguides WG2. Such tilting may reduce back reflections which may interfere with operation of lasers on the TX PIC, such as the WTL lasers discussed above. Each of N waveguides WG1 supplies a respective one of N TE polarized modulated optical signals to a corresponding one of N lenses in Array1.

Similarly, each of N waveguides WG2 supplies a respective one of N TE polarized modulated optical signals (designated TE' in FIG. 27) to a corresponding one of lenses in Array2. Each of the lenses in Array1 and Array 2, which may extend parallel to PIC or waveguide facets or edges F1 and F2 (both of which may be portions of the same facet or edge), may be a collimating lens to collimate the received optical signals. The collimated optical signals next pass through an isolator, which is shown as a bulk isolator, although a plurality of individual optical isolators may be provided, one for each modulated optical signal, as shown in FIG. 1a, for example. The N optical signals output from Array1 are next supplied to a beam splitter and the optical signals supplied from Array2 are fed to a half wave plate, for example, which may rotate the polarization of such signals from a TE polarization to a TM polarization. The rotated signals are reflected off a reflector or mirror to splitter/combiner, which may include a beam splitter or reflector to reflect the rotated (TM) optical signals to the fiber lens array and allow the non-rotated (TE) optical signals from Array1 to pass through to the fiber lens array. Thus, Block 1, in this example, is a polarization beam combiner, such that each of N lenses in the fiber lens array receives a corresponding one of N polarization multiplexed optical signals, wherein each polarization multiplexed optical signals includes a respective one of the unrotated TE optical signals form Array1 and a rotated (TM) from Array2. Each N lens in the Fiber lens array may focus or couple each of N received polarization multiplexed optical signals into a corresponding one of N fibers in single mode fiber (SMF) array.

In a receive configuration, the optical signal flow described above may be reversed. For example, each of N polarization multiplexed optical signals may be input from a corresponding optical fiber in the SMF array, and each such signal may be supplied to a corresponding one of N lenses in the Fiber Lens Array. Each such lens, when configured to receive optical signals from the SMF array, collimates such optical signals and supplies the signals to Block 1. The splitter/combiner plate or component (e.g., a beam splitter or reflector) is configured to reflect TM polarized light (signal) or component of each polarization multiplexed optical signal while allowing the TE polarized light (signal) or component to pass to Array 1. The TM signal is reflected off of the mirror in Block 1 and directed toward the rotator of half wave plate, which rotates the polarization of the TM signal to have a TE polarization. The rotated optical signals are then fed to a corresponding one of N lenses Array2, and, as noted above, the received TE signals are supplied to a corresponding one of lenses in Array1.

Each lens in Array1 and Array2 is configured to focus, in this example, the received optical signals onto a corresponding one of the waveguides (WG) on the RX PIC, as described above in connection with FIG. 1a, for example. As further described above, the received optical signals are fed to corresponding optical hybrids for further processing.

In the above example, each of the lenses in Array1 and Array2 is tilted relative to facet F1, for example. However, in the embodiment shown in FIG. 15, the PIC substrate may be tilted relative to the propagation direction of the collimated optical signals by an angle θ, and waveguides WG2 in FIG. 15 may be perpendicular to facet F or edge of the PIC.

In addition, although a block is shown having bulk components, such as the half wave plate, isolator, and combiner splitter that rotate and combine each of the received optical signals, it is understood that individual polarization rotators, combiners and splitters may be provided on a channel by channel basis. For example, the individual polarization rotators, combiners, and splitters shown in FIGS. 1a, 59, and 60 may be provided as stand alone components instead of being integrated or otherwise provided on a substrate.

Figure 29:
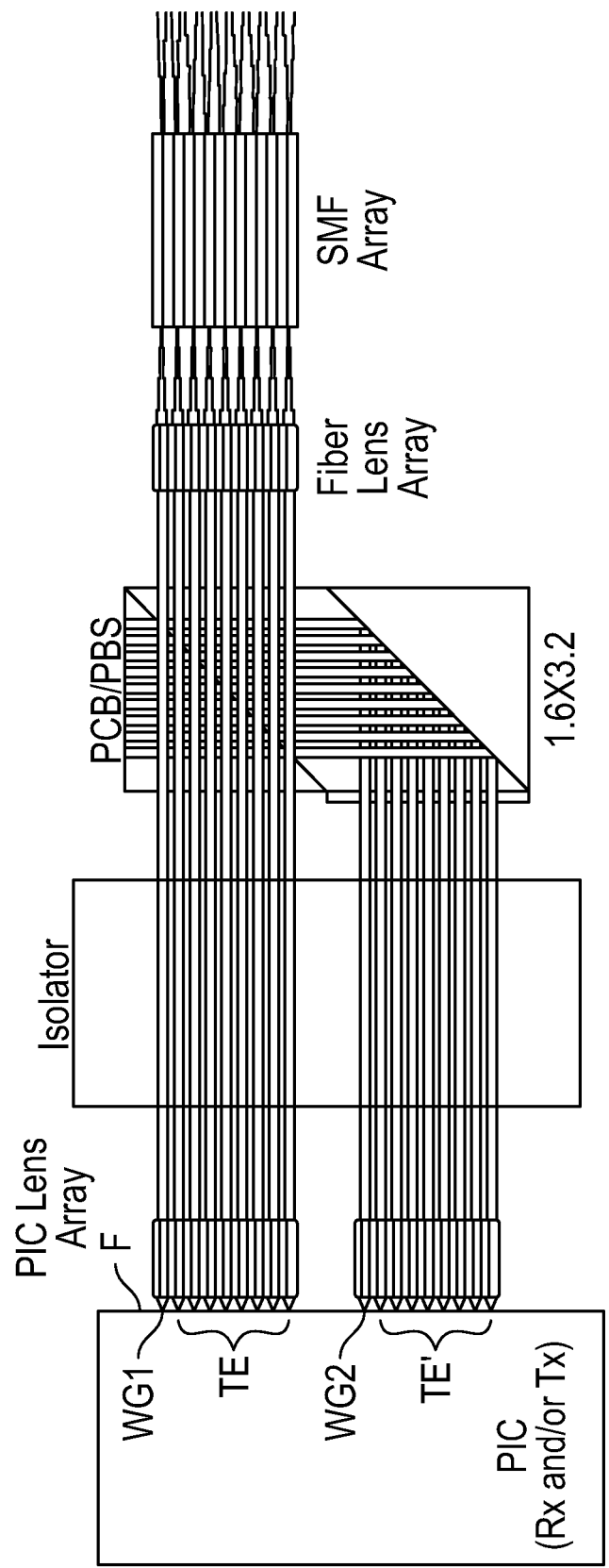

In addition, waveguides WG1 and WG2 may be provided perpendicular to the PIC facet, as shown in FIG. 29. Here, lenses in the PIC lens array also extend parallel to facet F and each lens in the PIC lens array (including Array1 and Array2) are not tilted but are also oriented parallel to facet F.

Figure 30:
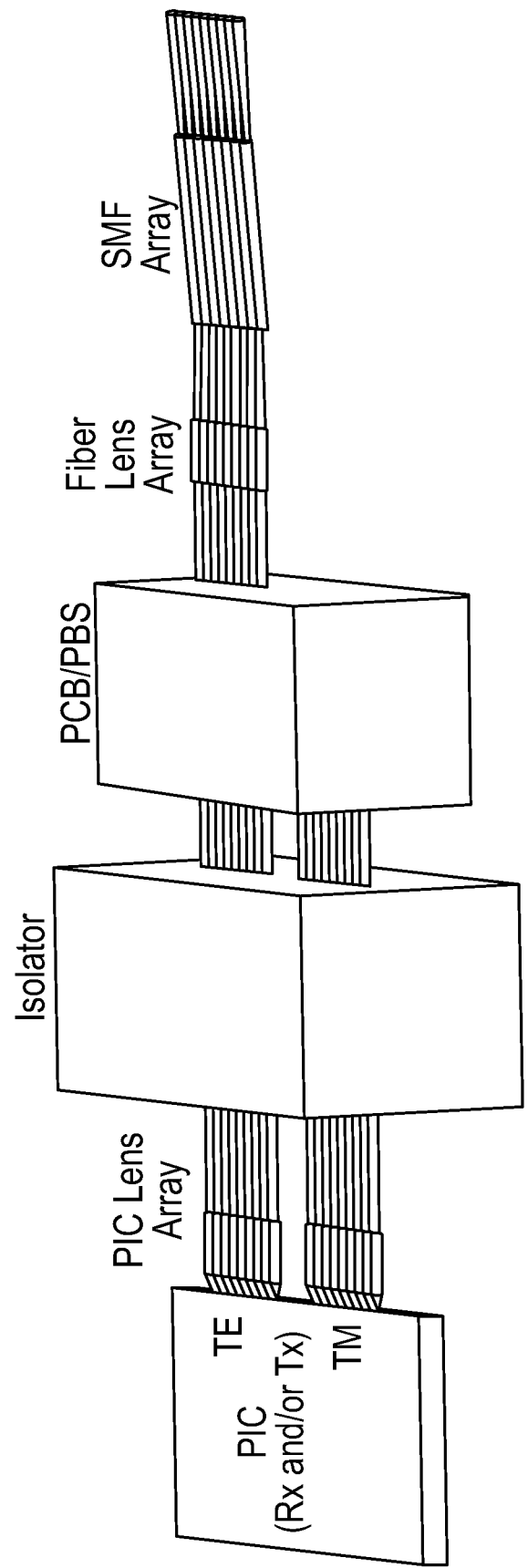

FIGS. 29 and 30 show plan and perspective view of another configuration in which the emission angle of light output from the PIC is zero degrees. This configuration may be subject to back reflections.

Figure 31:
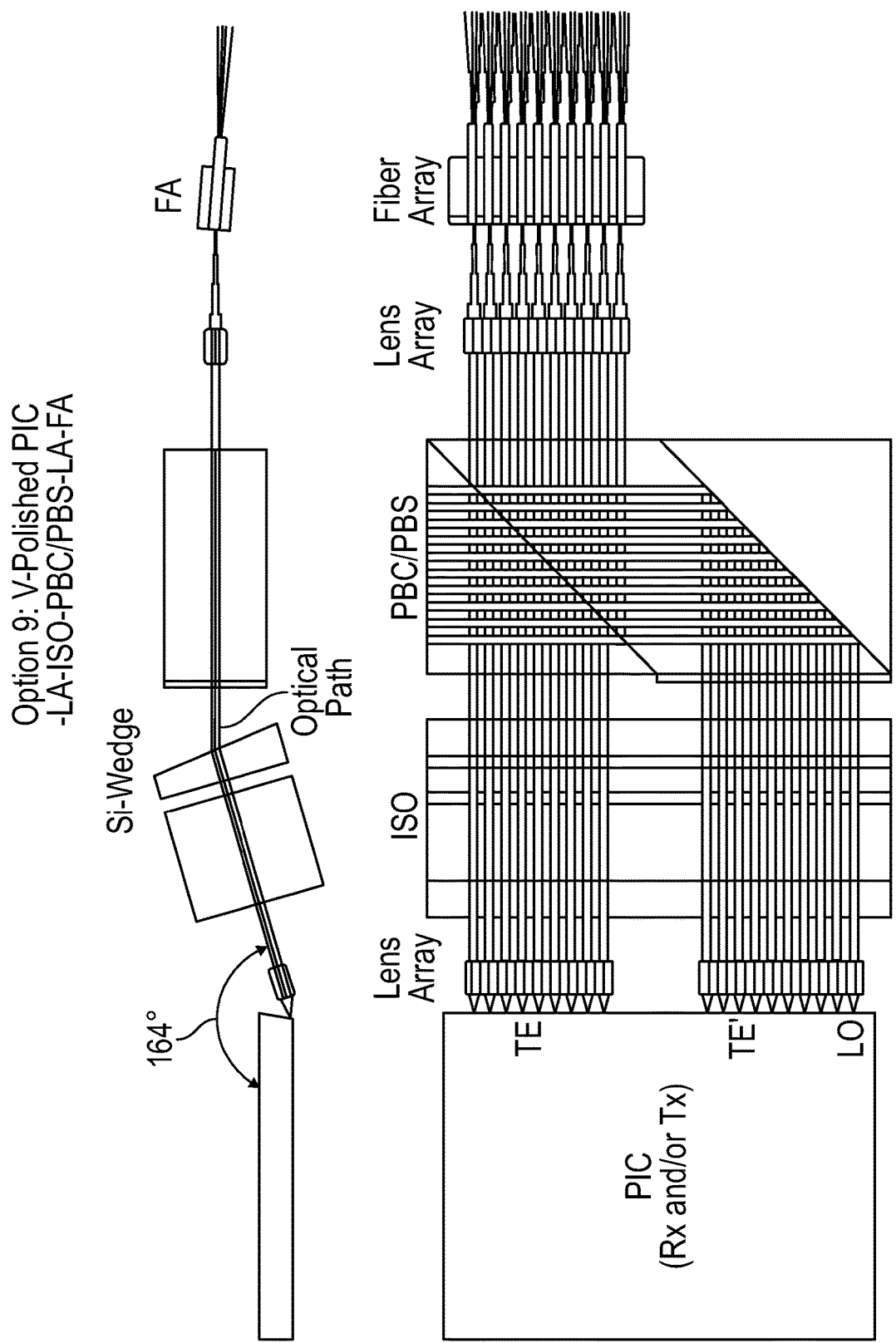
Figure 32:
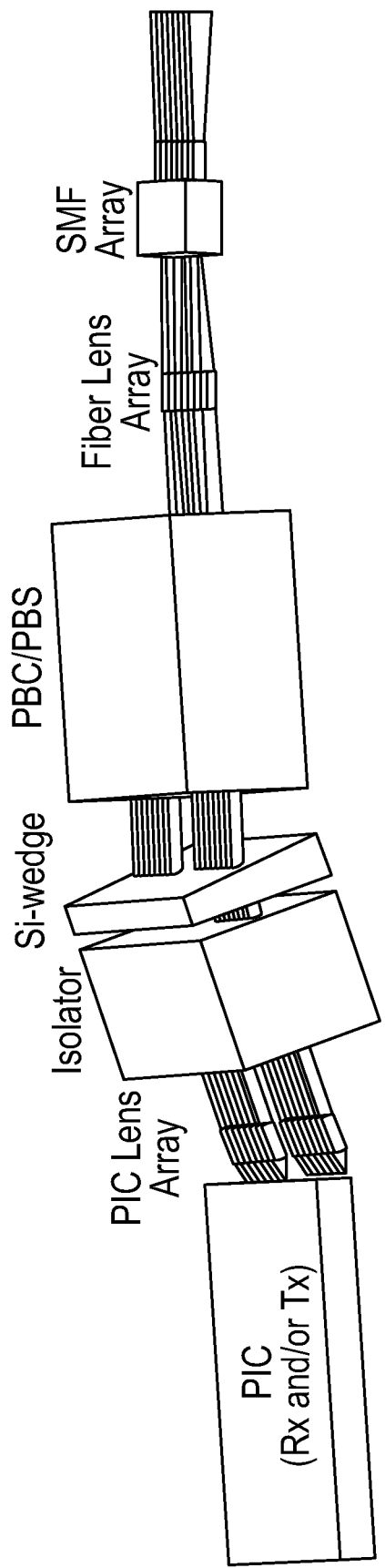
Figure 33:
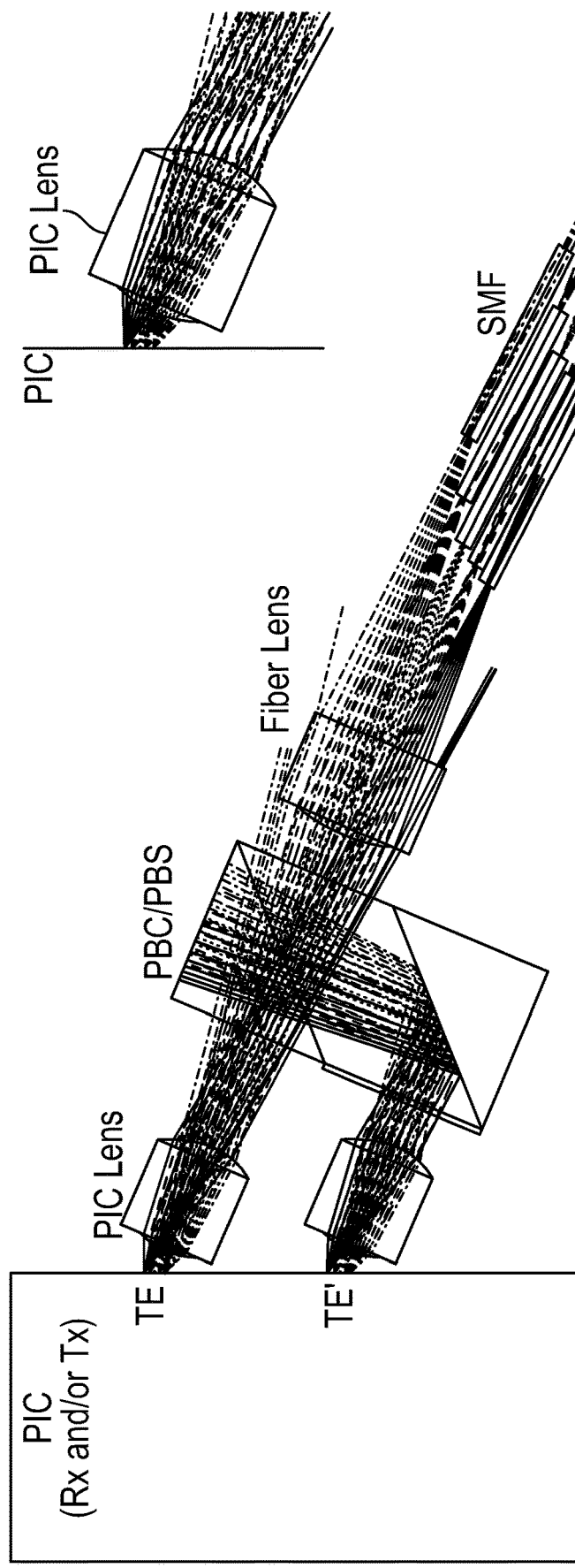

FIGS. 31 and 32 show plan and perspective views of an arrangement in which the isolator is oriented at an angle relative to the PIC and a wedge (made of silicon, for example) directs light to the PBC/PBS and to the lens array and fiber array. As shown in FIG. 31, the optical path associated with optical signals propagating through the isolator and to the PBC/PBS block is bent, such that the propagation direction of such optical signals is changed FIG. 33 shows a ray trace diagram of light output from the PIC. Here, performance may depend on incident angles to the PBC. Also, fiber facets are not aligned to be on the same plane, and waveguides may cross one another in the PIC. The configuration shown in FIG. 33 does not include a mode transformer.

Figure 34:
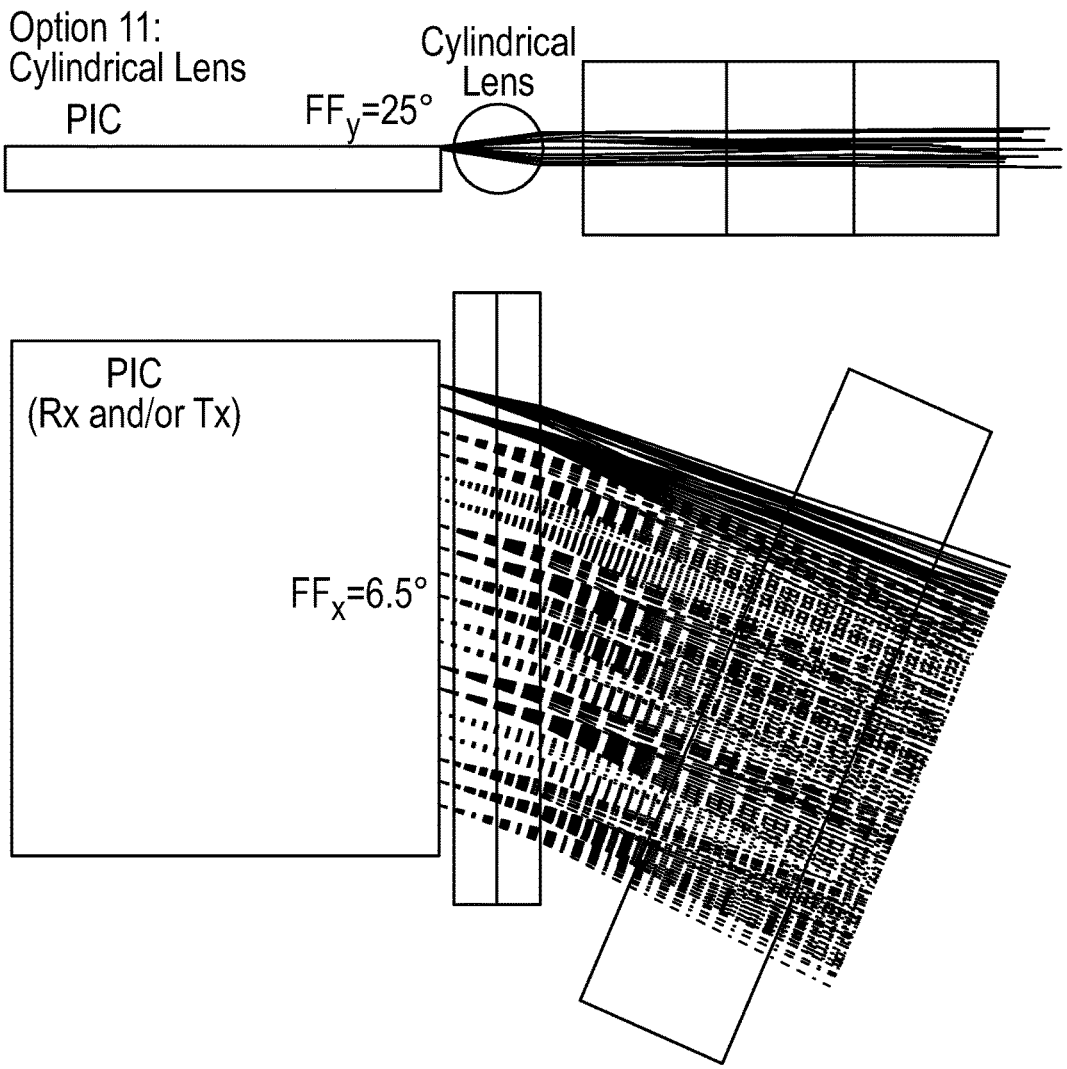

FIG. 34 shows an example of a ray trace diagram in which cylindrical lenses are used to couple light from the PIC to the isolators, for example.

Figure 35:
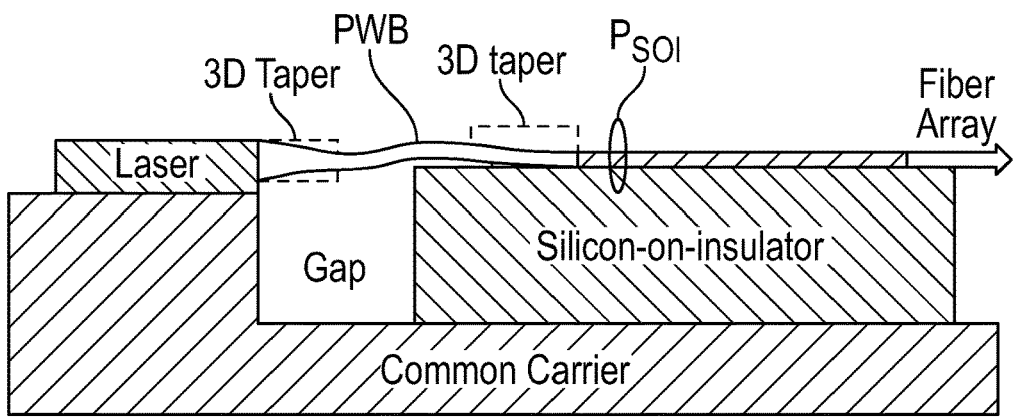

FIG. 35 shows an alternative configuration in which a photonic wire is used to couple optical signals from the PIC to the PLC.

FIGS. 36-44 show the same configuration as that shown in FIG. 34, but with different emission angles and far field angles. In FIG. 36, for example, multiple optical signals, each having a different wavelength are fed to each lens (PIC lens) and the polarization multiplexed output of the Block 1 (in a TX or transmit configuration) are supplied to one lens, instead of each being supplied to a corresponding one of a plurality of lenses, as in FIG. 27. Here, N polarization multiplexed signals are fed to a number of lenses in the PIC lens array that is less than N. Further, the lenses disclosed herein may be provided as a plurality of discrete lenses or as a single piece, as a single lens that receives multiple optical signals, as in FIG. 36, for example, or a plurality of lenses that are fused or bonded or formed from a single of suitable material.

Figure 45:
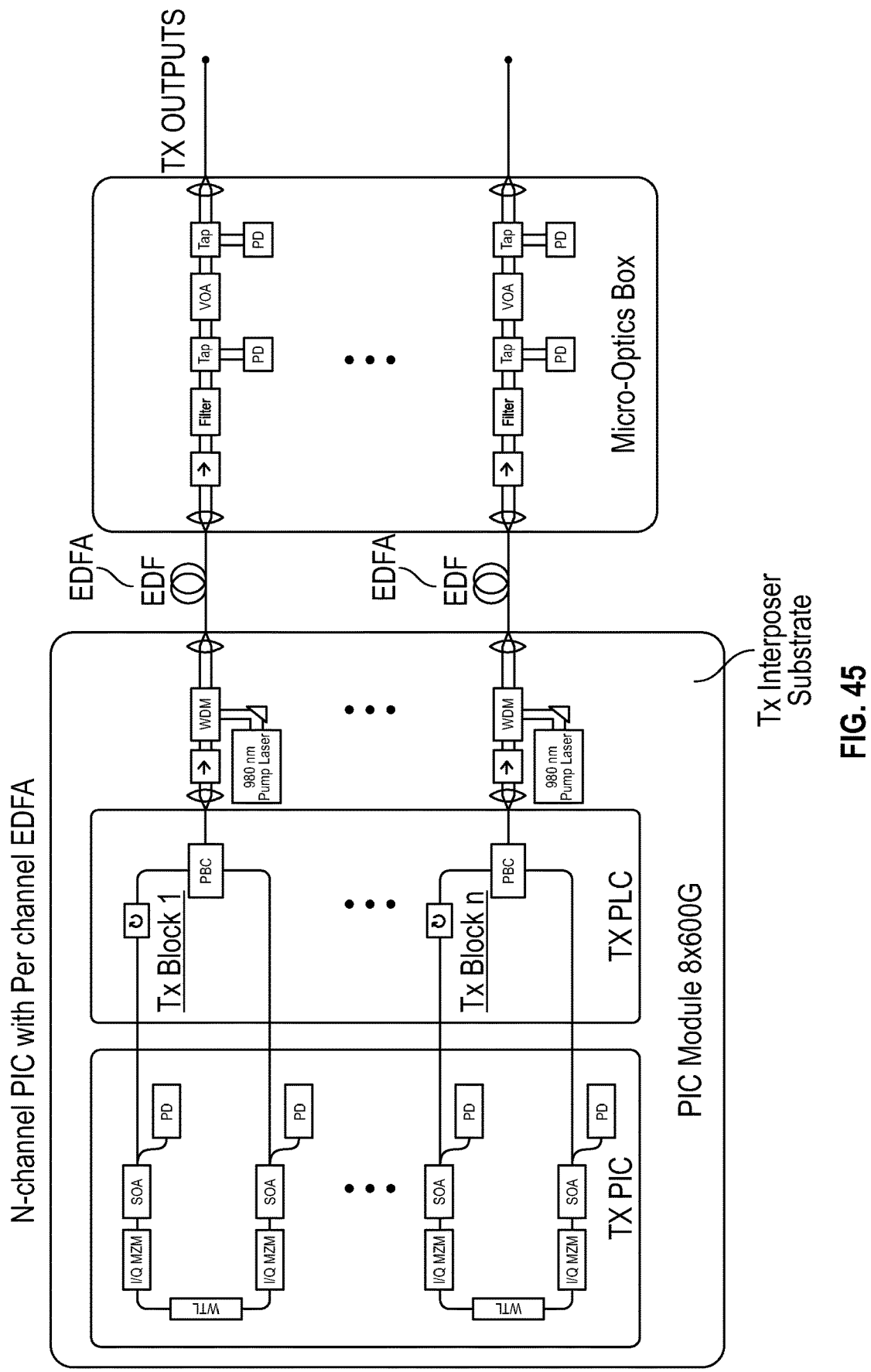
FIGS. 45-47 show examples of transmission modules consistent with the present disclosure.

FIG. 45 shows an alternative configuration similar to that shown in FIG. 2a but including tracking filters in a micro-optics box. Each of the tracking filters supplies a corresponding optical signal to a respective VOA, which adjust the power each such optical signal prior to input to a passive multiplexer or power combiner, for example. As further shown in FIG. 45, each VOA has associated monitoring taps and photodiodes to adjust measure and thus control the optical power output from each VOA. In addition, a plurality of (or N) splitters or taps are provided that are coupled to a corresponding waveguide WG1. Each tap has an input that receives light from a corresponding laser via an optional corresponding SOA, first output that provides part of such light, and a second output that provides a portion of the light generated by the laser, albeit modulated, on a corresponding one of waveguides WG1. As further shown in FIG. 45, the second output of each tap feeds connects to a corresponding one of N photodiodes. Similarly, taps and associated photodiodes may be provided that are coupled to each of waveguides WG2. As noted above, there may be N (N being an integer) waveguides WG1 and N waveguides WG2 (for a total of 2N waveguides), such that a respective one of N taps and photodiodes are coupled to each waveguide WG1 and a respective one of N taps and associated photodiodes are coupled to each waveguide WG2 (a total of 2N taps and photodiodes).

Figure 46:
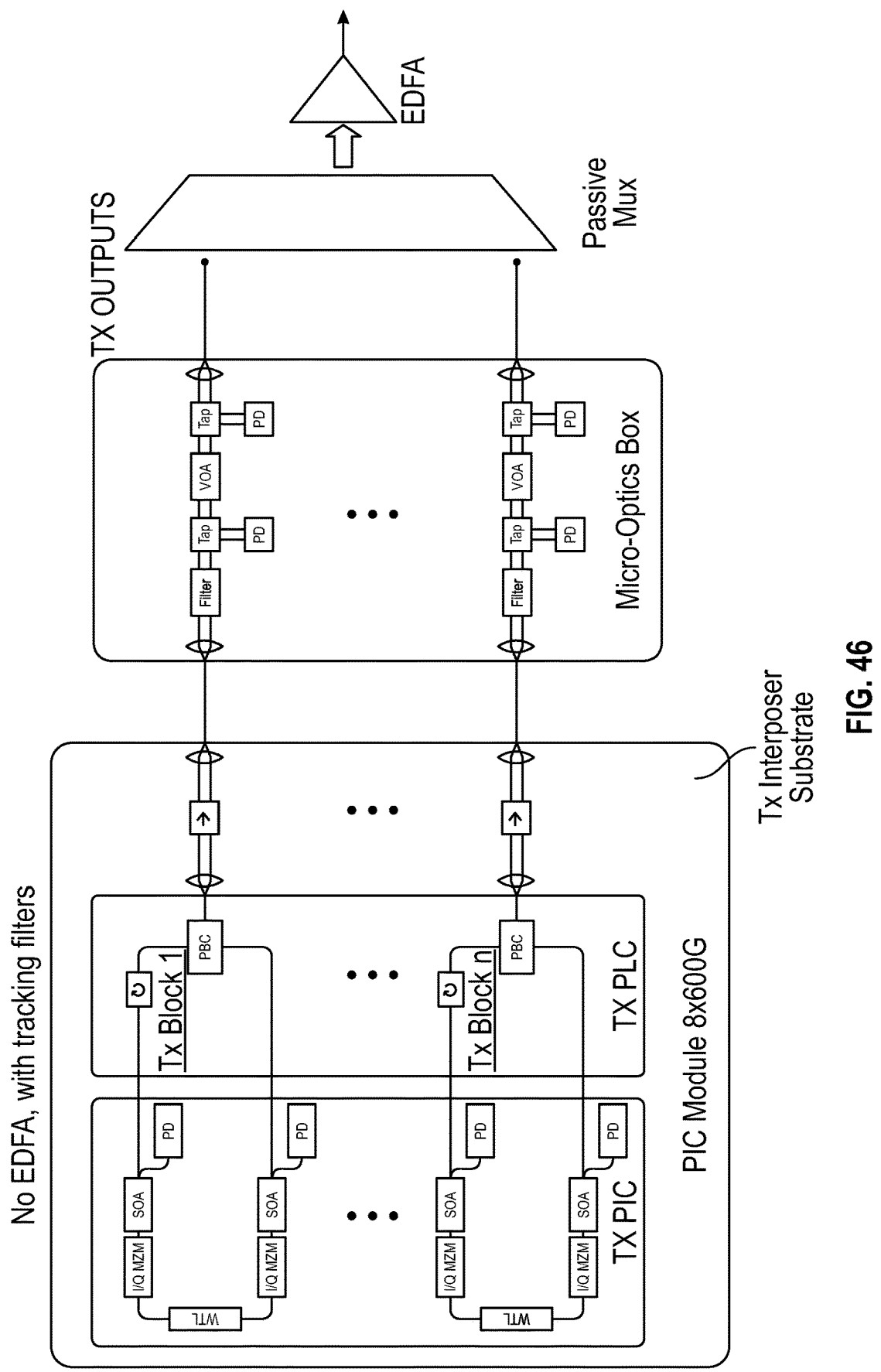
Figure 47:
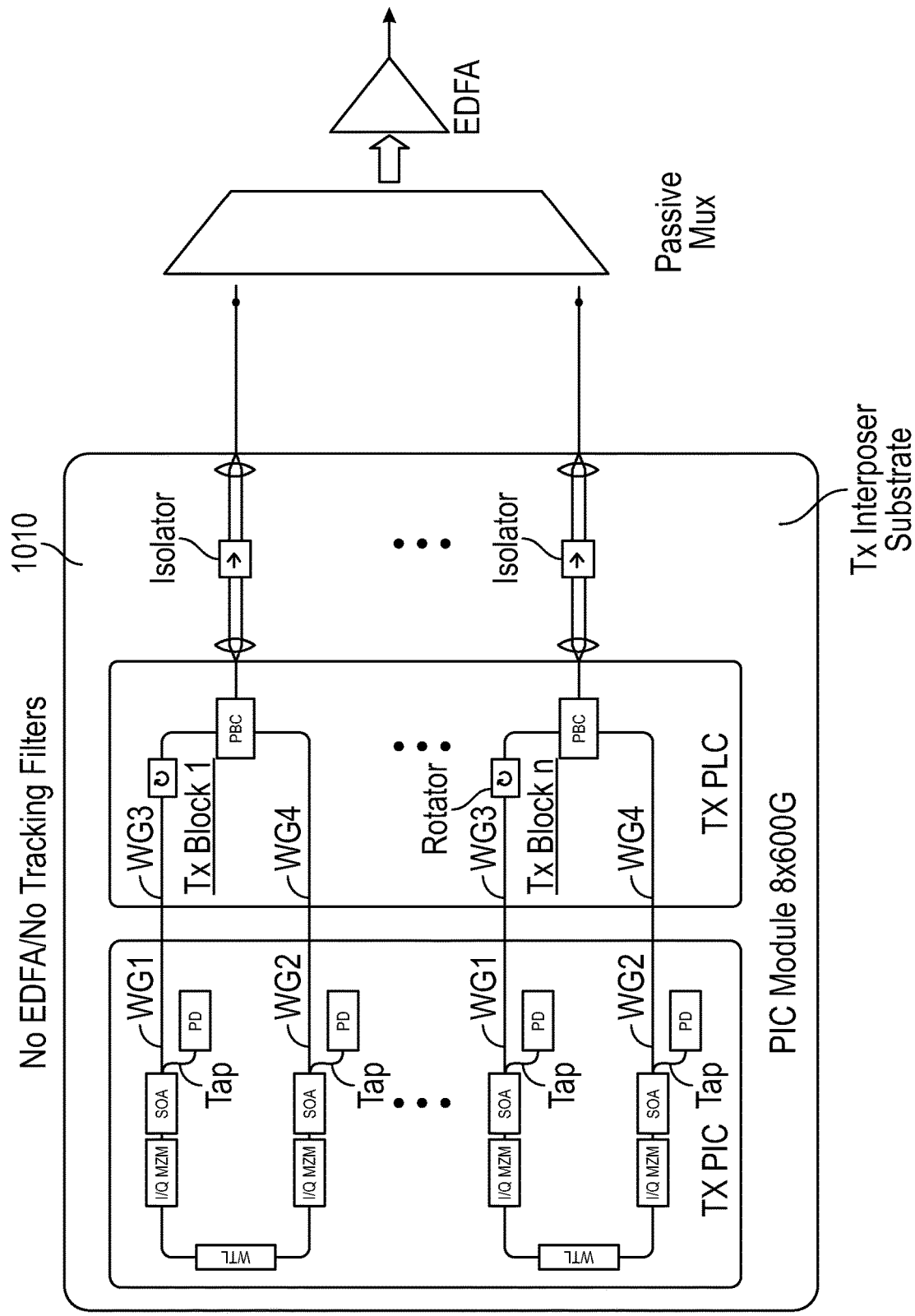
Figure 49:
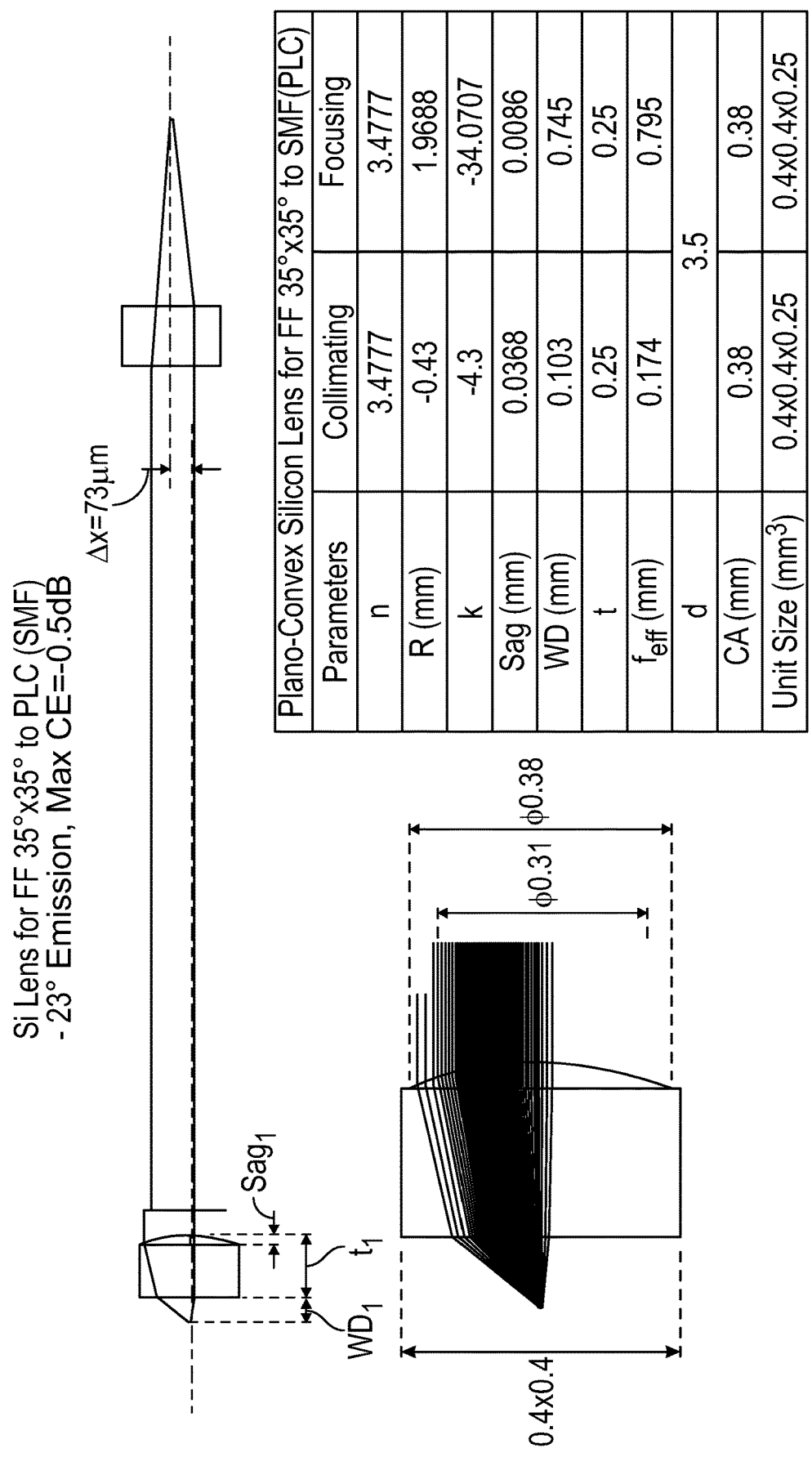
Figure 50:
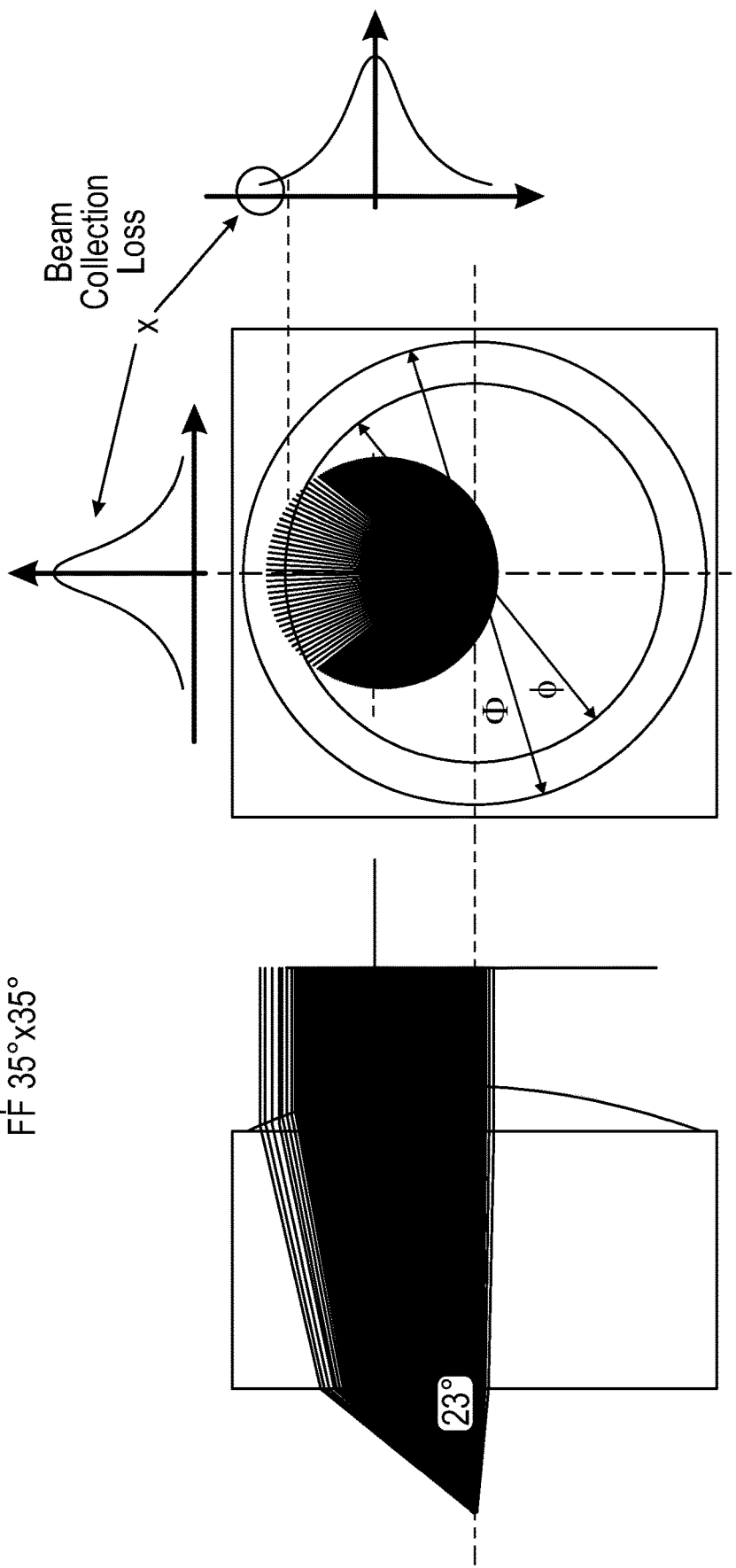
Figure 52:
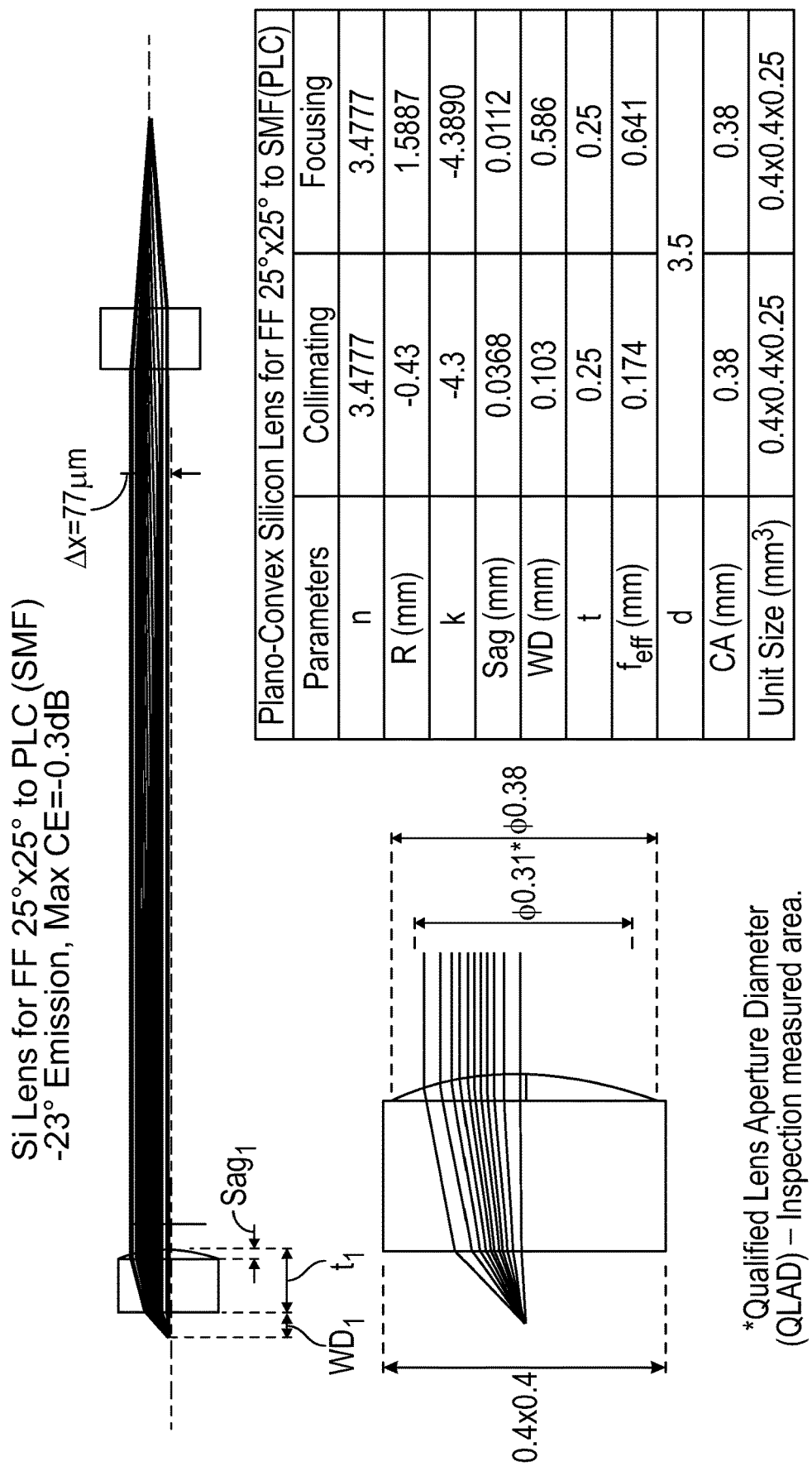

FIG. 46 shows a configuration like that shown in FIG. 45, but with the EDFAs prior to the multiplexer being omitted. Further, in FIG. 47, both the EDFAs and the tracking filter are omitted.

FIGS. 48-55 list and show various parameters associated with lenses that may be employed in the various examples discussed above. As noted previously, such lenses may be made of silicon. In particular, light is directed toward a portion of each lens in these examples, as opposed to impinging across the entire face of the lens.

Figure 56:
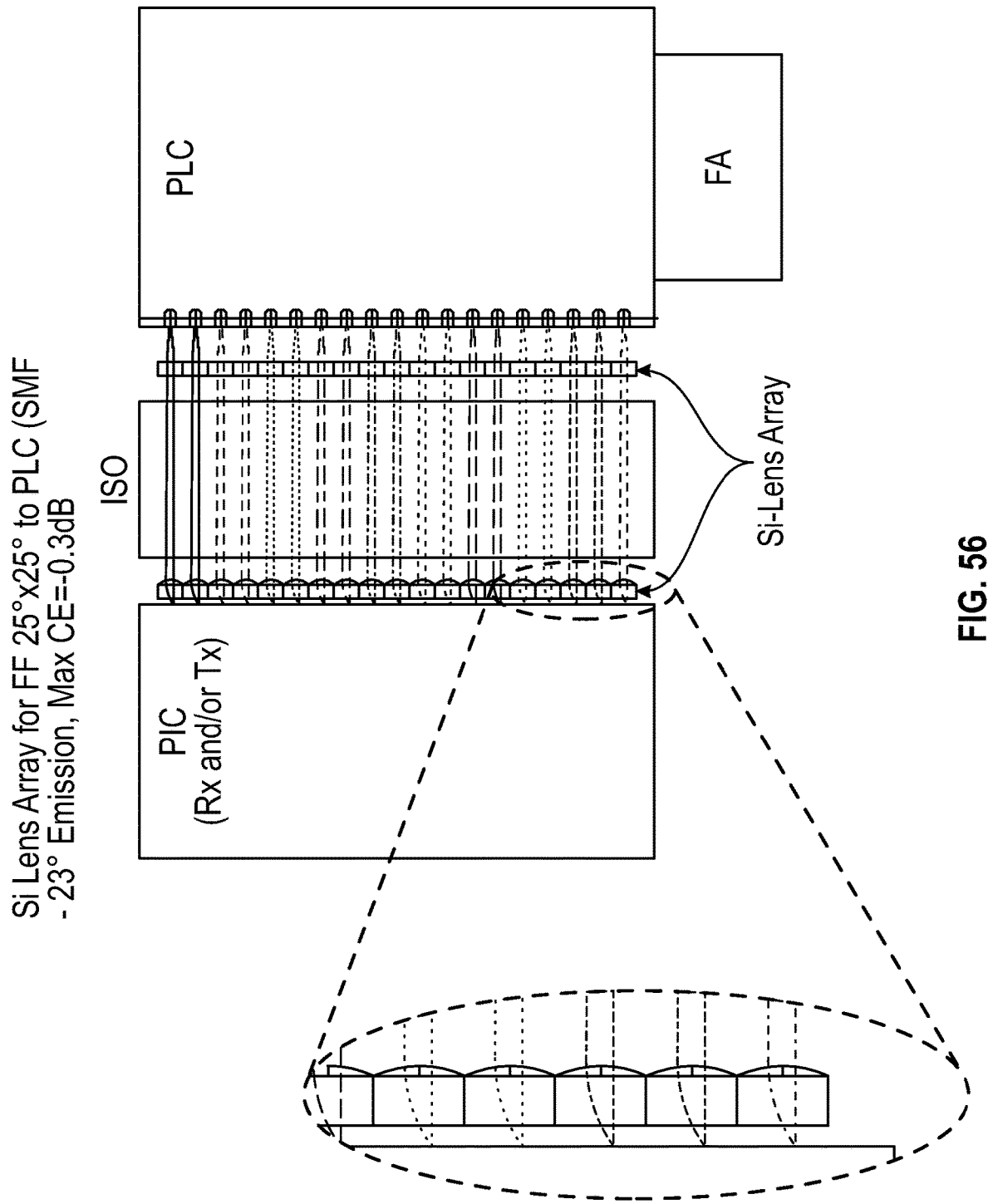
FIG. 56 is a plan view of a transmitter configuration consistent with an aspect of the present disclosure.
Figure 57:
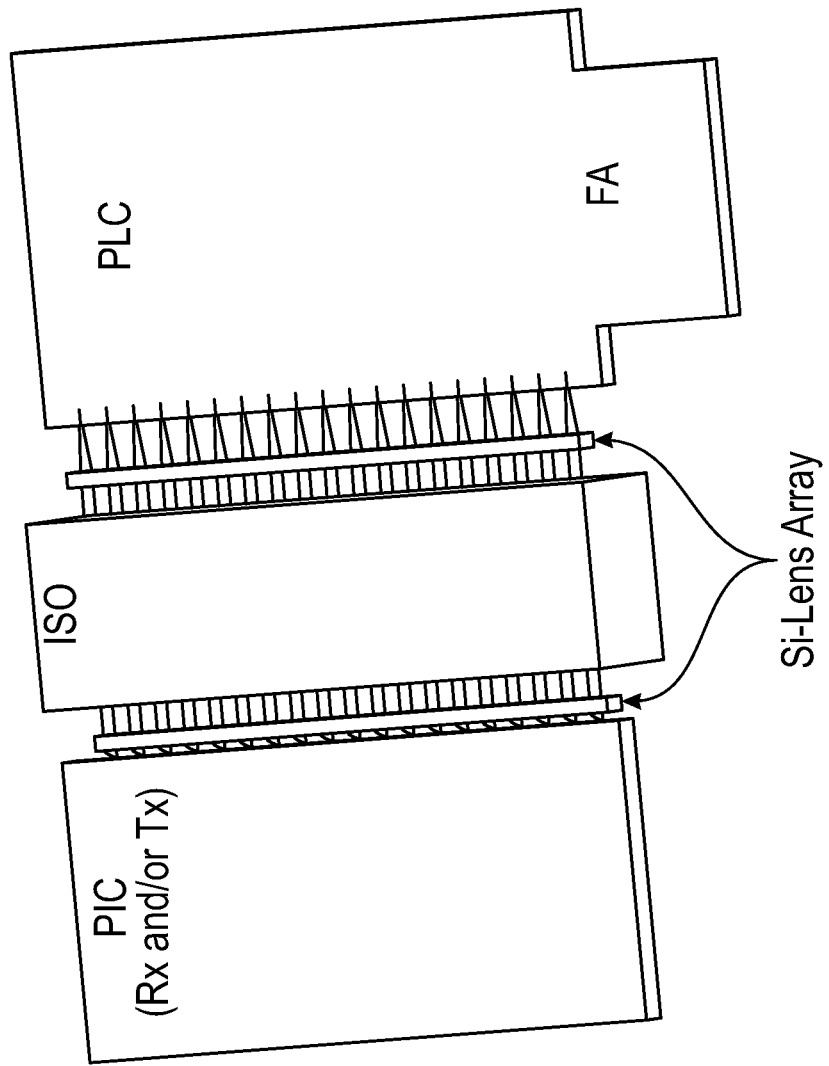
FIG. 57 show a perspective view of the transmitter configuration shown in FIG. 56.

In FIG. 56, a plan view of a transmitter configuration including an array of such lenses is shown, and FIG. 57 show a perspective view of the transmitter shown in FIG. 56.

Figure 58:
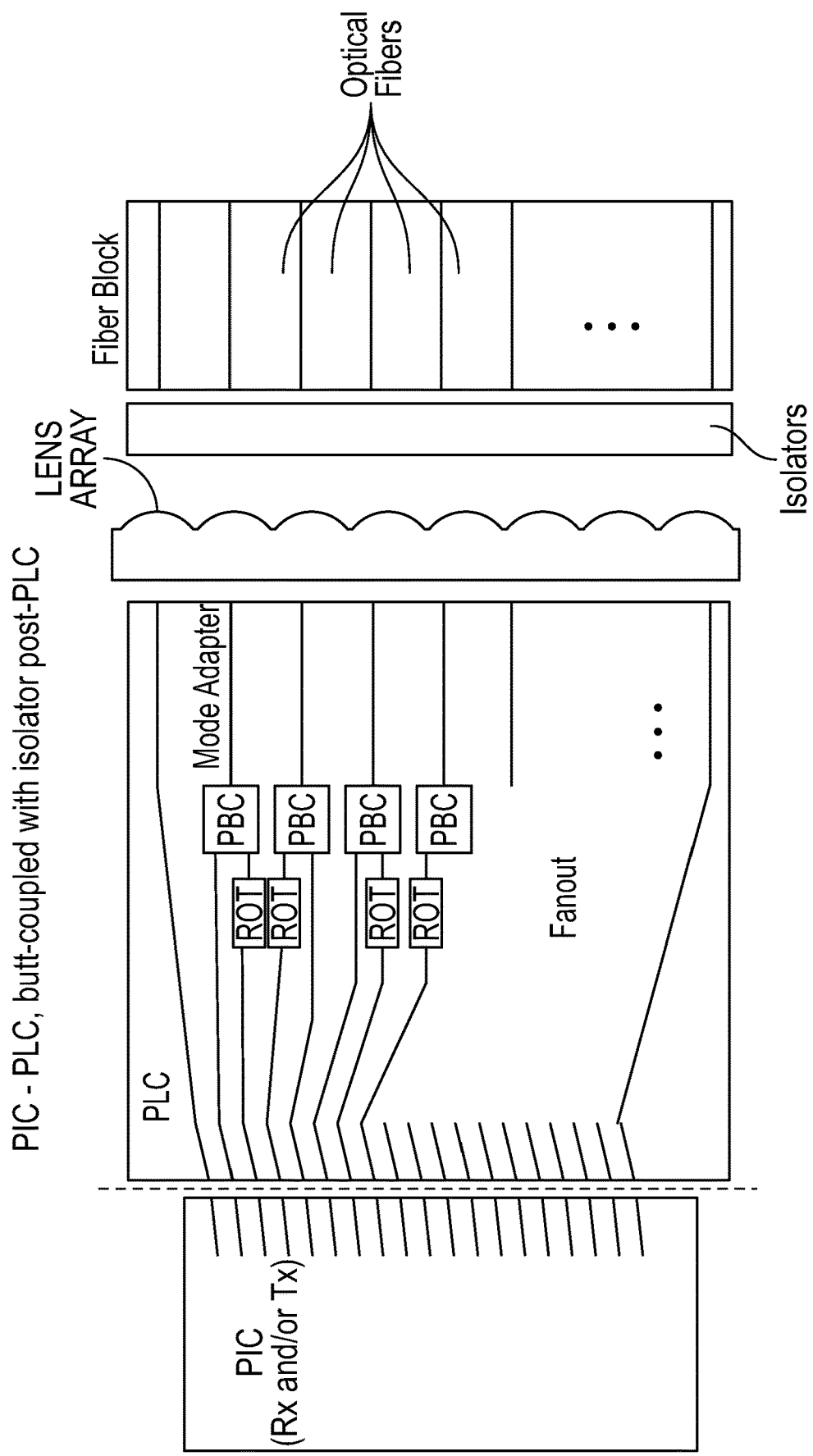
FIG. 58 shows an example in which outputs are coupled to rotators and PBCs on a PLC.

FIG. 58 shows an example in which outputs are coupled to rotators and PBCs on the PLC. In order to simplify FIG. 58, only selected couplings are shown. A mode adapter may be provided at the output of each PBC and relatively close to the edge of the PLC in order to couple the modulated optical signals to the lens array with reduced loss. The lens array, in turn, may direct the optical signals to corresponding a corresponding isolator in an array of isolators. Each isolator passes the received optical signal to a corresponding optical fiber.

Figure 59:
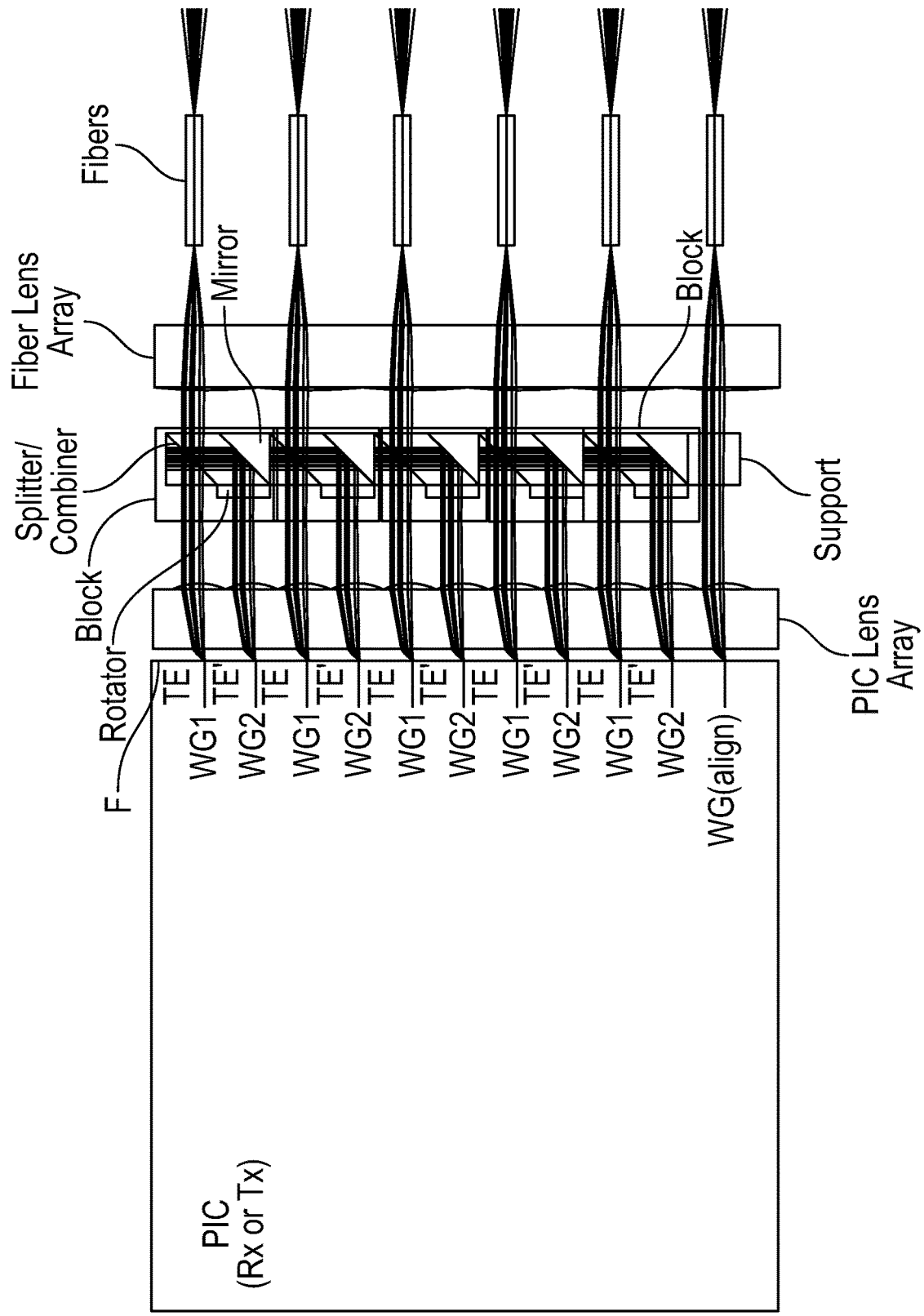
FIGS. 59 and 60 show examples of transmitter/receiver modules consistent with further aspects of the present disclosure.

FIG. 59 illustrates another embodiment consistent with an aspect of the present disclosure. FIG. 59 shows a PIC substrate, which, in the case of a TX PIC, includes lasers, modulators, and waveguides, and other features noted in the above description of FIGS. 1a, 1b, 1c, 2a, 2b, 2c, 3, 4a, and 4b. Consistent with an aspect of the present disclosure, at least one optical element is provided that collimates, focuses, rotates a polarization of at least one of, or combines modulated optical signals (e.g., TE and TE' optical signal output from the PIC). In addition, in the example shown in FIG. 59, an array of lenses in the Fiber Lens Array couples light to/from an array of single mode optical fibers in the SMF Array.

In greater detail, waveguides WG1 and WG2 as shown in FIG. 1 may be tilted to form a non-perpendicular angle θ with facet F, as noted above with respect to FIG. 27. Each of N waveguides WG1 supplies a respective one of N TE polarized modulated optical signals to a corresponding one of N lenses in the PIC lens. Similarly, each of N waveguides WG2 supplies a respective one of N TE polarized modulated optical signals (designated TE' in FIG. 59) to a corresponding one of lenses in the PIC lens array. Each of the lenses in the PIC lens array, which may extend parallel to PIC or waveguide facets or edges F, may be a collimating lens to collimate the received optical signals. Each of the TE collimated signals is supplied to a corresponding one of a plurality of groupings or blocks, each block including a splitter/combiner, a rotator, and a mirror. Likewise, each TE' collimated signal is supplied to a corresponding block. As shown in FIG. 59, the blocks or groupings are provided in an array.

A rotator in each block, such as a half wave plate, rotates the polarization of each TE's signal, such that each TE' signal has a TM polarization. The rotated signal in each block is next provided to a mirror, which reflects the rotated signal to a combiner. The combiner in each block also receives a corresponding one of the TE signals, such that corresponding TE signal passes through the combiner, while the rotated TE' signal (now TM) is reflected by the combiner, as shown in FIG. 59. As a result, a polarization multiplexed signal is formed and output from each block. Each polarization multiplexed signal is provided to a corresponding lens in the Fiber Lens Array and focused on to an end of a respective fiber. In the Examiner shown in FIG. 59, 2N (N=6) waveguides provide optical signals to N blocks or groupings, which, in turn provide each of N polarization multiplexed optical signals to a corresponding one of N fibers.

An additional waveguide (WG (align)) may be provided to supply light for alignment of the PIC, PIC lens array, blocks, fiber lens array and fiber.

In a receive configuration, the optical signals propagate in the reverse direction relative to that described above to an RX PIC. Namely, each of N polarization multiplexed optical signals are supplied by a corresponding one of N optical fibers via a corresponding lens in the fiber lens array to a respective block. In the receive configuration, each lens in the fiber lens array collimates the received optical signal. The splitter in each block or grouping passes a respective one of the received TE polarized optical signals or components of the polarization multiplexed signal, but reflects the corresponding TM optical signal or component to the mirror, which directs the TM optical signal to the rotator or half waveplate in the block. The rotator, in turn rotates the polarization of the TM signal, such that the TM signal has a TE polarization and the rotated signal is directed to a corresponding one of waveguides WG2 as a TE's optical signal. The TE optical signal is supplied from the splitter and output to a corresponding one of waveguide TE. Both optical signals are then subject to mixing with local oscillator late, conversion to electrical signals and further processing, as discussed above.

Figure 60:
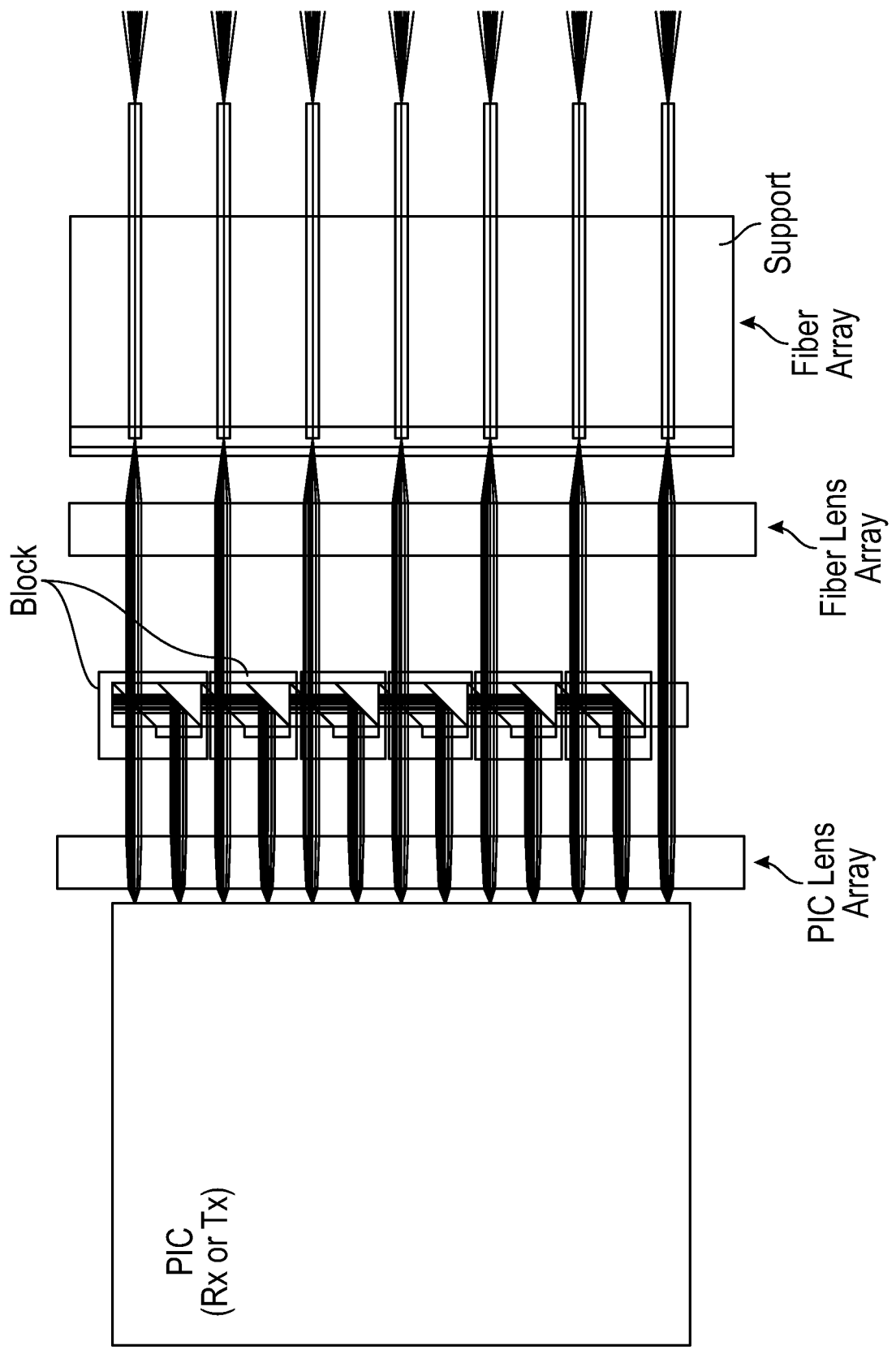

FIG. 60 shows a configuration similar to that shown in FIG. 59. In FIG. 60, however, the optical fibers are provided in a fiber array, such as in a ribbon cable. In addition, end portions of each fiber may be mounted or attached to a support.

In the above examples, the lenses provided in the PIC lens array and the Fiber Lens array may be attached to one another, be mounted on a support. Alternatively, the lenses may collectively be formed as a unitary in or integral unit, as shown in the figures above. In addition, the lenses may be provided as part of a complex lens.

In the above examples, N lasers are provided, and optical signals are supplied to N optical fibers. It is understood, however, the free space optics and PLC implementations discussed above may couple to more than N or less than N optical fibers. For example, additional optical fibers that do not carry optical signals may be provided as spare fibers to carry optical signals in the event of a fault in a working fiber or may be used in the event additional capacity is required. Accordingly, coupling to M optical fibers is also contemplated herein where is an integer less than N or greater than N.

Figure 61:
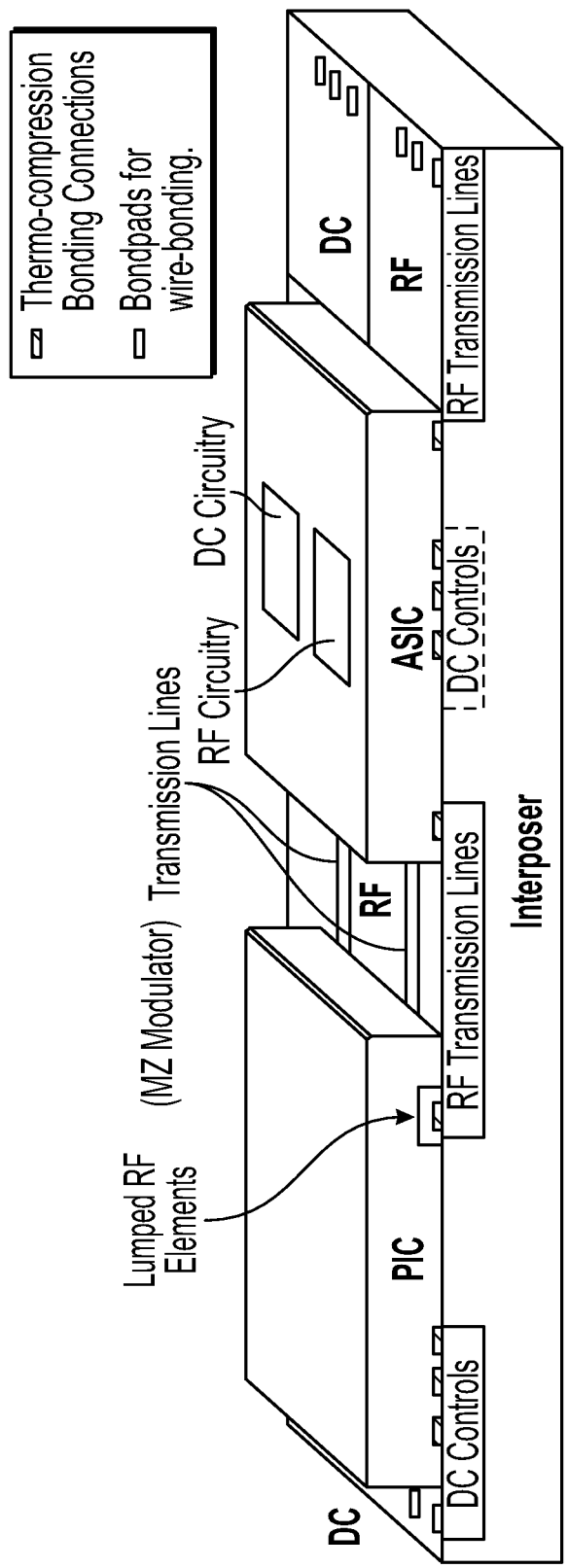
FIGS. 61-63 show examples in which a PIC and an ASIC may be provided on a common interposer.
Figures 62, 63:
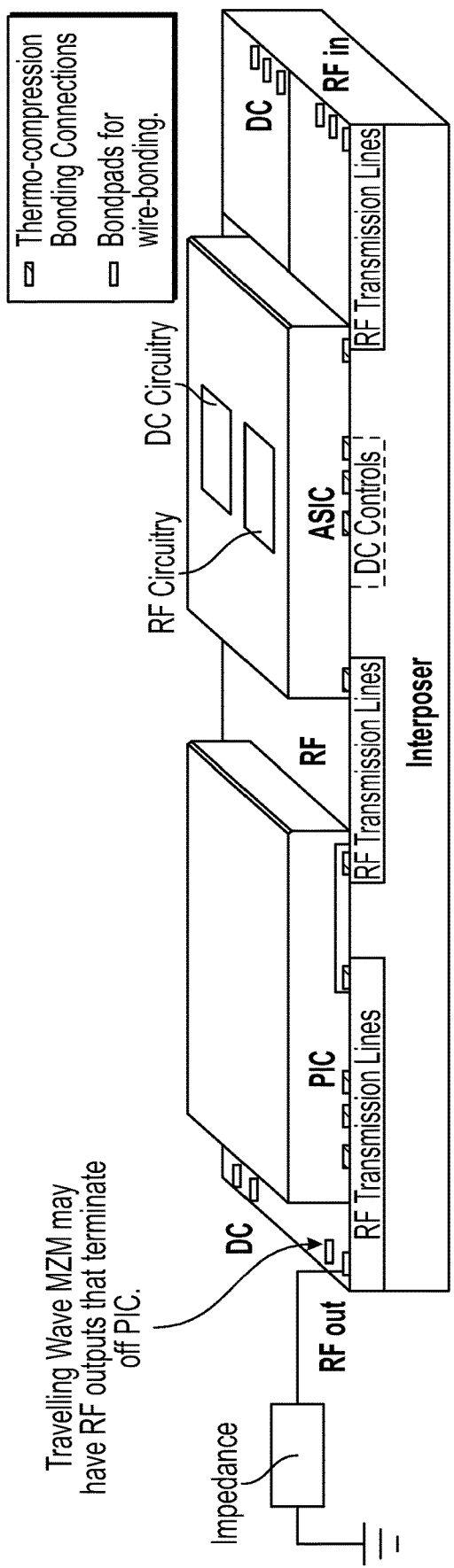

A further embodiment of the present disclosure will next be described with reference to FIG. 61. In FIG. 61 a PIC (provided on a first substrate), which may include any one or both of the above-described RX PIC and TX PIC, may be provided on an interposer, which may be a substrate (a second substrate) which may include an insulative or semiconductor material. An integrated circuit, such as an application specific integrated circuit (ASIC) may further be provided on the interposer substrate. If the PIC is a TX PIC, the ASIC may provide relatively high frequency or radio frequency (RF) drive signals to the above-described modulators in the TX PIC over a plurality of transmission lines formed on or in the interposer substrate. In one example, the modulators described above have a relatively short length that does not require termination with a fixed impedance or resistance. Such modulators constitute lumped elements, as shown in FIG. 61. In another example, the modulators have a longer length and are provided with a termination having such fixed impedance or resistance. Such modulators constitute traveling wave elements, and the termination for such traveling wave element may be provided off the PIC substrate (FIG. 62) or on the PIC substrate (FIG. 63). Monitoring signals (indicative of the performance of devices on the PIC) may be output from the PIC to the ASIC and control signals (for controlling or adjusting a parameter associated with a device on the PIC, such as a wavelength of light output from a laser or the attenuation of a VOA) output from the ASIC to the PIC are typically at relatively low frequency, and may be referred to as DC (direct current) signals that are generated and received by DC circuitry in the ASIC. RF drive signals, however, may be generated by RF circuitry in the ASIC. The DC control signals may be supplied through "DC control" electrodes or traces on the interposer substrate. DC controls traces may also supply such DC signal off the interposer. Connection to the DC control traces may be made with wire bonding to bond pads on the interposer. Connections to the RF transmission lines, however, may be made through thermo-compression bonding.

If the PIC is an RX PIC, the same or similar connections DC and RF connections would be made. The transmission lines, however, may carry RF signals from the above-described photodiodes to the ASIC for further processing by, for example, transimpedance amplifiers, analog-to-digital conversion, and carrier recovery. As noted above, such photodiodes receive modulated optical signal mixed with local oscillator light from the optical hybrid circuits. The photodiodes may have a relative short length and may thus constitute lumped elements. Alternatively, the photodiodes may have a relative long length and constitute travelling wave elements, in which case, a termination impedance or resistance may be provided on or off the PIC, as noted above.

In one example, the PIC and the ASIC are flip chip bonded to interposer substrate. For ease of explanation, optical outputs of the PIC, the optical fibers, and the coupling to the optical fibers described above are not shown in FIGS. 61-63. In addition, FIG. 6 shows a heat managing element may be provided that is thermally coupled to the PIC and an ASIC. In FIG. 6, the heat managing element may include a heat spreader and a thermal electric cooler. Alternatively, either one of these elements may be employed. In addition, the heat managing element may include a heat pip or a heat sink.

Other embodiments will be apparent to those skilled in the art from consideration of the specification. It is intended that the specification and examples be considered as exemplary only.

What is claimed is:
1. An optical device, comprising:
a substrate;
2N inputs on the substrate, N being an integer, each of the 2N inputs including a respective one of 2N waveguides, each of which extending to an edge of the substrate, and each of the 2N waveguides carrying a respective one of 2N optical signals, each of the 2N optical signals including an in-phase component and a quadrature component;

N lasers provided on the substrate;

first N optical hybrid circuits, each of which receiving a respective one of first N optical signals of the 2N optical signals from a corresponding one of first N waveguides of the 2N waveguides and a first portion of light output from a respective one of the N lasers, each of the first N optical hybrid circuits providing a respective one of first N groups of mixing products;

second N optical hybrid circuits, each of which receiving a respective one of second N optical signals from a corresponding one of second N waveguides and a second portion of the light output from a respective one of the N lasers, each of the second N optical hybrid circuits providing a respective one of second N groups of mixing products, the first N and second pluralities of optical hybrid circuits being provided on the substrate, N optical attenuators;

N optical splitters provided on the substrate, each of the N optical splitters being coupled to a respective one of the N lasers, wherein the first portion of the light output from a respective one of the N lasers is supplied from a first output of a corresponding one of the N optical splitters, the second portion of the light output from a respective one of the N lasers is supplied from a second output of a corresponding one of the N optical splitters, and a third portion of the light output from a respective one of the N lasers is supplied from a third output of a corresponding one of the N optical splitters to a respective one of N optical attenuators.

2. An optical device in accordance with claim 1, wherein the substrate is a first substrate, the optical device further including:
   a second substrate;
   third N waveguides, each of which being optically coupled to a corresponding one of the first N waveguides, the third N waveguides being provided on the second substrate;
   fourth N waveguides, each of which being optically coupled to a corresponding one of the second N waveguides, the fourth N waveguides being provided on the second substrate; and
   a N polarization elements provided on the substrate, each of which having a first port optically coupled to a respective one of the third N waveguides, a second port optically coupled to a respective one of the fourth N waveguides, and a third port.

3. An optical device in accordance with claim 1, wherein the substrate includes one of a Group III-V material and silicon.

4. An optical device in accordance with claim 1, further including:
   first N groups of photodiodes, each of said N groups of photodiodes being configured to receive a respective one the first N groups of mixing products; and
   second N groups of photodiodes, each of said N groups of photodiodes being configured to receive a respective one of the second N groups of mixing products.

5. An optical device in accordance with claim 1, wherein each of the first N optical hybrid circuits and each of the second N optical hybrid circuits is a 90 degree optical hybrid circuit.

6. An optical device in accordance with claim 1, wherein the light generated a respective one of the N lasers has a corresponding one of a N wavelengths.

7. An optical device in accordance with claim 1, wherein each of the N lasers is tunable.

8. An optical device in accordance with claim 1, further including:
   first N optical amplifiers, each of the first N waveguides is coupled to a corresponding one of the first N amplifiers.

9. An optical device in accordance with claim 8, wherein each of the first N optical amplifiers is provided on the substrate.

10. An optical device in accordance with claim 9, wherein each of the first N amplifiers is a semiconductor optical amplifier.

11. An optical device in accordance with claim 1, wherein each of the first N optical signals supplied from the corresponding one of the first N waveguides has a transverse electric (TE) polarization, and each of the second N optical signals supplied from the corresponding one of the second N waveguides has the TE polarization.

12. An optical device in accordance with claim 1, wherein each of the N lasers is a local oscillator laser.

13. An optical device in accordance with claim 1, wherein each of the N lasers is a distributed feedback (DFB) laser.

14. An optical device in accordance with claim 1, wherein each of the N lasers is a widely tunable laser that is tunable over at least a 35 nm range of wavelengths between 1460 nm and 1625 nm.

15. An optical device in accordance with claim 1, wherein each of the N lasers is a widely tunable laser that is tunable over at least a 17.5 nm range of wavelengths between 1460 nm and 1625 nm.

16. An optical device in accordance with claim 1, wherein each of the N lasers is a distributed feedback (DFB) laser that is tunable over at least a 2 nm range of wavelengths between 1460 nm and 1625 nm.

17. An optical device in accordance with claim 3, wherein the Group III-V material includes indium phosphide (InP) or gallium arsenide (GaAs).

18. An optical device in accordance with claim 1, wherein each of the N lasers is a tunable laser including a grating.

19. An optical device in accordance with claim 1, wherein each of the N lasers includes a widely tunable laser.

20. An optical device in accordance with claim 19, wherein the widely tunable laser is tunable over a wavelength range of 35 nm.

21. An optical device in accordance with claim 1, further including a polarization beam splitter having an input that receives a polarization multiplexed optical signal and first and second outputs, the first output of the polarization beam splitter being coupled to one of the first N waveguides of the 2N waveguides and the second output being coupled to one of the second N waveguides of the 2N waveguides.

22. An optical device in accordance with claim 2, wherein the second substrate includes silicon.

* * * * *